United States Patent [19]

Gaborski et al.

[11] Patent Number: 5,048,097

[45] Date of Patent: Sep. 10, 1991

[54] OPTICAL CHARACTER RECOGNITION NEURAL NETWORK SYSTEM FOR MACHINE-PRINTED CHARACTERS

[75] Inventors: Roger S. Gaborski, Pittsford; Louis J. Beato, Rochester; Lori L. Barski, Pittsford; Hin-Leong Tan, Rochester; Andrew M. Assad, N. Chili; Dawn L. Dutton, Buffalo, all of N.Y.

[73] Assignee: Eastman Kodak Company, Rochester, N.Y.

[21] Appl. No.: 474,587

[22] Filed: Feb. 2, 1990

[51] Int. Cl.[5] ......................... G06K 9/62; G06K 9/34
[52] U.S. Cl. ........................................ 382/14; 382/9; 382/15
[58] Field of Search ......................... 382/14, 15, 9, 47

[56] References Cited

U.S. PATENT DOCUMENTS

| | | | |
|---|---|---|---|
| 3,192,505 | 6/1965 | Rosenblatt | 340/146.3 |
| 3,267,439 | 8/1966 | Bonner | 340/172.5 |
| 3,275,985 | 9/1966 | Dunn et al. | 340/146.3 |
| 3,275,986 | 9/1966 | Dunn et al. | 340/146.3 |
| 3,967,243 | 6/1976 | Kawa | 382/47 |
| 4,479,241 | 10/1984 | Buckley | 382/15 |
| 4,635,290 | 1/1987 | Tsuji et al. | 382/9 |
| 4,876,731 | 10/1989 | Loris et al. | 382/15 |
| 4,926,491 | 5/1990 | Maeda et al. | 382/14 |

OTHER PUBLICATIONS

Burr, "A Neural Network Digit Recognizer", *Proceedings of the IEEE International Conference on Systems, Man and Cybernetics*, Atlanta, GA (1986) pp. 1621–1625.

Caudill, "Neural Networks Primer," *AI Expert*, Jun. 1988, pp. 53–59.

Hayashi et al., "Alphanumeric Character Recognition Using a Connectionist Model with the Pocket Algorithm," *Proceedings of the International Joint Conference on Neural Networks*, vol. 2, pp. 606–613, Wash. D.C., Jun. 18, (1989).

Primary Examiner—Leo H. Boudreau
Assistant Examiner—Steven P. Fallon
Attorney, Agent, or Firm—Dennis R. Arndt

[57] ABSTRACT

Character images which are to be sent to a neural network trained to recognize a predetermined set of symbols are first processed by an optical character recognition pre-processor which normalizes the character images. The output of the neural network is processed by an optical character recognition post-processor. The post-processor corrects erroneous symbol identifications made by the neural network. The post-processor identifies special symbols and symbol cases not identifiable by the neural network following character normalization. For characters identified by the neural network with low scores, the post-processor attempts to find and separate adjacent characters which are kerned and characters which are touching. The touching characters are separated in one of nine successively initiated processes depending upon the geometric parameters of the image. When all else fails, the post-processor selects either the second or third highest scoring symbol identified by the neural network based upon the likelihood of the second or third highest scoring symbol being confused with the highest scoring symbol.

36 Claims, 30 Drawing Sheets

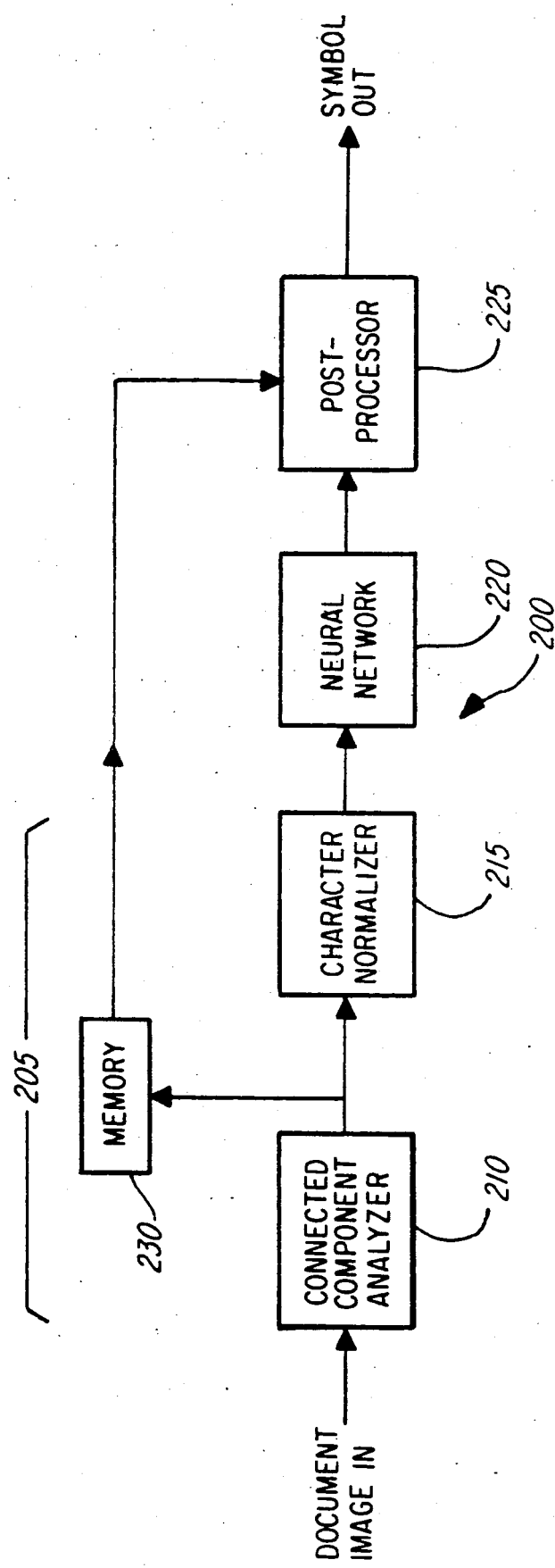

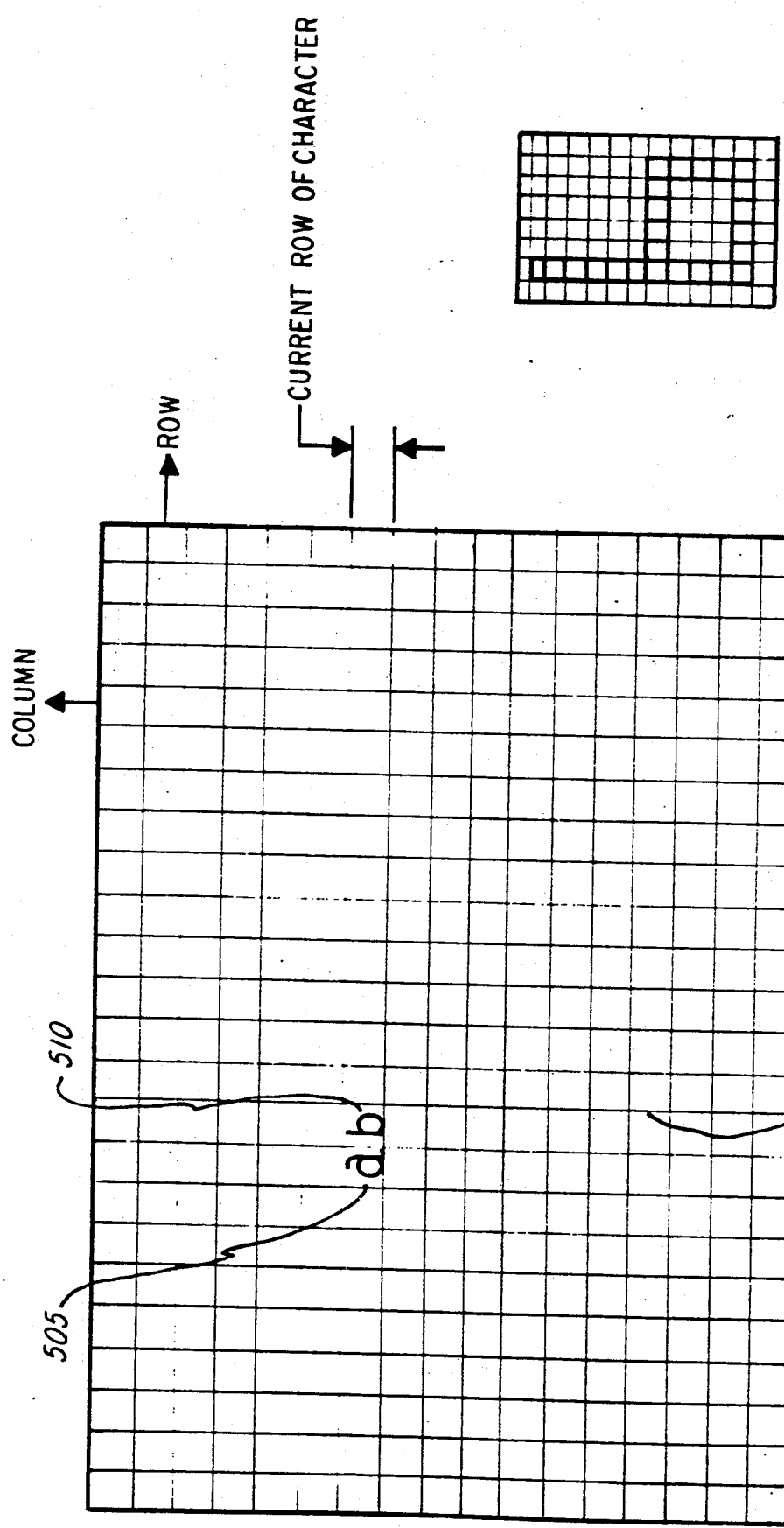

DETERMINE SPECIAL SYMBOL

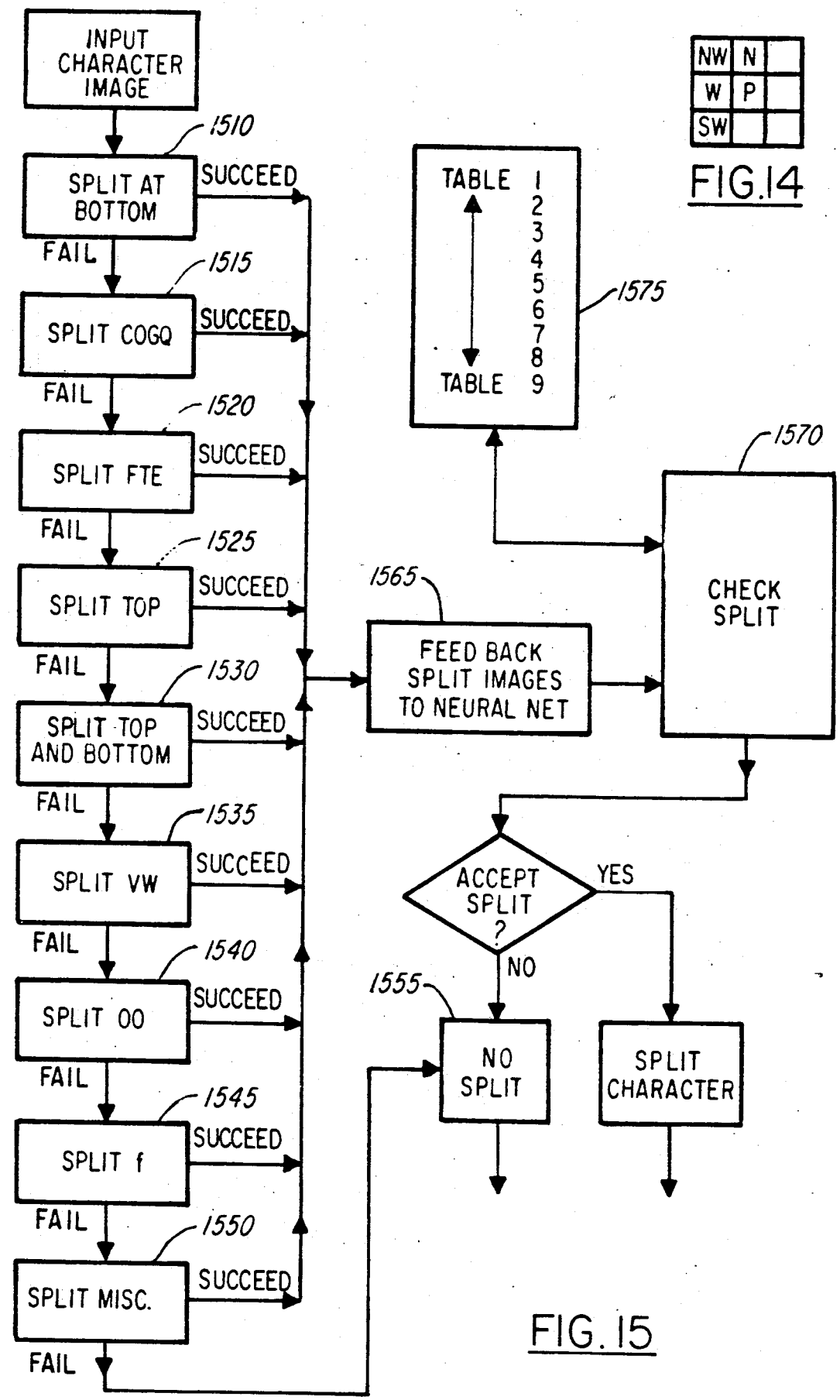

SPLIT AT BOTTOM

SPLIT COGQ

SPLIT FTE

SPLIT TOP

SPLIT AT TOP AND BOTTOM

SPLIT VW

SPLIT 00

SPLIT SMALL f

SPLIT MISCELLANEOUS

CONSTRUCT NEW "BOXES"

CHECK-SPLIT

| ORIGINAL SYMBOL I.D. | SPLIT SYMBOL I.D's | BLOCK IN FIG. 15 WHICH PERFORMED SPLITTING |
|---|---|---|
| n | rl, lt, It | BLOCK 1525 |
| u | Lt, lJ, LJ | ANY |
| Y | l, r, )r | ANY |
| R | F, l | ANY |
| H | pl | ANY |
| H | Fl, FI, II, Ii | ANY OTHER THAN BLOCKS 1510, 1525, 1530 |
| ANY SYMBOL | lI, Il, lI | ANY OTHER THAN BLOCK 1510 |
| ANY SYMBOL | )(, JC, () | ANY |
| ANY SYMBOL | )=, I), IC, () | ANY |
| ANY SYMBOL | C), (J, (I, (i, | ANY |
| ANY SYMBOL | )l, &L | ANY |
| d | Cl | ANY |
| T | rr | ANY |
| W | \v | ANY |
| B | El | ANY |
| g | %J | ANY |
| v | l/, lr, &r | ANY |
| N | hl, bJ, I%, l% | ANY |
| K | IC, I(, lC | ANY |
| G | G;, (D | ANY |

FIG. 27
GENERAL CHECK

FIG. 29A

ERROR CLASSIFICATIONS

| ORIGINAL CHARACTERS | N | n | O | P | Q | q | R | r | S | T | t | U | V | W | X | Y | y | Z | 2 | 3 | 4 | 5 | 6 | 7 | 8 | 9 |
|---|---|---|---|---|---|---|---|---|---|---|---|---|---|---|---|---|---|---|---|---|---|---|---|---|---|---|
| A | | | | | | | | | | | | | | | | | | | | | | | | | | |
| a | | | | | | | | | | | | | | | | | | | | | | | | | | |
| B | | | | | | | | | | | | | | | | | | | | | | | | | | |
| b | | | | | | | | | | | | | | | | | | | | | | | | | | |
| C | | | 2 | | | | | | | | | | | | | | | | | | | | | | | |
| D | | 2 | 1 | | | | | | | 1 | | 1 | | | | | | | | | | | | | | |
| d | | | | | | | | | | | | | | | | | | | | | | | | | | |
| E | | | | | | | | | | | | | | | | | | | | | | | | | | |
| e | | | | | | | | | | | | | | | | | | | | | | | | | | |
| F | | | | | | | | | | | | | | | | | | | | | | | | | | |
| f | | | | | | | 1 | | | | | | | | | | | | | | | | | | | |
| G | | | | | | | | | | | | | | | | | | | | | | | | | | |
| g | | | | | 1 | | | | | | | | | | | | | | | | | | | | | 1 |
| H | | | | | | | 1 | | | | | | | | | | | | | | | | | | | |
| h | | | | | | | | | | | | | | | | | | | | | | | | | | |
| I | | | | 1 | | | | 1 | | | | | | | 1 | | 1 | | | 1 | 1 | | | | | |
| i | | | | | | | | | | | | | | | | | | | | | | | | | | |
| J | | | 1 | | | | | | | 1 | | 2 | | | | | | | | | | 1 | | | | |
| j | | 1 | | | | | | | | | 2 | | | | | | | | | | | | | | | 1 |
| K | | | | | | | | | | | | | | | | | | | | | | | | | | |
| k | | | | | | | | | | | | | | | | | | | | | | | | | | |
| L | | | | | | | | | | | | | | | | | | | | | | | | | | |
| l | | 1 | | 1 | | | 1 | | 1 | | | | | | | 1 | | | | | | 1 | | | | |
| M | | | 5 | | | | | | | | | | | | | | | | | | | | | | | |
| m | | 1 | | 1 | | | | | | | | | | | | | | | | | | 1 | | | | |
| N | | | | | | | 3 | | | | | | | | | 2 | | | | | | | | | | |
| n | | | | | | | | | | | | | | | | | | | | | | | | | | |
| O | 5 | | | | | | | | | | | | | | | | | | | | | | | | | |
| P | | | | | | | 2 | | | 1 | | | | 1 | | 1 | | | | | | | | | | |
| Q | | 1 | 2 | | | | | | | | | | | | | | | | | | | | | | | |
| q | | | | | | | | | | | | | | | | | | | | | | | | | | |
| R | | | | 3 | | | | | | | | | | | | | | | | | | | | | | |
| r | | | | | | | | | | | 1 | | | | | | | | | | | | | | | |

ERROR CLASSIFICATIONS

| ORIGINAL CHARACTERS | N | n | O | P | Q | q | R | r | S | T | t | U | V | W | X | Y | y | Z | 2 | 3 | 4 | 5 | 6 | 7 | 8 | 9 |
|---|---|---|---|---|---|---|---|---|---|---|---|---|---|---|---|---|---|---|---|---|---|---|---|---|---|---|
| S |  |  |  |  |  |  |  |  |  |  |  |  |  |  |  | 1 |  |  |  |  |  | 5 |  |  | 2 |  |
| T |  |  |  |  |  |  |  |  |  |  |  |  |  |  |  |  |  |  |  |  |  |  |  |  |  |  |
| t |  |  |  |  |  |  | 6 |  |  |  |  |  |  |  |  |  |  |  |  |  |  |  |  |  |  |  |
| U |  |  |  |  |  |  |  |  |  |  |  |  | 2 |  |  |  |  |  |  |  |  |  |  |  |  |  |
| V |  |  |  |  |  |  |  | 4 |  | 1 |  |  |  |  |  | 1 |  |  |  |  |  |  |  |  |  |  |
| W |  |  |  |  |  |  | 1 |  |  | 8 |  |  |  |  |  |  |  |  |  |  |  |  |  |  |  |  |
| X |  |  |  |  |  |  |  |  |  |  |  |  |  |  |  |  |  |  |  |  |  |  |  |  |  |  |
| Y |  |  |  |  |  |  |  |  |  |  |  |  |  |  |  | 1 |  | 4 | 6 |  |  |  |  |  |  |  |
| y |  |  |  |  |  |  |  |  |  |  |  |  |  |  |  |  |  |  |  |  |  |  |  | 11 |  |  |
| Z |  |  |  |  |  |  |  |  |  |  |  |  |  |  |  |  |  | 5 |  |  |  |  |  |  |  |  |
| 2 |  |  |  |  |  |  |  |  |  |  |  |  |  |  |  |  |  |  | 3 |  |  |  |  |  |  |  |
| 3 |  |  |  |  |  |  |  |  |  |  |  |  |  |  |  |  |  |  |  |  |  |  |  |  |  |  |
| 4 |  |  |  |  |  |  |  |  |  |  |  |  |  |  |  |  |  |  |  |  |  | 5 |  |  |  |  |
| 5 |  |  |  |  |  |  |  | 2 |  |  |  |  |  |  |  |  |  |  |  | 1 |  |  |  |  |  |  |
| 6 |  |  |  |  |  |  |  |  |  |  |  |  |  |  |  |  |  |  |  |  |  |  |  |  | 4 |  |
| 7 |  |  |  |  |  |  |  |  |  |  |  |  |  |  |  |  |  |  |  |  |  |  |  |  |  |  |
| 8 |  |  |  |  |  |  |  | 2 |  |  |  |  |  |  |  |  |  |  |  |  |  |  |  |  |  |  |
| 9 |  |  |  |  |  |  |  | 1 |  |  |  | 1 |  |  |  |  |  |  |  |  |  |  |  |  |  |  |
| @ |  |  |  |  |  |  |  |  |  |  |  |  |  |  |  |  |  |  |  |  |  |  |  |  |  |  |
| # |  |  |  |  |  |  |  |  |  |  |  |  |  |  |  |  |  |  |  |  |  |  |  |  |  |  |
| $ |  |  |  |  |  |  |  |  |  |  |  |  |  |  |  |  |  |  |  |  |  |  |  |  |  |  |
| % |  |  |  | 16 |  |  |  |  |  |  |  |  |  |  |  |  |  |  |  |  |  |  |  |  |  |  |
| & |  |  |  |  |  |  |  |  |  |  |  |  |  |  |  |  |  |  |  |  |  |  |  |  |  |  |
| ( |  |  |  |  |  |  |  |  |  |  |  |  |  |  |  |  |  |  |  |  |  |  |  |  |  |  |
| ) |  |  |  |  |  |  |  |  |  |  |  |  |  |  |  |  |  |  |  |  |  |  |  |  |  |  |
| + |  |  |  |  |  |  |  |  |  |  |  |  |  |  |  |  |  |  |  |  |  |  |  |  |  |  |
| = |  |  |  |  |  |  |  |  |  |  |  |  |  |  |  |  |  |  |  |  |  |  |  |  |  |  |
| \ |  |  |  |  |  |  |  |  |  |  |  |  |  |  |  |  |  |  |  |  |  |  |  |  |  |  |
| . |  |  |  |  |  |  |  |  |  |  |  |  |  |  |  |  |  |  |  |  |  |  |  |  |  |  |
| ? |  |  |  |  |  |  |  |  |  |  |  |  |  |  |  |  |  |  |  |  |  |  |  |  |  |  |
| / |  |  |  |  |  |  | 1 |  |  |  |  |  |  |  |  |  |  |  |  |  |  |  |  |  |  |  |

FIG. 29E

ERROR CLASSIFICATIONS

| | @ | # | $ | & | ( | ) | + | = | \ | : | ? | / |
|---|---|---|---|---|---|---|---|---|---|---|---|---|
| S | | 2 | | | | | | | | | | |
| T | | | | | | | | | | | | |
| t | | | | | | | | | | | | |
| U | | | | | | | | | | | | |
| V | | | | | | | | | | | | |
| W | | | | | | | | | | | | |
| X | | | | | | | | | | | | |
| Y | | | | | | | | | | | | |
| y | | | | | | | | | | | | |
| Z | | | | | | | | | | | | |
| 2 | | | | | | | | | | | | |
| 3 | | | | | | | | | | | | |
| 4 | | | | | 2 | | | | | | | |
| 5 | | | | | | | | | | | | |
| 6 | | | | | | | | | | | | |
| 7 | | | | | | | | 1 | | | | |
| 8 | | | | | | | | | | | | |
| 9 | | | | | | | | | | | | |
| @ | 1 | | | | | | | | | | | |
| # | 1 | | | | | | | | | | | |
| $ | | | 1 | | | | | | | | | |
| % | | | | | | | | | | | | |
| & | | | | | | | | | | | | |
| ( | | | | | | | | | | | | |
| ) | | | | | | | | | | | | |
| + | | | | | | | | | | | | |
| = | | 3 | 3 | | | | | 1 | | | | |
| \ | | 1 | 1 | 2 | | | 3 | 102 | | | | |
| : | | | | | | 103 | | | | | | |
| ? | | 1 | | | 1 | 9 | | | | | | |
| / | | | | | | | | | | | | |

FIG. 29F

OPTICAL CHARACTER RECOGNITION NEURAL NETWORK SYSTEM FOR MACHINE-PRINTED CHARACTERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

The invention is related to the field of optical character recognition systems employing neural networks to recognize machine-printed alphanumeric characters in any one of a plurality of fonts.

2. Background Art

Optical character recognition requires that each character on a document be correctly associated with an appropriate symbol in a predetermined alphanumeric symbol set. It is analogous to pattern recognition in the sense that the character on the document constitutes an image pattern which must be recognized as a particular alphanumeric symbol. Pattern recognition systems are well-known and are disclosed, for example, in U.S. Pat. Nos. 3,192,505; 3,267,439; 3,275,985; 3,275,986; and 4,479,241. Such pattern recognition systems are not particularly suitable for coping with the problems inherent in recognizing alphanumeric characters. These problems will be discussed below.

A related technique is neural networking, which is described in Caudill, "Neural Networks PRIMER," *AI Expert*, June 1988, pages 53 through 59 and in Rumelhart et al., *Parallel Distributed Processing*, Volume 1, pages 318 through 330. Using a neural network to recognize digits (numeric characters) was proposed by Burr, "A Neural Network Digit Recognizer," *Proceedings of the 1986 IEEE International Conference on Systems, Man and Cybernetics*, Atlanta, Ga., pages 1621 through 1625 (August, 1986). Using a neural network to recognize alphanumeric characters was proposed by Hayashi et al., "Alphanumeric Character Recognition Using a Connectionist Model with the Pocket Algorithm," *Proceedings of the International Joint Conference on Neural Networks*, Volume 2, pages 606 through 614 (June 18-22, 1989). The Hayashi et al. publication discloses an optical character recognition system which segments or isolates each character image on the document using histogramming and which then normalizes each character image to a standard size before transmitting it to a neural network. Further, the Hayashi et al. publication discloses that more than one type of font may be recognized using the same system. However, none of the foregoing patents and publications address the problem of what to do when the neural network makes an ambiguous or unreliable symbol selection, or, in other words, makes a selection whose "score" is fairly close to second and third choices. Moreover, none of them addresses the problem of how to recognize a character which is kerned with an adjacent character so that the two cannot be separated by histogrammic segmentation techniques. Finally, none of the foregoing patents and publications address the problem of how to recognize a character which is touching an adjacent character.

3. Problem to be Solved by the Invention

Before a neural network can recognize a character image to correctly associate it with the symbol it represents, the character image must have been separated from the images of other characters on the document and it size must be normalized—conformed—to the character image size and aspect ratio which the network has been trained to process. The separation of adjacent character images from one another is typically performed by a segmentation process consisting of simply finding a column or a row devoid of any "on" pixels lying between two regions consisting of contiguous "on" pixels. The segmentation process simply declares the two regions to be different character images separated by the column or row found to be devoid of "on" pixels. Such a segmentation technique is often referred to as "histogramming."

One problem with such segmentation techniques is that they cannot separate adjacent characters which are kerned. Kerned characters are adjacent characters not necessarily touching, one of which embraces the other. For example, in some fonts, a capital "P" will embrace a following small "e", as illustrated in FIG. 1. Although the two characters are truly separated from one another in the document image, there is no row or column between the two which is devoid of "on" pixels, as can be seen from FIG. 1a. Thus, the sementation techniques discussed above will fail to separate the two characters. As a result, the neural network will fail recognize either character.

Another problem with the segmentation techniques discussed above is that they cannot separate adjacent characters which are actually touching or conjoined. For example, a capital "L" whose base merges with a following capital "I" may look like a capital "U", as illustrated in FIG. 1b. As in the example of FIG. 1a, FIG. 1b shows that there iw no row or column which is devoid of "on" pixels, so that the segmentation technique will fail to separate the two conjoined characters and the neural network will fail to recognize either one of them.

A related problem with using neural networks to perform optical character recognition is that the network may fail to make an unambiguous symbol selection for a given character image. Such an event may be caused by kerning or touching characters, as discussed above, or by other things, such as poor document image quality. As is well-known, the neural network makes an unambiguous choice by generating a very high score at one of its symbol outputs and very low scores at all of its other symbol outputs. Whenever the neural network fails to make an unambiguous symbol choice, none of its symbol outputs has a relatively high score and in fact several of its symbol outputs may have similar scores. The problem is how to process a character image which the neural network fails to recognize, particularly where it is not known beforehand why the particular character image is not recognizable to the neural network.

Yet another problem is that a symbol set may be selected which includes very small symbols (such as commas, quote marks, etc.) which, when normalized to the size appropriate for processing by the neural network, are practically undistinguishable from an alphanumeric symbol of similar shape. Typically, a neural network is trained to recognize character images of a particular size and aspect ratio. Depending upon the font with which the document was printed or whether the document represents an enlargement or a reduction, each character image taken from the document must be normalized before being processed by the neural network so that its size and aspect ratio conform with the character image size and aspect ratio for which the neural network was trained to recognize. For example, the character image size may be 12 columns by 24 rows of binary pixels.

Still another problem is that the case (capitalized or small) of a particular symbol (e.g., c, p, w, s, x, etc.) is determined solely by the size of the symbol and therefore cannot be distinguished following character normalization. Thus, some provision must be made to correct the case of such symbols following their recognition by the neural network.

Accordingly, one object of the invention is recognize characters whenever the neural network fails to make an unambiguous symbol choice.

Another object of the invention is to sense whenever the neural network fails to make a reliable choice and to then recognize whether there are adjacent characters which are kerned.

Yet another object of the invention is sense whenever the neural network fails to make a reliable choice and to then recognize whether there are adjacent characters which are kerned or whether there are adjacent characters which are touching.

Still another object of the invention is to recognize special symbols which cannot be distinguished from other symbols following character normalization and to assign the proper case (capitalized or small) to symbols reliably recognized by the neural network but whose case cannot be distinguished following character normalization.

Yet another object of the invention is to achieve each of the foregoing objects in an order in which the least complicated tasks are performed first and the more complicated tasks are performed only after a determination of their necessity for a particular character image.

DISCLOSURE OF THE INVENTION

The invention is an optical character recognition system having a neural network trained to recognize a predetermined symbol set, a pre-processor which segments and normalizes character images from a document for recognition by the neural network, and a post-processor which corrects erroneous symbol identifications made by the neural network. In an alternative embodiment of the invention, the pre-processor segments the individual character images by connected component analysis in order to separate otherwise inseparable character images, such as images of characters which are kerned, for example.

In the alternative embodiment of the invention, touching characters are separated in the connected component analysis performed by the post-processor. In this embodiment, the post-processor remembers each object which is ultimately merged by connected component analysis into a larger object upon being found connected to the larger object. Once all the objects in the image are found, the post-processor then determines whether any of the merged objects is of a height or area near the median height or area of all symbols for which the neural network has been trained to recognize. If so, the post-processor separates the merged object meeting this criteria from the larger object. In such a case, the merged object was a touching character and is fed back separately to the input of the character normalizer and thence to the neural network.

In the preferred embodiment of the invention, the pre-processor employs a faster but less robust segmentation technique, such as histogramming, while the post-processor monitors the symbol scores generated by the neural network. If the aspect ratio (width divided by height) of the character image is greater than a predetermined threshold or upon detecting a low symbol score from the neural network, a dekerning processor in the post-processor performs a predetermined series of attempts to remedy the high aspect ratio or low score. In most cases, each of these attempts is more time-consuming than the preceding attempt. First, the post-processor determines whether the character image contains one of a set of special symbols which are indistinguishable from certain known characters after character normalization. If so, the post-processor overrides the neural network's symbol choice and identifies the special character. Failing this, the post-processor determines whether the symbol chosen by the neural network is one whose case is indeterminant following character normalization. If so, the post-processor determines the proper case of the character from the size of the original (unnormalized) character image.

Failing this, an assumption is made that the character image is that of two kerned symbols, and a dekerner processor in the post-processor performs connected component analysis in an attempt to separate two kerned characters. In this way, the time-consuming connected component analysis process is not used unless it is found necessary for a particular character image. If the dekerner processor succeeds in separating the image into more than one character, the results are fed back to the input of the neural network for a new attempt at character recognition. The advantage of connected component analysis is that it separates adjacent character images by defining disconnected objects in the image consisting solely of contiguous regions of "on" pixels. Thus, whether these regions are kerned or not, the connected component processor separates unconnected regions. Each of the regions is then separately normalized and transmitted to the neural network.

Failing this, in the preferred embodiment of the invention touching character separation is performed in the post-processor by a touching character separator processor which is dedicated exclusively to the separation of touching characters. Since the process performed by the touching character separator processor is more time-consuming than that of the dekerner processor, the post-processor uses the touching character separator processor only in the event that the dekerner processor fails to separate a character image. The touching character separator processor determines the separation point between two unknown characters in the same image by attempting, in a predetermined order, nine respective separation trial processes. Each successive trial process eliminates a set of hypothetical possibilities which the next trial process assumes are not present, thus simplifying the task of each succeeding trial process. Upon the success of any one of the nine trial processes, the pair of newly separated character images are fed back one at a time to the input of the character normalizer and thence to the neural network in order to verify the correctness of the separation.

If a particular character image was identified by the neural network with a low score and if both the dekerner processor and the touching character separator processor fail to separate the character image into more than one character image, then, in the preferred embodiment of the invention, the character image is transmitted to a guessing processor. The guessing processor determines which one of the second and third highest scoring symbol choices made by the neural network has a character height matching that of the character image in question, and declares that symbol choice to be the winner. However, if both the second and third symbol choices have character heights matching that of the character image, then the guessing processor determines which of the two choices is most likely to be confused with the first choice, and declares that one of be the winner.

The dekerning (connected component analysis) process and the touching character separation process are progressively more time-consuming than the preceding special symbol detection and case correction processes. One advantage of the invention is that the output of the neural network determines for each character image whether the dekerning, separation and guessing processes are performed so that each of them is used only if necessary. Specifically, the system of the invention resorts to such remedial processes only in the event that a particular character image has a particularly high aspect ratio or stimulates a symbol choice by the neural network having an unacceptably low score. Thus, the overall system operation speed is optimized while enjoying the advantages of the dekerning process, the touching character separation process and the guessing process in those cases where they become necessary.

BRIEF DESCRIPTION OF THE DRAWINGS

Preferred embodiments of the invention are described below in detail by reference to the accompanying drawings, of which:

FIGS. 1a and 1b are diagrams illustrating, respectively, a pair of kerned characters and a pair of touching characters;

FIG. 2 illustrates an alternative embodiment of the invention;

FIG. 5 is a simplified diagram of an exemplary image of a document;

FIG. 6 is a simplified diagram of a character image separated from the document image of FIG. 5;

FIG. 14 is a diagram of a movable kernel of neighboring pixels employed by the dekerner in the system of FIG. 3;

FIG. 15 is an general flow diagram illustrating the operation of the touching character separator in the system of FIG. 3;

FIG. 27 illustrates a general check process employed in the check split operation of FIG. 26;

FIG. 29a–29f depict look-up tables useful in determining which symbol in a complete symbol set is the likeliest to be confused with a particular symbol chosen by the neural network in the system of FIG. 3.

MODES OF CARRYING OUT THE INVENTION

Figure 3:
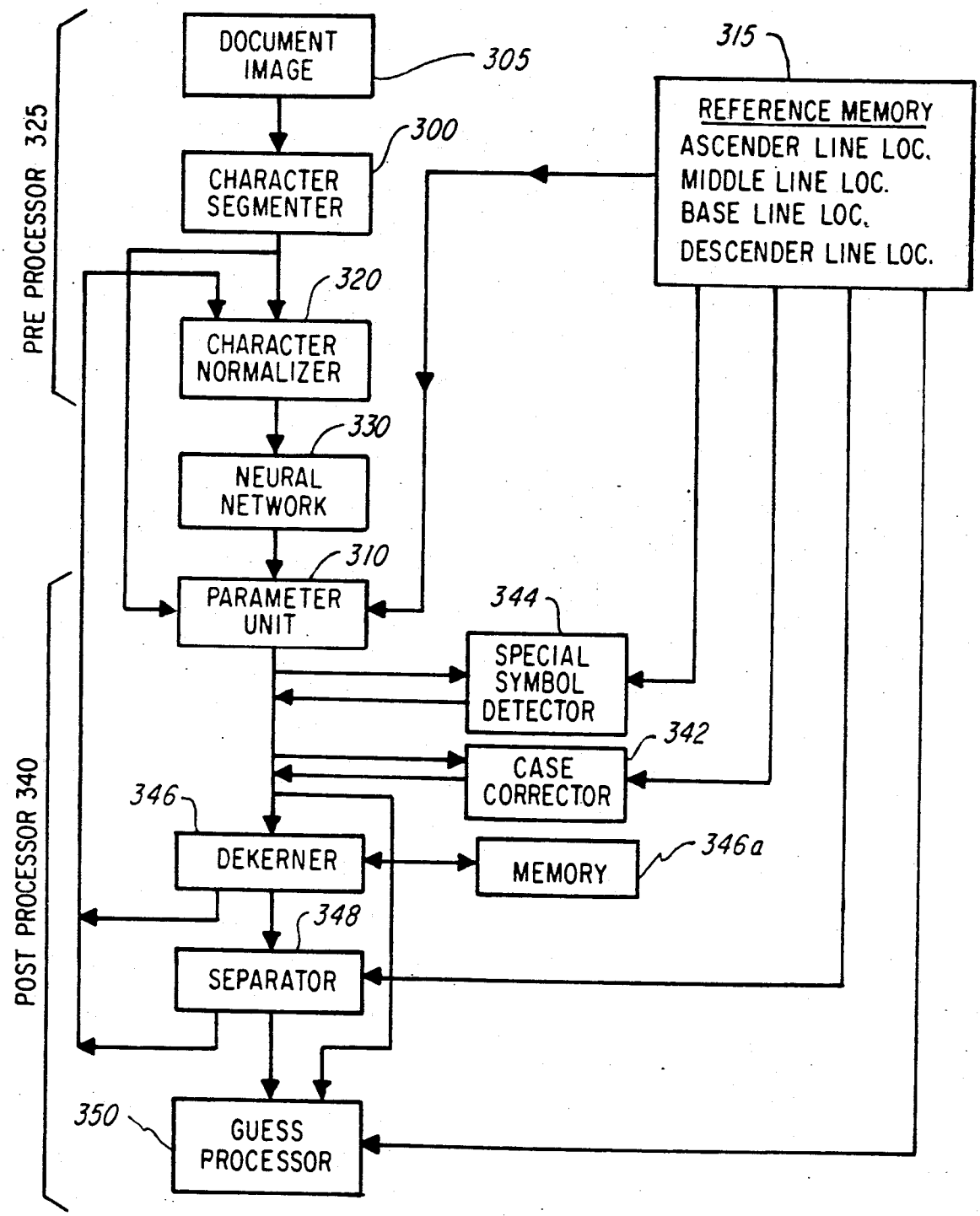
FIG. 3 is a block diagram of a preferred system embodying the invention.

System Overview:

An alternative embodiment of the invention is illustrated in the block diagram of FIG. 2. An optical character recognition system 200 consists of a preprocessor 205 comprising a connected component analyzer 210 and a character normalizer 215, a character recognition neural network 220 and a post processor 225 which performs case confusion correction. The connected component analyzer 210 separates each of the character images from the image of the whole document. Using connected component analysis, the analyzer 210 separates the images of adjacent characters from one another even in those cases where the characters are kerned. The character normalizer 215 determines the number of horizontal rows of pixels and vertical columns of pixels occupied by the individual character image furnished by the analyzer 210. If the number of horizontal rows and vertical columns of pixels occupied by the character image or object is different from the image size required by the neural network 220, the normalizer 215 generates a normalized character image based upon the old one but which occupies the desired number of horizontal rows and vertical columns of pixels. The neural network 220 generates from the normalized character image a different score for each symbol in the set of symbols which it has been trained to recognize. The neural network 220 then declares the symbol with the highest score to be the one represented by the character image. The post-processor 225 determines whether the symbol thus identified by the neural network is one whose upper and lower case versions are identical in shape and which are therefore distinguished from one another only by a difference in size. (Such a size difference is, of course, lost during the character normalization process performed by the character normalizer 215.) If so, the post-processor 225 determines whether the present symbol is upper or lower case by referring to the size of the original (unnormalized) image transmitted by the connected component analyzer 210 to the character normalizer 215. In anticipation of such an eventuality, the original image is stored in a memory 230 at the time it is transmitted by the analyzer 210 to the normalizer 215. Thus, the post-processor 22 merely determines the size of the image stored in the memory 230. A large size indicates an upper case symbol while a smaller size indicates a lower case symbol. If correction is found to be necessary, the post-processor 225 replaces the symbol furnished by the neural network 220 with the symbol of the proper case. Each of the elements of FIG. 2 will be discussed in greater detail below in connection with the preferred embodiment of the invention illustrated in FIG. 3.

Referring now to FIG. 3, the preferred embodiment of the invention includes a character segmenter 300 which segments a document image 305 into a plurality of separate character images, employing well-known techniques such as histogramming along horizontal rows and vertical columns of the image. Each character image is sent individually to a character parameter unit 310 which computes the parameters of each character image, such as character height, for example. Such parameters are stored in a memory 315 for use by other components of the system of FIG. 3. The individual character image is then normalized to a pre-determined size and aspect ratio by a character normalizer 320 using well-known techniques. In the preferred embodiment, the normalized character image consists of 12 vertical columns and 24 horizontal rows of binary pixels. The character normalizer may, for example, be of the type disclosed in U.S. patent application Ser. No. 439,222 filed Nov. 20, 1989 by Louis J. Beato entitled "Character Normalization Using an Elliptical Sampling Window for Optical Character Recognition" and assigned to the assignee of the present application. The segmenter 300, the character parameter unit 310, the memory 315 and the character normalizer 320 constitute the pre-processor 325 of the preferred embodiment of FIG. 3.

The pre-processor 325 transmits the normalized character image to the input of a neural network 330. The neural network 330 has been trained to recognize each of the symbols of a pre-determined set. The neural network 330 generates a different score for the normalized image for each one of the symbols in the pre-determined set and declares the symbol with the highest score to be the one represented by the character image. The neural network 330 transmits the identity and the corresponding scores of the first, second and third highest scoring symbols for the current character image to a post-processor 340. The post-processor 340 determines whether the symbol identification made by the neural network 330 is reliable. In those cases where it is not, the post-processor 340 performs correctional or remedial tasks in order to find a more reliable choice of symbol for the present character image.

A case corrector 342 in the post-processor 340 performs the task of correcting the case (upper or lower) of those symbols whose case identification is ambiguous after character normalization. The task was described hereinabove in connection with the post-processor 225 of FIG. 2. However, the case corrector 342 of FIG. 3 does not compute the character size from the original character image in order to determine the proper case of the symbol identified by the neural network, but merely refers to the size of the original character image previously computed by the character parameter unit 310 and stored in the memory 315.

A special symbol detector 344 determines whether the original character image size indicates that the character represented is not one which the neural network was trained to recognize. Such a symbol may be, for example, a comma or a period or any other symbol whose unnormalized image is indistinguishable from certain symbols in the neural network's symbol set. (The normalized image of a period may be confused with an "O". In such a case, the special symbol detector determines the identity of the character image.

A dekerner 346 separates adjacent character images in the document image 305 which may be kerned. Preferably, the dekerner 346 employs connected component analysis. Whenever the dekerner 346 succeeds in separating one character image into two or more character images, the resulting images are fed back to the input of the character normalizer 320 for eventual processing by the neural network 330.

A touching character separator 348 separates adjacent character images in the document image which are actually touching and which are therefore not readily susceptible of separation either by the segmenter 300 or by the dekerner 346. Whenever the separator 348 succeeds in separating one character image into two or more character images, the resulting images are fed back to the input of the character normalizer 320 for eventual processing by the neural network 330. In those special cases where an unreliable character identification made by the neural network is not corrected by any one of the foregoing elements of the post-processor 340, a guess processor 350 takes into account all of the character parameters stored in the memory 315 for the current character image and thereby determines the best guess for the symbol identity of the current character image.

Figure 4:
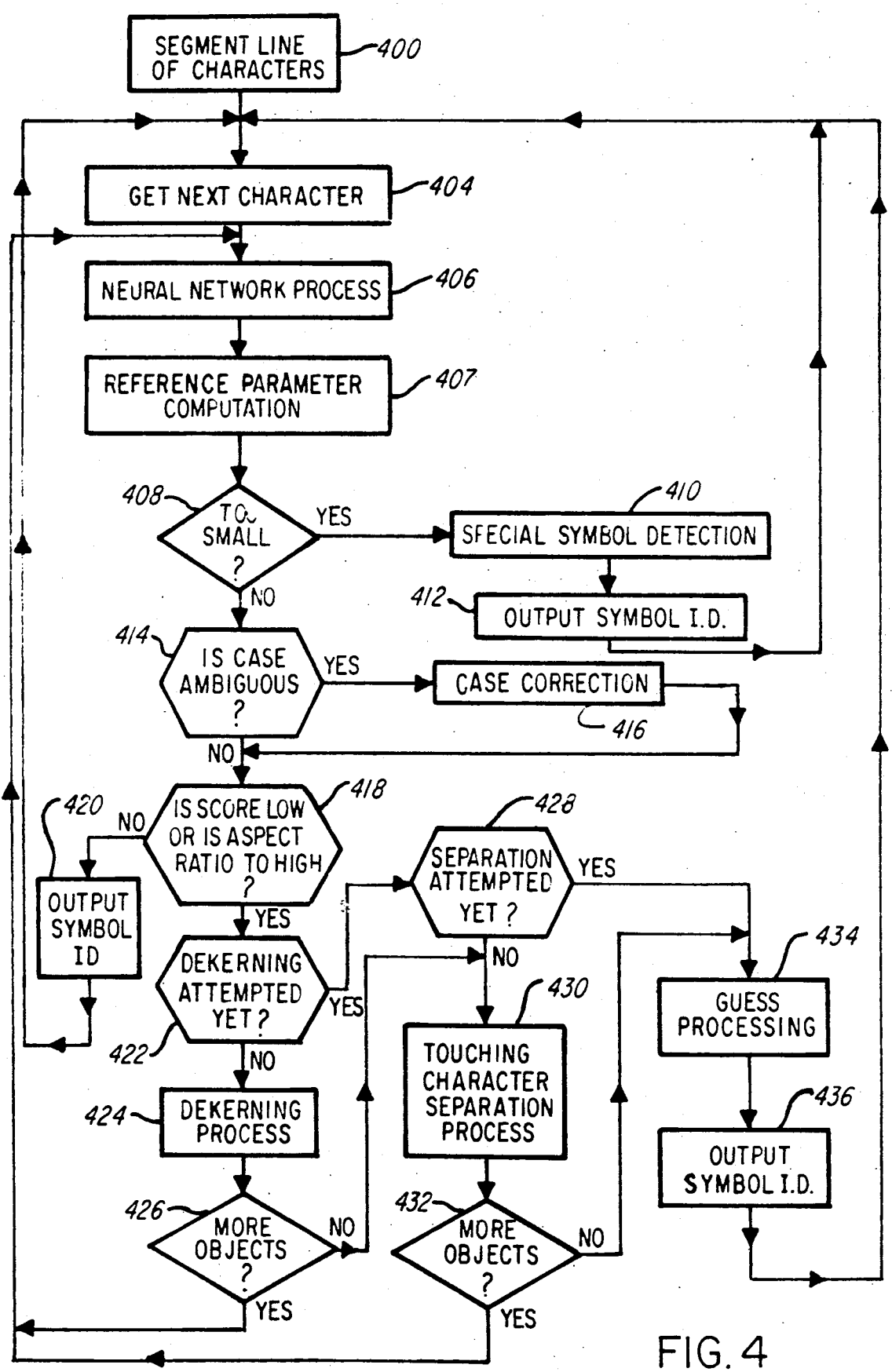
FIG. 4 is a flow diagram illustrating the operation of the system of FIG. 3.

The operation of the system of FIG. 3 will now be generally described with reference to the operational flow diagram of FIG. 4. FIG. 4 illustrates in chronological sequence how the system of FIG. 3 processes each horizontal row or line of individual character images in the document image 305. First, the character segmenter 300 receives a row of character images and begins separating individual character images in that row (block 400 of FIG. 4). After all of the character images in the current row have been thus processed by the segmenter 300, they are each sent one at a time to the character normalizer 320 (block 404 of FIG. 4). The normalized version of the character image is processed by the neural network 330, which identifies a symbol presumably represented by the character image (block 406 of FIG. 4). The reference parameter unit 310 computes the various parameters (such as height and area) of the object consisting of contiguous "on" pixels in the character image and stores them in the memory 315 (block 407 of FIG. 4). Whether the choice of symbol made by the neural network 330 must be corrected is then determined by the post-processor 340. First, the special symbol detector 344 determines whether the area or height—stored in the memory 315—of the original (unnormalized) character image was below a predetermined threshold (block 408 of FIG. 4). If so (YES branch of block 408), the special symbol detector 344 overrides the decision of the neural network, detects the special symbol which the character image actually represents (block 410 of FIG. 4) and outputs the correct symbol identification (block 412 of FIG. 4). Otherwise (NO branch of block 408), the case corrector 342 determines whether the symbol identified by the neural network 330 is one whose case is ambiguous (block 414 of FIG. 4). If so (YES branch of block 414), the case corrector 342 ascertains the case (upper or lower) from the size or area—stored in the memory 315—of the original (unnormalized) character image (block 416 of FIG. 4). Otherwise (NO branch of block 414), the case corrector 342 is bypassed. Next, a determination is made whether the score computed by the neural network for the symbol associated with the current character image is below a predetermined threshold of reliability or whether the character image aspect ratio is too high (block 418 of FIG. 4). If not (NO branch of block 418), the neural network's symbol identification is deemed to be reliable and it is transmitted as a final result (block 420 of FIG. 4). Otherwise (YES branch of block 418), an assumption is made that the low score or high aspect ratio is due to a failure by the segmenter 300 to separate two (or more) adjacent character images in the document image 305. In this case, a determination is first made whether dekerning of the current character image has already been attempted (block 422 of FIG. 4). If not, the dekerner 346 attempts to separate the character image into two or more separate images (block 424). If it succeeds in creating more separate objects out of the current character image (YES branch of block 426 of FIG. 4), the resulting new character images are fed back one at a time to the input of the character normalizer so that the new images are each subjected to the foregoing process. If the dekerner 346 fails to separate the current character image into two separate images (NO branch of block 426), the character image is sent to the touching character separator 348. However, if dekerning of the current character image has already been attempted (YES branch of block 422), a determination is made whether a touching character separation process has been performed on the current character image by the separator 348 (block 428 of FIG. 4). If not (NO branch of block 428), the separator 348 performs its touching character separation process on the current character image (block 430 of FIG. 4). If the touching character separation process succeeds in separating the current character image into two (YES branch of block 432 of FIG. 4), the resulting new character images are fed back one at a time to the input of the character normalizer 320 so that the new character images are each subjected to the foregoing process. If the touching character separation process fails to separate the current character image into two separate objects (NO branch of block 432), the current character image is sent to the guess processor 350. However, if the touching character separation process has already been performed on the current character image (YES branch of block 428), the separator 348 is bypassed and the current character image is sent directly to the guess processor 350. The guess processor 350 attempts to correct the symbol identification made by the neural network 330 (block 434 of FIG. 4) and outputs its best guess of the proper symbol identification of the current character image (block 436 of FIG. 4). Whenever a final symbol identification is made by the post-processor 340 (either block 412, block 420 or block 436 of FIG. 4), the next character image in the current row is sent to the input of the character normalizer 320 (block 404) to begin the next cycle of the operation.

Each of the elements in the system of FIG. 3 will now be described in detail below.

Character Segmenter

The character segmenter 300 separates adjacent characters in the binary image of a document to generate individual character images. It does this using the well-known histogramming technique which, in essence, simply looks for a horizontal row or vertical column of pixels in which all of the pixels are "off". Such a row or column is treated as a boundary separating two adjacent objects comprising contiguous "on" pixels. For example, the document image 305 may look like the binary image illustrated in FIG. 5 comprising a raster of 24 vertical columns and horizontal rows of binary pixels. The "on" pixels for the image of an "a" 505 and a "b" 510 are separated only by a vertical column 515 of "off" pixels. The segmenter 300 uses the location of the column 515 of "off" pixels to separate the two objects 505 and 510 to generate the individual binary character image of the "b" object 510 of contiguous "on" pixels illustrated in FIG. 6. Since the process performed by the segmenter 300 is well-known in the art, no further description is necessary here.

Character Parameter Unit

The character parameter unit inspects the individual character image, such as that of FIG. 6, produced by the segmenter 300, and counts the number of pixels in the tallest column of "on" pixels in the image as well as the number of pixels in the longest row of "on" pixels in the image. These numbers are the height and width of the character image, respectively. The character parameter unit also determines certain parameters illustrated in FIG. 7 which are characteristic of all of the characters in the current row of characters. The parameters are measured relative to a baseline 700 which is common to all of the characters in the current row. A middle line 705 is the top of the average small letter such as "a". An ascender line 710 is the top of the average tall letter such as "1" or "j". A descender line 715 is the bottom of letters having downward-pointing extensions, such as "j", "y" or "p". The parameter unit 310 measures each of the parameters, including the height and width of the current character image, and the locations of the middle line 705, the ascender line 710 and the descender line 715 relative to the baseline 700 characteristic of all of the characters in the current row using techniques well-known in the art, which need not be elaborated here.

Figure 7:
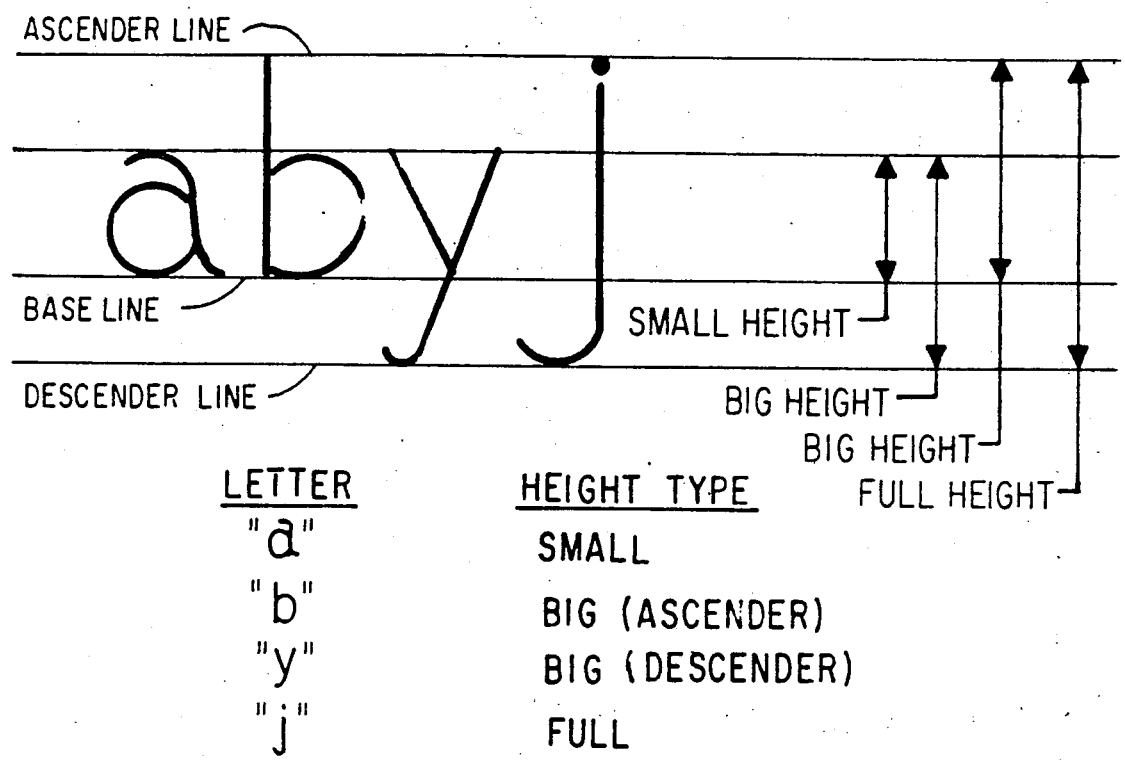
FIG. 7 is a diagram illustrating the different symbol height classifications employed in the invention.
Figure 8:
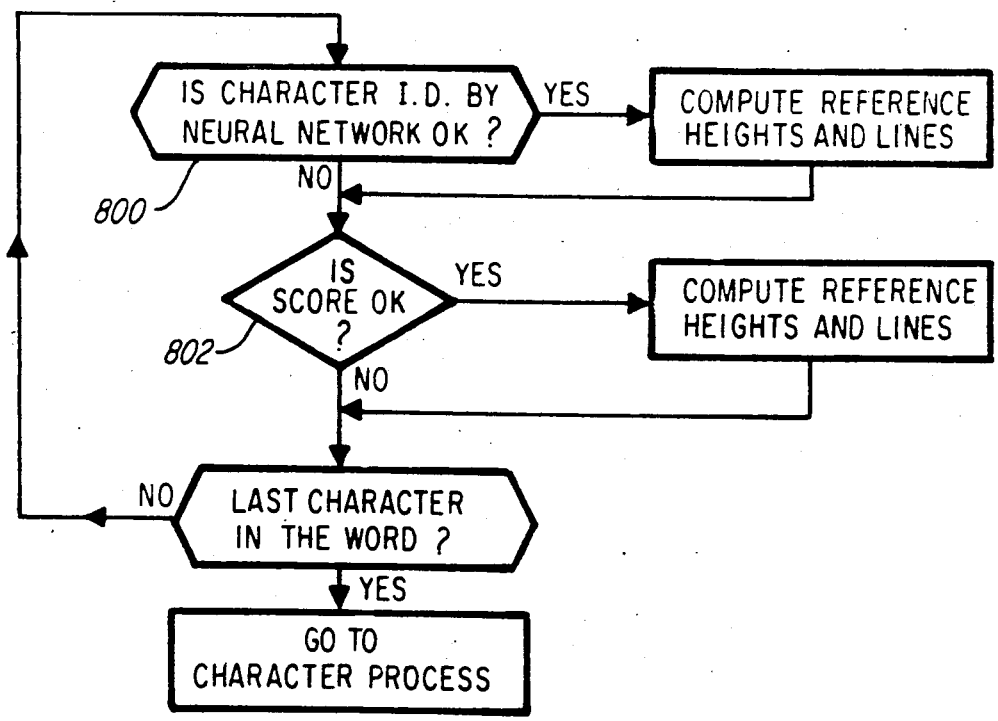
FIG. 8 is a flow diagram illustrating the operation of a reference parameter unit in the system of FIG. 3.

Operation of the character reference parameter unit 310 is illustrated in the flow diagram of FIG. 8. The reference parameter unit 310 receives the original (unnormalized) character image from the segmenter 300 as well as the corresponding score of the symbol identified by the neural network 330. A determination is made whether the neural network's identification of a symbol for the character image is "final" in the sense that it has successfully passed the test leading to block 420 of FIG. 4. This determination corresponds to block 800 of FIG. 8. If so (YES branch of block 800), the reference parameter unit 310 determines the middle line height, the ascender line height and the descender line height (illustrated in FIG. 7) of the current character image relative to its base line. Otherwise (NO branch of block 800), a determination is made whether the score generated by the neural network is sufficiently high to indicate the choice of symbol made by the neural network is reliable. This latter determination corresponds to block 802 of FIG. 8. If so (YES branch of block 802), the reference parameter unit 310 determines the middle line height, the ascender line height and the descender line height (illustrated in FIG. 7) of the current character image relative to its base line. Otherwise (NO branch of block 802), the current character image is bypassed by the reference parameter unit, which repeats the foregoing process for the next character image. The reference parameter unit 310 was implemented by the C language computer program in Appendix A-1 and Appendix A-2 attached to this specification. The program of Appendix A-2 creates character data structures from the image which are used by the program of Appendix A-1 to calculate the reference values discussed above in connection with the reference parameter unit 310. In addition, the program of Appendix A-1 implements the functions of the case corrector 342 and of the special symbol detector 344 discussed below.

Character Normalizer

Figure 9:
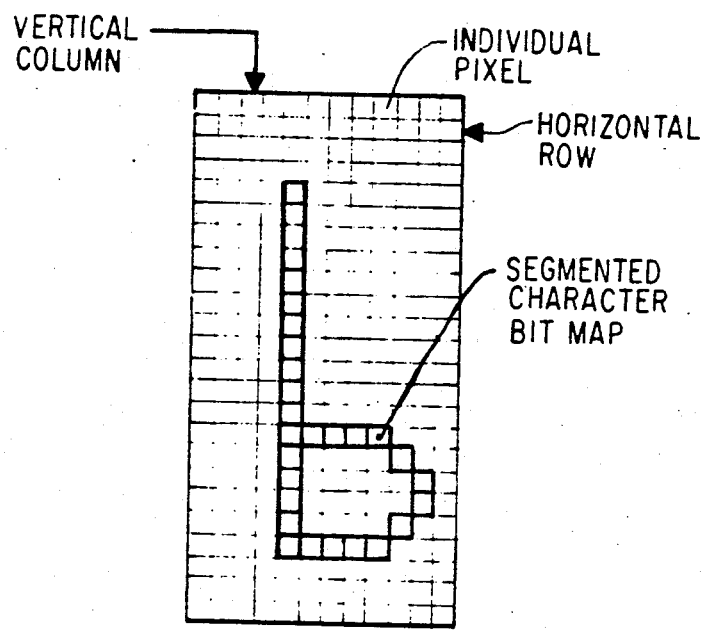
FIG. 9 is a diagram illustrating the unnormalized version of the character image of FIG. 6 produced by a character normalizer in the system of FIG. 3.

The character normalizer 320 changes the size and/or aspect ratio of the original character image, as necessary. For example, a neural network was employed in the invention which was trained to recognize character images comprising 12 columns and 24 rows of binary pixels, such as the character image illustrated in FIG. 9. The example of the original character image of FIG. 6 does not conform to this shape and is squat by comparison. The character normalizer 320 changes the shape so that it conforms with the 12 column, 24 row binary image required by the neural network 330. The result is illustrated in FIG. 9, in which the normalized image of the letter "b" is taller and skinnier than the original of FIG. 6. The character normalizer may be of the type described in U.S. patent application Ser. No. 439,222 filed Nov. 29, 1989 by Louis J. Beato entitled "Character Normalization Using an Elliptical Sampling Window for Optical Character Recognition" and assigned to the assignee of the present application, the disclosure of which is incorporated herein by reference.

Neural Network

Figure 10:
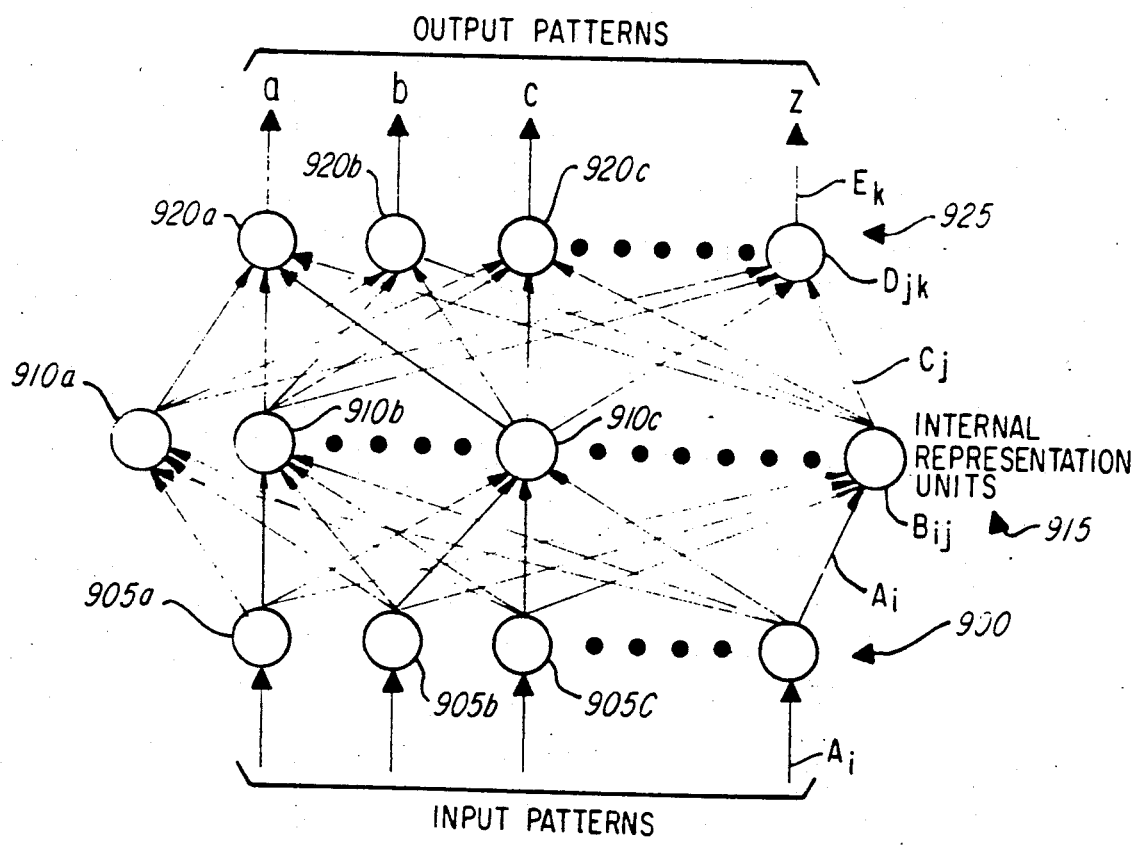
FIG. 10 is a simplified diagram of a typical portion of the neural network in the system of FIG. 3.

The block diagram of FIG. 10 illustrates a typical portion of the neural network 330 of FIG. 3. The network 330 has an input layer 900 comprising about 288 input nodes 905a, 905b, 905c, etc. Each input node 905 is connected to a particular one of the 288 binary pixels in the normalized 12×24 character image of FIG. 9. All of the input nodes 905 are connected individually to each of 75 neurons 910a, 910b, 910c, etc. in a so-called hidden layer 915. Each input node 905 simply passes along the binary state of the particular character image pixel to which it is connected to each one of the hidden layer neurons 910. As will be described in somewhat greater detail below in this specification, each one of the neurons 910 performs an arithmetic activation function using all of its 288 binary inputs to generate an output. The outputs of all 75 hidden layer neurons 910 are connected to each one of 51 neurons 920a, 920b, 920c, etc. in an output layer 925. Each of the 51 neurons 920 corresponds to one of 51 alphanumeric symbols which the neural network 330 has been trained to recognize. (Such training will be defined below.) Each one of the 51 neurons 920 performs an arithmetic activation function using all the 75 outputs from the hidden layer 915 to generate its own final output. The final output is a score and is analogous to the correlation between the normalized character image received at the input layer 900 and the symbol associated with the neuron 920 which generated the score. Thus, for each character image received at the input layer 900, 51 scores are generated at the output layer 925 by the 51 output neurons 920. The symbol associated with the output neuron which generated the highest score is declared to be the symbol represented by the character image received at the input layer 900.

The simplest example of a neural network is one in which the activation function performed by each neuron is merely the sum of the products of the inputs with the respective coefficients of the neuron. Referring to FIG. 10, in this simplified example, a binary input $A_i$ is received at the $i^{th}$ one of the 288 input nodes 905 and is transmitted therefrom to all of the 75 neurons 910 in the hidden layer 915. The $j^{th}$ one of the neurons 910 in the hidden layer 915 multiplies the $i^{th}$ one of the inputs $A_i$ by a coefficient $B_{ij}$, and then generates an output $C_j$ equal to the sum of all 288 products $A_i B_{ij}$. Thus, $$C_j = \sum_i A_i B_{ij}. \tag{1}$$

In similar fashion, the $k^{th}$ one of the output neurons 920 in the output layer 925 multiplies the $j_{th}$ one of the outputs $C_j$ received from the hidden layer 915 by a coefficient $D_{jk}$, and then generates an output score $E_k$ equal to the sum of all the products $C_j D_{jk}$. Thus, $$E_k = \sum_j C_j D_{jk}. \tag{2}$$

In order to obtain the 51 output scores $E_k$ in terms of the 288 binary inputs $A_i$, equation (1) is substituted into equation (2) to obtain:

$$E_k = \sum_i \sum_j D_{jk} B_{ij} A_i. \tag{3}$$

While the operation of such a simple neural network is readily summarized by equation (3), it is not stable due to the linearity of the simple sum-of-products activation function performed by each neuron, as is well-known in the art. Stability is achieved if a non-linear activation function is employed instead. Specifically, the activation function for each neuron in the middle layer 915 is:

$$C_j = \left[ 1 + \exp\left( -\sum_i (A_i B_{ij} + \Theta_j) \right) \right]. \tag{4}$$

while the activation function for each neuron in the output layer 925 is:

$$E_k = \left[ 1 + \exp\left( -\sum_j (C_j D_{jk} + \Theta_k) \right) \right]. \tag{5}$$

As will be discussed in detail below, the coefficients $B_{ij}$ and $D_{jk}$ are learned during the course of a training process performed by the neural network in which the 288 binary pixels of each normalized character image in a known symbol set is applied to the 288 input nodes 905. During this training process, the terms $\Theta_j$ and $\Theta_k$ in equations (4) and (5) above are learned as the outputs of a fictional neuron in the input layer and in the hidden layer, respectively, which is unconnected to the previous layer but which constantly outputs an "on" signal to the next layer. This technique is well-known in the art. The optical character recognition neural network described above was implemented using the C language computer program attached to this specification as Appendix B.

The training of the neural network will now be qualitatively described. The 12×24 character image of each symbol to be recognized by the neural network is applied to the 288 input nodes 905 many times in an iterative learning process. Each time the character image is applied, the output of each neuron 920 in the output layer is compared with the desired pattern to obtain an error. The desired pattern, of course, is one in which only the particular output neuron (e.g., the neuron 920c) assigned to the symbol represented by the applied character image produces a score of unity while all other output neurons produce a score of zero. For the $k^{th}$ output neuron, the desired score is denoted $t_k$ while its actual output score is denoted $o_k$. The error $\delta_k$ for the $k^{th}$ output neuron is defined as:

$$\delta_k = (t_k - o_k)(\delta o_k/\delta(net_k)), \quad (6)$$

where $\delta o_k/\delta(net_k)$ is the partial derivative of the output neuron activation function of equation (5) above with respect to the actual output $o_k$.

Following each application of known character image to the input layer 900, the error $\delta_k$ is computed for each output neuron 920, as well as the magnitude of each of the 75 inputs $I_j$ received by each output neuron 920 from the hidden layer 915. Each of the coefficients $D_{jk}$ employed by the $k^{th}$ output neuron is changed by an iterative amount $D_{jk}$ which is defined as:

$$D_{jk} = \delta_k I_j + \alpha D_{jk}', \quad (7)$$

where $\alpha$ is a constant of proportionality less than unity representing the learning rate of the training process, $\delta_k$ and $I_j$ are as defined above, while $D_{jk}'$ is the amount by which $D_{jk}$ was changed during the preceding iteration and $\alpha$ is a momentum term contributing to the stability of the learning process. In the present invention, $\alpha$ was 0.9 approximately.

The coefficients $B_{ij}$ of the hidden layer neurons 910 are learned during the same process using definitions similar to those as given above. However, the error $\delta_i$ for each hidden layer neuron is defined differently in accordance with the following recursive relationship:

$$\delta_j = \left(\delta o_j/\delta(net_j)\right)\left(\sum_k \delta_k D_{jk}\right). \quad (8)$$

Accordingly, the coefficients $B_{ij}$ of the $j^{th}$ one of the hidden layer neurons 910 are changed with each application of the known character image to the input layer 900 by an amount $\delta B_{ij}$ defined as follows:

$$B_{ij} = \delta_j A_i. \quad (9)$$

Each of the terms on the right hand side of equation (9) have been defined above.

The overall training process is performed by repeatedly applying a known character image to the input layer 900 of the neural network and changing the coefficients of each neuron in accordance with equations (7) and (9) above, until the desired pattern of 51 output scores is achieved for that character image. The process is repeated for the next known character image until all character images representing a set of alphanumeric symbols has been thus processed. Such a training process was implemented using the C language program attached to the specification as Appendix C.

Special Symbol Detector

Figure 11:
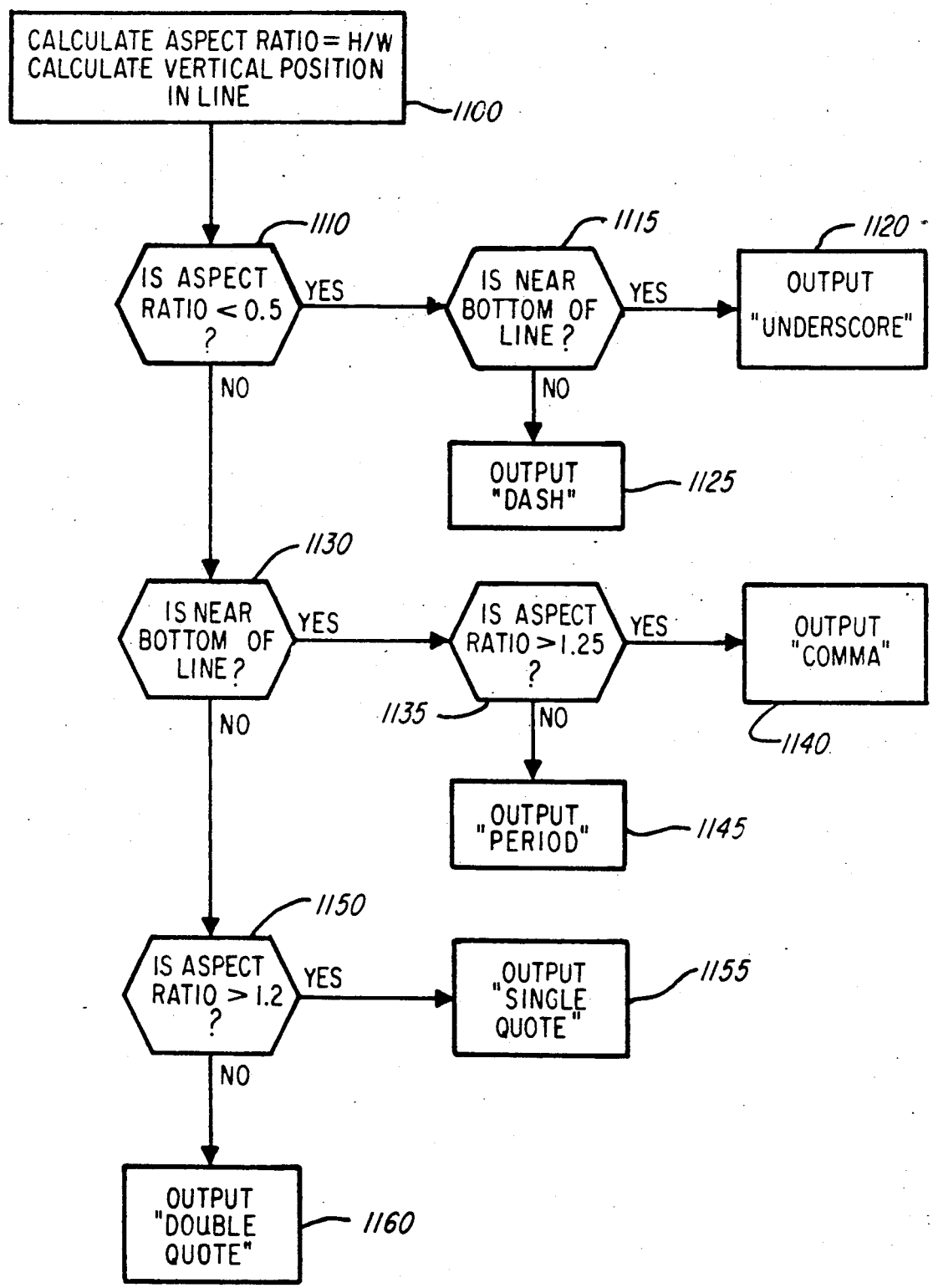
FIG. 11 is a flow diagram illustrating the operation of the special symbol detector in the system of FIG. 3.

The operation of the special symbol detector 344 of FIG. 3 is illustrated in the flow diagram of FIG. 11. Initially, the character reference parameter unit 310 determines the height and width of the object of contiguous "on" pixels in the original character image as well as its position with respect to the baseline location of all characters in the current row and stores these parameters in the memory 315 discussed previously herein (block 1100 of FIG. 11). The special symbol detector 344 first determines whether the aspect ratio (of the height to the width of the character object) is less than 0.5 (block 1110 of FIG. 11). If so (YES branch of block 1110), the detector 344 determines whether the character object is located near the bottom or descender line (block 1115 of FIG. 11). If so (YES branch of block 1115), the special symbol detector 344 identifies the character image as an underscore symbol (_) (block 1120 of FIG. 11). Otherwise (NO branch of block 1115), the special symbol detector identifies the character image as a dash (—) (block 1125 of FIG. 11). If the aspect ratio is not less than 0.5 (NO branch of block 1110), the detector 344 determines whether the character object is near the bottom or descender line location (block 1130 of FIG. 11). If so (YES branch of block 1130), the detector 344 determines whether or not the aspect ratio of the character object is greater than 1.25 (block 1135 of FIG. 11). If so (YES branch of block 1135), the detector 344 identifies the character image as a comma (,) (block 1140 of FIG. 11). Otherwise (NO branch of block 1135), the detector 344 identifies the character image as a period (.) (block 1145 of FIG. 11). If the determination of block 1130 was in the negative (NO branch of block 1130), the detector 344 next determines whether the aspect ratio of the character object is greater than 1.2 (block 1150). If so (YES branch of block 1150), the detector identifies the character image as a single quote symbol (') (block 1155 of FIG. 11). Otherwise (NO branch of block 1150), the detector 344 identifies the character image as a double quote symbol (") (block 1160 of FIG. 11). This exhausts all reasonable possibilities and therefore concludes the process performed by the special symbol detector 344 for a given character image. It should be noted that whenever the detector 344 identifies the character image as a particular special symbol (such as in blocks 1120, 1125, 1140, 1145, 1155 or 1160), such an identification overrides the output of the neural network 330.

The special symbol detector 344 overrides the symbol identification made by the neural network 330 under the circumstances described above regardless of whether the neural network generated a very high score for the symbol so identified. Thus, the special symbol detector 344 is in one sense independent of the output of the neural network 330. However, the special symbol detector 344 depends indirectly upon the output of the neural network 330 because it relies upon the output of the reference parameter unit 310. The reference parameter unit 310 requires that symbols be identified reliably in order to compute the geometric features such as baseline location and the various character parameters relative thereto as described above.

Case Corrector

Figure 12:
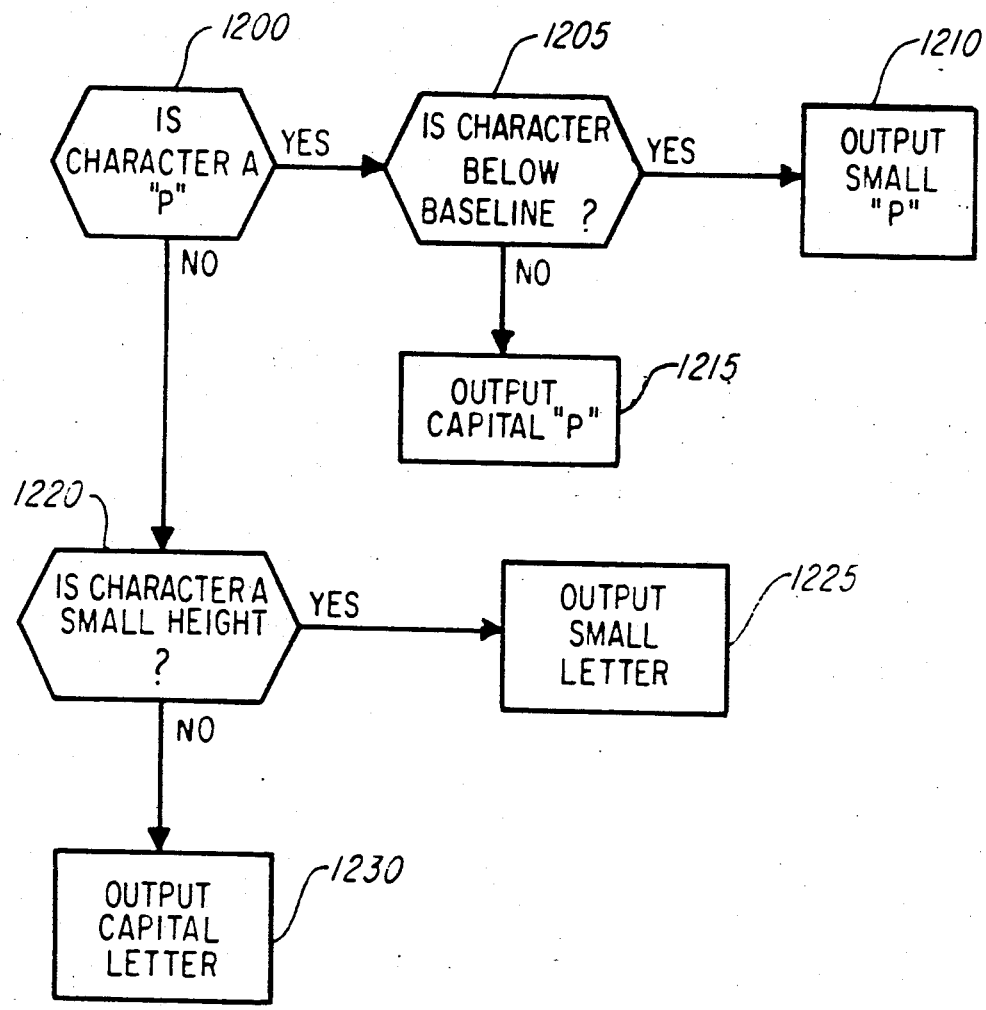
FIG. 12 is a flow diagram illustrating the operation of the case corrector in the system of FIG. 3.

The operation of the case corrector 342 is illustrated in the flow diagram of FIG. 12. The case corrector 342 first determines whether the neural network has identified the current character image as a letter "p" (block 1200 of FIG. 12). If so (YES branch of block 1200), the corrector 342 determines from the reference parameters stored in the memory 315 whether the object of contiguous "on" pixels in the original character image extended below the character baseline (block 1205 of FIG. 12). If so (YES branch of block 1205), the case corrector 342 identifies the character image as a lower case (small) letter "p" (block 1210 of FIG. 12). Otherwise (NO branch of block 1205), the corrector 342 identifies the character image as an upper case (capital) "P" (block 1215 of FIG. 12). If the symbol identified by the neural network 330 is not a "p" (NO branch of block 1200), the case corrector 342 next determines whether the object of contiguous pixels in the character image is of a small height, so that it does not extend above the middle line or below the base line as defined in FIG. 7 (block 1220 of FIG. 12). If so (YES branch of block 1220), the case corrector 342 determines that the case of the symbol identified by the neural network is lower case (small) (block 1225 of FIG. 12). Otherwise (NO branch of block 1220), the case corrector 342 determines that the case of the symbol identified by the neural network is upper case (large) (block 1230 of FIG. 12).

Dekerner

Figure 13:
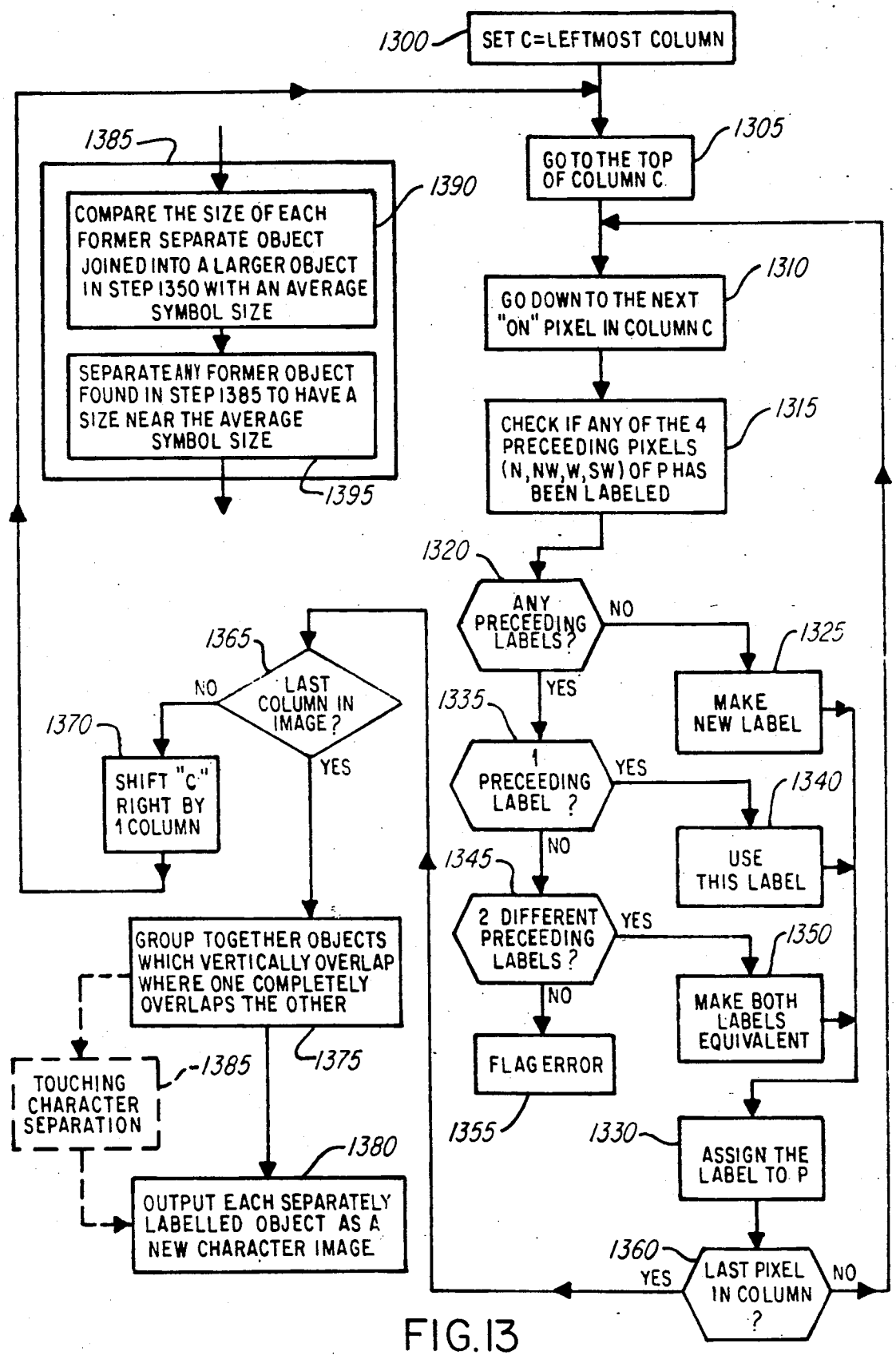
FIG. 13 is a flow diagram illustrating the operation of the dekerner in the system of FIG. 3.

The operation of the dekerner 346 of FIG. 3 is illustrated in the flow diagram of FIG. 13. As discussed previously in connection with FIG. 4, whenever the highest score generated by the neural network 330 for the current character image is too low to be reliable or the aspect ratio is too large, an assumption is made that the character image is really characters which the segmenter 300 failed to separate. The first attempt to separate the two characters in the image is made by the dekerner 346. The dekerner 346 will succeed in separating the individual characters in the present image if the characters are kerned in the manner illustrated in FIG. 1a for example.

Referring now to the operation illustrated in FIG. 3, the dekerner 346 processes the current character image (such as that illustrated in FIG. 9) by starting at the left-most vertical column of pixels (block 1300 of FIG. 13) and, beginning at the top of the column (block 1305 of FIG. 13) goes down the column to the first "on" pixel (block 1310 of FIG. 13). The dekerner 346 then determines whether any of the four preceding adjacent pixels are "on" and, if so, whether a label has been assigned to any such pixel (block 1315 of FIG. 13). The four preceding adjacent pixels are illustrated in FIG. 14 which is a diagram of a portion of the unnormalized image of FIG. 9. The current pixel is designated "p" in the diagram of FIG. 14 while the preceding adjacent pixels are geographically designated "NW", "N", "W" and "SW" respectively. If none of these four neighboring pixels have been labelled (NO branch of block 1320), then the next number on a list of integers is chosen as a new label (block 1325 of FIG. 13), and this label is assigned to the current pixel "p" in FIG. 14 (block 1330 of FIG. 13). The label as well as the location the "on" pixel to which it has been assigned is stored in a memory 346a (see FIG. 3) of the dekerner 346. On the other hand, if the contents of the memory 346a indicates that one or more of the preceding adjacent pixels has been previously labelled (YES branch of block 1320), and if there is only one such label (YES branch of block 1335 of FIG. 13), then the one label previously assigned is used as the current label (block 1340) which is applied to the current pixel (block 1330). However, if there is more than one previous label (NO branch of block 1335) and if in fact there are two (or more) labels already assigned to different ones of the preceding adjacent pixels (YES branch of block 1345 of FIG. 13), then both preceding labels are changed to the same number (block 1350 of FIG. 13) and this latter number is assigned as the label of the current pixel (block 1330). On the other hand, if at this point the dekerner 346 finds more than two previous labels (NO branch of block 1345), an error is flagged (block 1355 of FIG. 13).

After the current pixel "p" (FIG. 14) has been labelled in block 1330, the dekerner 346 determines whether this was the last (bottom-most) of the "on" pixels in the current column of pixels in the unnormalized character image of FIG. 9 (block 1360 of FIG. 13). If not (NO branch of block 1360), the dekerner 346 goes down to the next pixel in the column (block 1310) and resumes the foregoing process. Otherwise, if it is the last "on" pixel in the column (YES branch of block 1360), the dekerner next determines whether the current column is the last (right-most) column in the character image (block 1365 of FIG. 13). If not (NO branch of block 1365), the dekerner 346 moves leftward to the next vertical column in the character image (block 1370 of FIG. 13), goes to the top of the new column (block 1305) and resumes the foregoing process. Otherwise (YES branch of block 1365), the processing of the current character image in finished. The foregoing process is connected component analysis. A system which performs such analysis is disclosed in connection with FIG. 7 of U.S. patent application Ser. No. 444,355 filed Dec. 1, 1989 by Louis J. Beato entitled "Bi-tonal Image Non-Text Matter Removal with Run Length and Connected Component Analysis" and assigned to the assignee of the present application, the disclosure of which is incorporated herein by reference.

Next, the dekerner 346 rejoins any sub-objects which were improperly labelled with a new label in the foregoing process, such as the dot over a letter i or j or the dot over a colon (:) or semi-colon (;) (block 1375 of FIG. 13). This step requires that one of the sub-objects completely overlaps the other. It does this by rejoining to the preceding object from which it was separated any such sub-object whose size (number of contiguous "on" pixels) is less than a threshold number. The threshold number depends, of course, upon the number of pixels typically occupied by such a dot. Finally, the dekerner 346 outputs each separately labelled object of contiguous "on" pixels (block 1380 of FIG. 13).

In the alternative embodiment of the invention described above with reference to FIG. 2, the connected component analyzer 210 of FIG. 2 performs the process of FIG. 13, with an additional step of block 1385 interposed between the steps of blocks 1375 and 1380 as indicated in dashed line in FIG. 13. The additional step of block 1385 enables the connected component analyzer to separate touching symbols in the character image at least to a significant extent. Specifically, after the objects have been defined in the step of block 1375, the touching character separation step of block 1385 proceeds as follows. First, the size of each separately labelled object which was joined as a sub-object in the step of block 1350 to a larger object is compared with the average size of the symbols in the document (block 1390). Then, if any such sub-object found to have a size within a predetermined threshold of the average size of a symbol in the document is separated from the larger object and restored to its former status as an individual object with its own label (block 1395).

Overview of the Touching Character Separator

The operation of the touching character separator 348 is illustrated generally in the flow diagram of FIG. 15. The character image received by the touching character separator 348 is subjected sequentially to nine different splitting processes in a unique logical sequence. First, the touching character separator 348 attempts to find a point at which to split the character image into two images at the bottom of the image (block 1510 of FIG. 15). This operation will be described in detail later in this specification. If this attempt to split the character image fails, the separator 348 next attempts to find within the current character image a symbol such as C, 0, G or Q which may be split in a unique manner to be described later in this specification (block 1515 of FIG. 15). If this latter attempt to split the character image fails, then the separator 348 attempts to find within the character image a symbol such as F, T or E which may be split in yet another unique manner to be described later in this specification (block 1520 of FIG. 15). If this latest attempt to split the character image fails, then the separator 348 attempts to find a region at the top of the character image at which the image may be split (block 1525 of FIG. 15). If this attempt fails, then the separator 348 attempts to split the character image simultaneously at its top and bottom (block 1530 of FIG. 15). If this latter attempt fails, then the separator 348 attempts to find within the character image a symbol such as V or W which may be split in yet another unique manner to be described in detail later in this specification (block 1535). If this latest attempt to split the character image fails, then the separator 348 attempts to find within the character image a symbol pattern such as 00 which may be split in still another unique manner to be described in detail later in this specification (block 1540). If this latter attempt to split the character image fails, then the separator 348 attempts to find within the character image the symbol f which permits splitting in a still further unique manner which will be described later in this specification (block 1545 of FIG. 15). If this penultimate attempt to split the character image also fails, then the separator 348 attempts to find any one of a set of miscellaneous special conditions in the image which permit the character image to be split in a corresponding unique manner to be described later in this specification (block 1550 of FIG. 15). If this final attempt fails, then the separator fails to split the character image (block 1555 of FIG. 15). The detailed operations corresponding to the blocks 1510, 1515, 1520, 1525, 1530, 1535, 1540, 1545 and 1550 of FIG. 15 are described later in this specification with reference to FIGS. 16, 17, 18, 19, 20, 21, 22, 23 and 24, respectively.

Returning now to FIG. 15, if any one of the splitting processes of blocks 1510 through 1550 referred to above actually succeeds in splitting the character image, it generates a pair of split images from the original image. Construction of the split images is described below with reference to FIG. 25. The resulting split images are fed back one at a time to the input of the character normalizer 320 for processing by the neural network 330 (block 1565 of FIG. 15). The results generated by the neural network 330 from the pair of split character images are analyzed in a check split operation (block 1570 of FIG. 15) in which the touching character separator 348 makes sure that it has not accidently split a "good" symbol. The "check split" operation of block 1570 is described in detail later in this specification with reference to FIGS. 26 and 27.

Guess Processor

Figure 28:
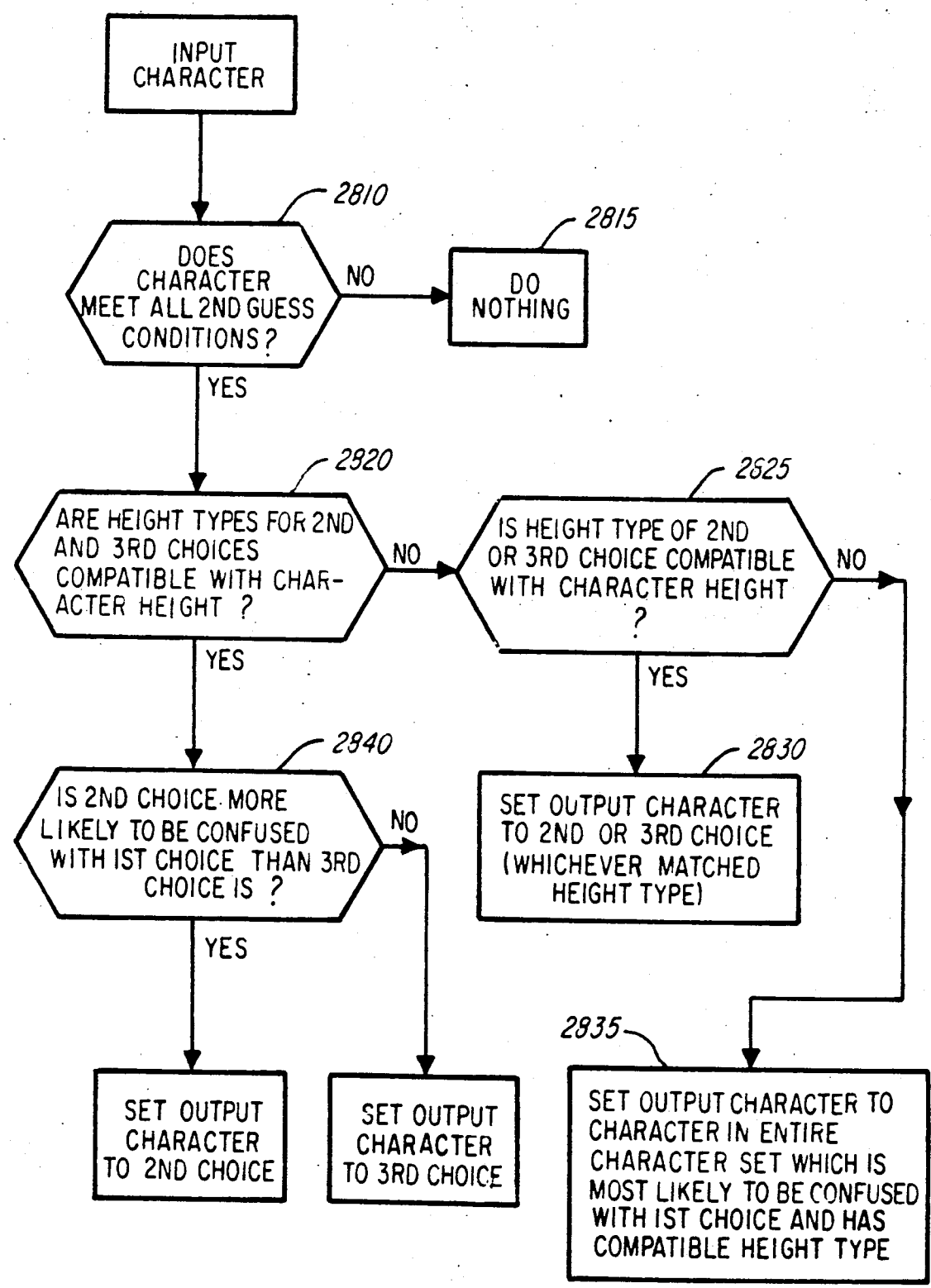
FIG. 28 is a flow diagram illustrating the operation of the guess processor in the system of FIG. 3.

As described above in connection with FIG. 3, if both the dekerner 346 and the touching character separator 348 fail to split the current character image into two images, then the character image is passed along to the guess processor 350. At this point, the assumption that the apparent unreliability of the symbol choice made by the neural network 330 (as indicated by a low score) was due to a failure to separate kerned or touching characters is dispensed with. Instead, the system now assumes that the apparent unreliability of the neural network's symbol choice is simply due to a failure to pick the correct symbol, and furthermore that the correct symbol is really one of the lower-scoring choices. The guess processor 350 surveys the first, second and third highest scoring symbol choices made by the neural network 330 and attempts to find a rationale for replacing the first choice with one of the lower-scoring symbol choices. Its operation is now described in detail with reference to the flow diagram of FIG. 28.

Figure 29A:
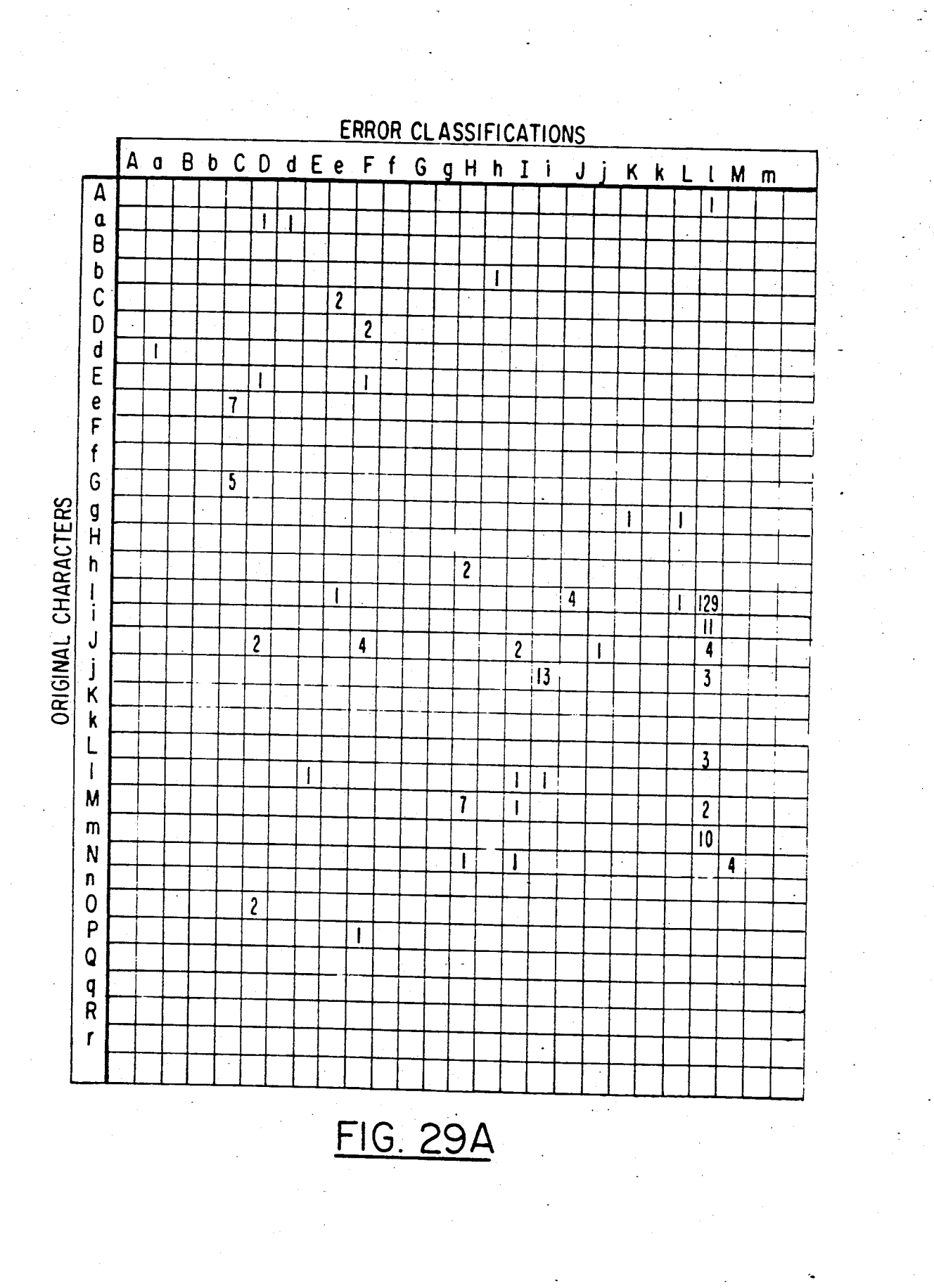
Figure 29C:
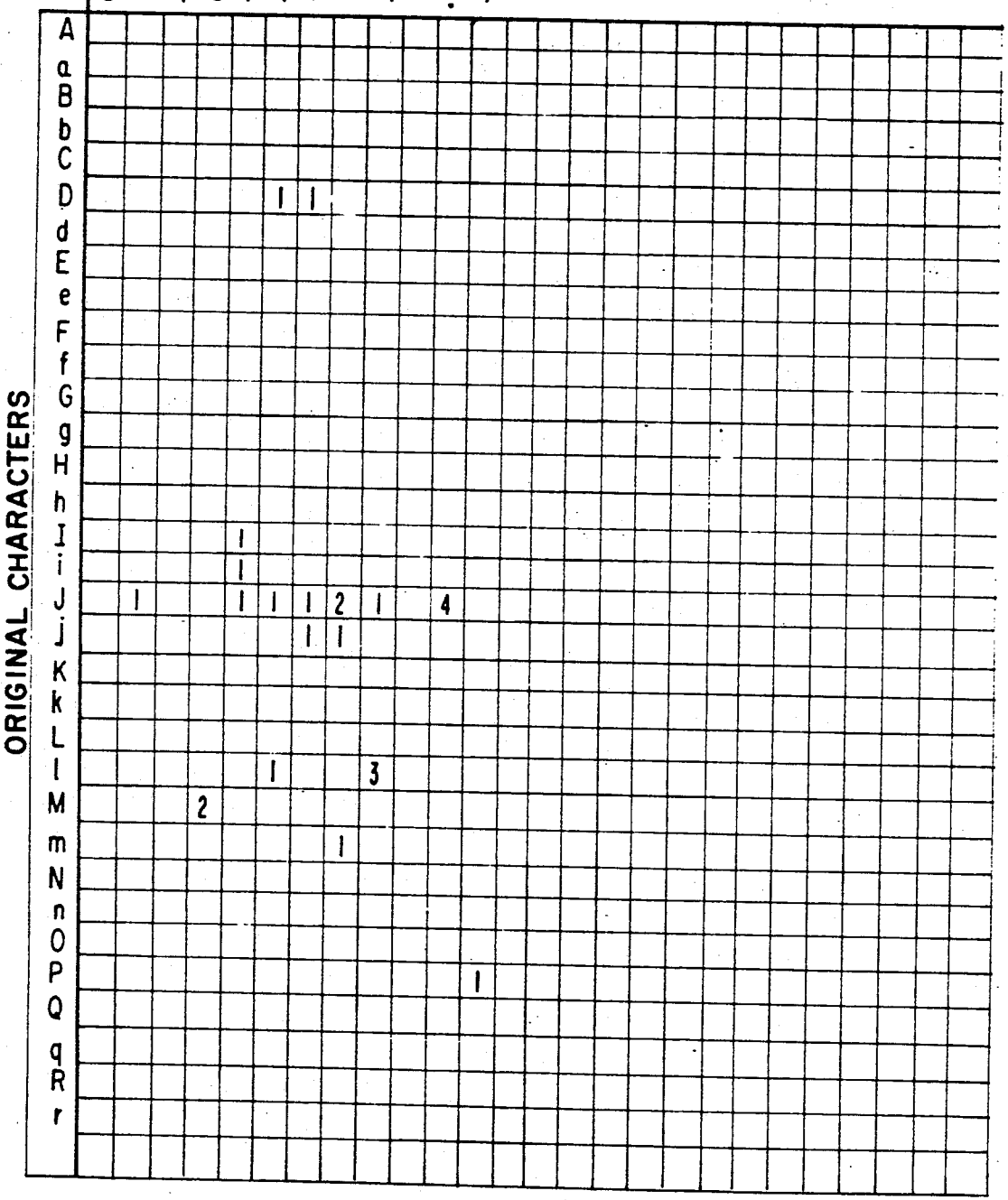
Figure 29D:
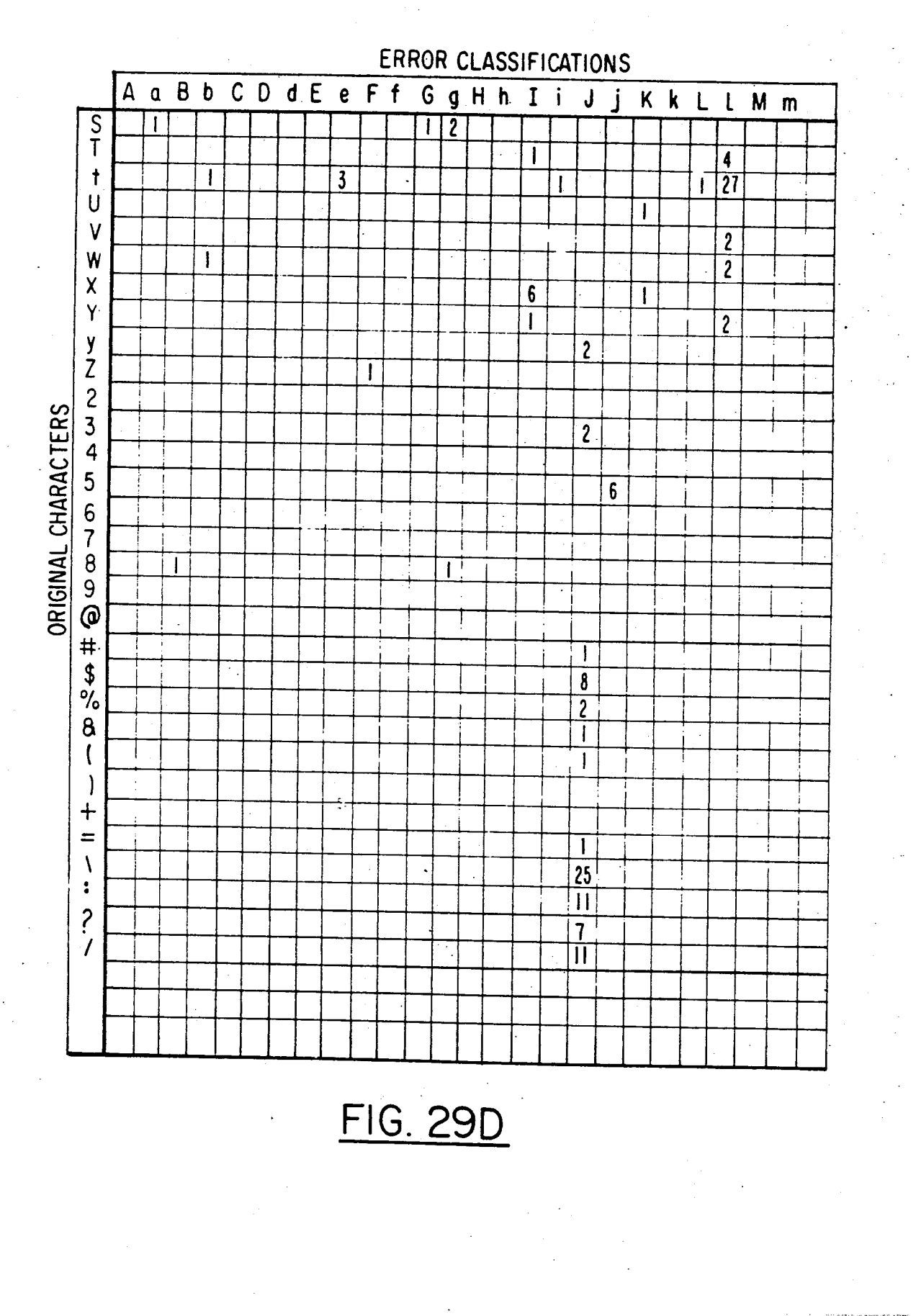

The guess processor 350 first determines whether both the dekerner 346 and the touching character separator 348 have attempted to split the current character image. If so, then the guess processor 350 further determines whether the height of the highest-scoring symbol chosen by the neural network is consistent with the actual height of the object of contiguous "on" pixels in the original (unnormalized) character image (block 2810 of FIG. 28). If it is inconsistent (YES branch of block 2810), then there is a possibility that one of the lower-scoring symbol choices identified by the neural network is really the correct choice, and the guess processor 350 attempts to find it. Otherwise (NO branch of block 2810), if the heights are consistent the guess processor 350 does nothing (block 2815 of FIG. 28). Continuing along the YES branch of block 2810, the guess processor 350 next determines whether the heights of both the second AND third highest scoring symbol choices identified by the neural network 330 are consistent with the actual height of the object in the original character image (block 2820 of FIG. 28). If not (NO branch of block 2820), the guess processor 350 determines whether one of the second or third symbol choices identified by the neural network 330 is compatible with the height of the object in the original character image (block 2825 of FIG. 28). If so (YES branch of block 2825), the guess processor identifies the lower scoring symbol choice having a height consistent with that of the original character image (block 2830 of FIG. 28). Otherwise (NO branch of block 2825), the guess processor 350 reviews the look-up table of FIG. 29 to determine, from all of the symbols in the symbol set which the neural network has been trained, which symbol having a height consistent with that associated with the original character image is most likely to be confused with the highest-scoring symbol identified by the neural network (block 2835 of FIG. 28). The symbol thus found is identified by the guess processor 350 as the one represented by the character image. Referring again to block 2820, if both the second AND third highest scoring symbol choices identified by the neural network 330 have heights consistent with that associated with the original character image (YES branch of block 2820), then the guess processor 350 refers to the look-up table of FIG. 29 to determine which of the two is likeliest to be confused with the highest scoring symbol choice identified by the neural network 330 (block 2840 of FIG. 28). The "winner" is then identified by the guess processor 350 as the correct symbol for the current character image.

The guess processor 350 was implemented by the C language computer program listed in Appendix A-3.

Detailed Description of the Touching Character Separator

Each one of the nine successive touching character separation operations 1510 through 1550 of FIG. 15 will now be described in detail. A C-language program which controls the sequence of performing the nine character split processes 1510 through 1550 of FIG. 15 is attached to this specification as Appendix D. A C-language program which implements the nine character split processes 1510 through 1550 is attached to this specification as Appendix E. The program of Appendix E calls and uses the program of Appendix A-2 to create the character data structures necessary to analyze the character image.

Figure 30:
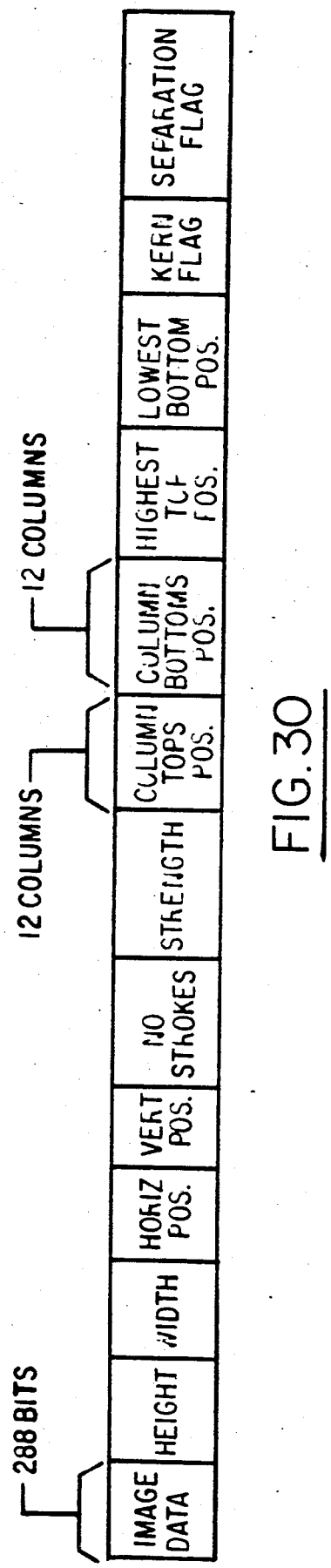
FIG. 30 is a diagram illustrating the format of the binary character image word employed by the system of FIG. 3.

In the preferred embodiment of the invention, each character image progresses through the system of FIG. 3 as a binary character image word including a 288-bit byte representing the 288 binary pixels of the 12 by 24 pixel normalized image. As illustrated in FIG. 30, additional bytes are appended representing the character reference parameters computed by the reference parameter unit 310, including the height and width of the object of contiguous "on" pixels in the unnormalized character image, the vertical and horizontal positions of the object of contiguous "on" pixels in the character image, of the 12 columns of the character image, the strength (number of "on" pixels) in each column, the height of the highest and lowest "on" pixel in each one of the 12 columns (column top and column bottom, respectively), and the height of the highest and lowest "on" pixel of all columns to the left of the current column image (extreme top and extreme bottom, respectively). In addition, two bits representing, respectively, a kern flag and a separation flag are appended. Both flags are initially set to zero. The dekerner 346 sets the kern flag to 1 whenever it receives the word. The touching character separator 348 sets the separation flag to 1 whenever it receives the character image word and is unable to split the character. With the exception of the last two bits, the foregoing parameters are employed in various ones of the following nine processes performed by the touching character separator 348.

Split at Bottom Process

Figure 16:
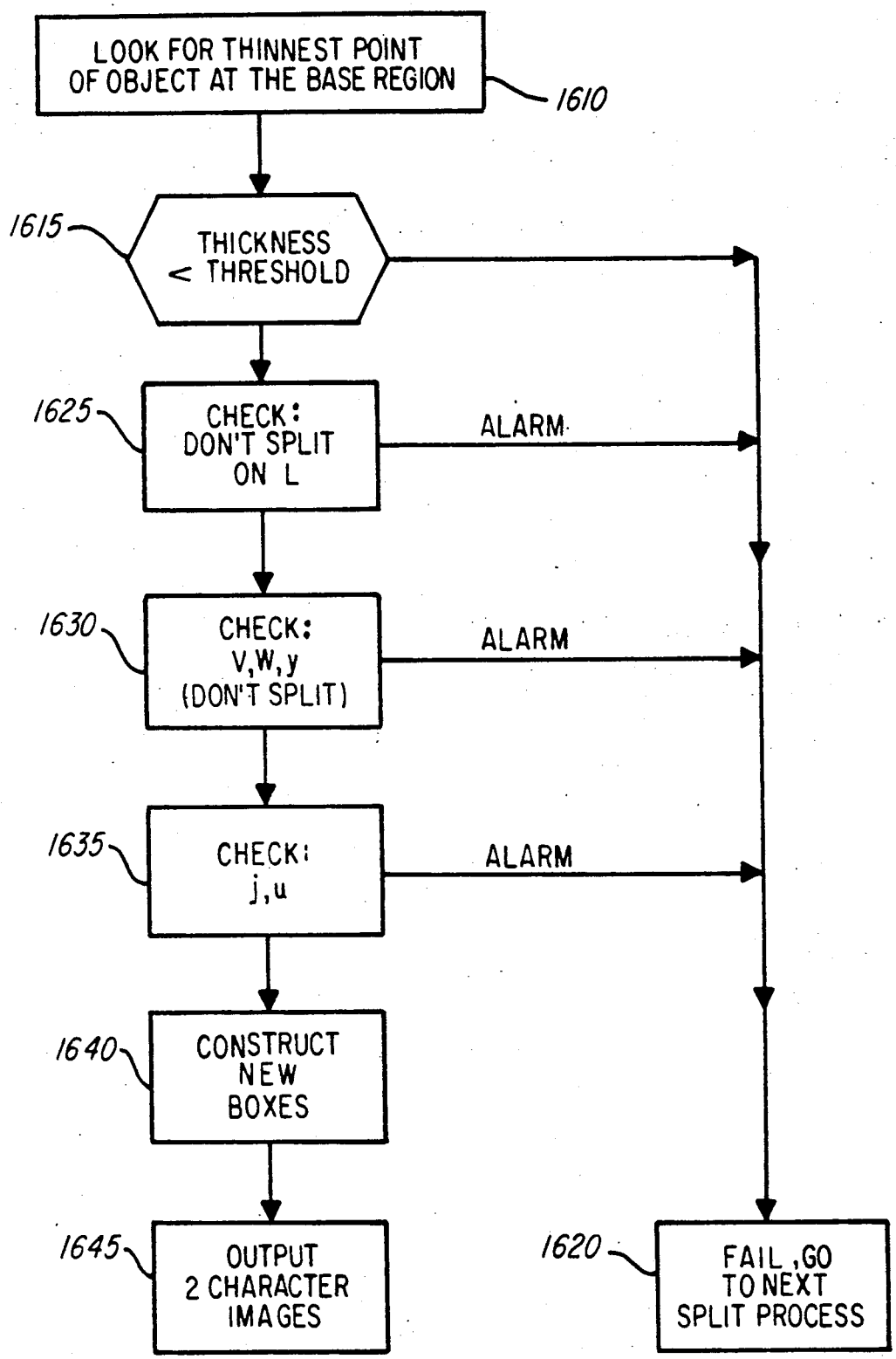
FIGS. 16 through 24 are flow diagrams separately illustrating the operation of respective ones of the nine touching character separation processes employed in the operation of the touching character separator illustrated in FIG. 15.

The touching character separation operation of FIG. 15 commences with the split at bottom process 1510 illustrated in FIG. 16. This process is implemented by a section of the C-language program of Appendix E beginning on page E2 line 13 and concluding at page E5 line 25. The split at bottom process of FIG. 16 begins at block 1610 by searching along the base line of the image (whose location has been previously established by the reference parameter unit 310 of FIG. 3). The purpose of the search of block 1610 is to find the thinnest point (shortest column height) in the object of contiguous "on" pixels. Such an object may be a number "2" joined along the baseline to a number "3". Thus, the search of block 1610 tries to find the shortest vertical column of contiguous "on" pixels beginning at the base line of the image (as defined in FIG. 7). The search of block 1610 is implemented in the portion of Appendix E beginning at page E2 line 13 and ending at page E4 line 16. A determination is made whether the thickness at the point thus identified is below a certain threshold (block 1615 of FIG. 16). If not (NO branch of block 1615), the split at bottom process of FIG. 16 "fails" (block 1620) and the touching character separation operation of FIG. 15 goes to the next character splitting process (namely, split COGQ of block 1515). However, if the determination of block 1615 of FIG. 16 finds that the thickness is greater than the threshold (YES branch of block 1615), then the split at bottom process of FIG. 16 goes to its next step, which is to make sure that the character image is not a capital "L" (block 1625 of FIG. 16). This step is necessary to avoid splitting a letter "L" into a vertical bar and a horizontal bar. The step of block 1625 is performed in the program of Appendix E beginning at page E4 line 19 and ending at line 24 thereof. In essence, the step of block 1625 looks for the presence of a vertical line extending from the base line height to the ascender line height (as defined in FIG. 7) and a horizontal bar extending to the right along the base line from the vertical bar. If it is determined that the character to be split is a letter "L" (ALARM branch of block 1625), then the split at bottom process fails (block 1620) and the touching character separation process of FIG. 15 goes to the next splitting process. Otherwise, if the character image is not an "L" (OK branch of block 1625), the split at bottom process of FIG. 16 continues to the next step, which is to make sure that the character image to be split is not a V, a W nor a Y (block 1630 of FIG. 16). The step of block 1630 is performed by the section of the program in Appendix E beginning at page E4 line 27 and ending at line 33 thereof. In essence, the step of block 1630 looks for pairs of oppositely sloping diagonal lines whose heights change monotonically and which extend toward each other and meet at the baseline. If the step of block 1630 determines that the character image is a V, W or Y (ALARM branch of block 1630), the split at bottom process of FIG. 16 fails (block 1620) and the touching character separation process of FIG. 15 goes on to the next step. Otherwise, (OK branch of block 1630), the character image is not found to be either a V, W or Y and the split at bottom process of FIG. 16 continues. The next step is to be sure that the character image is not a "J" or a "U" or a "u" (block 1635). The step of block 1635 is implemented in the section of the program of Appendix E beginning at page E4 line 35 and ending at page E5 line 9. In essence, this step looks for an level arc near the base line of the character image whose ends extend up and are connected to vertical lines extending up from the base line to the middle line of the character image (as defined in FIG. 7), corresponding to a letter "u". This step also looks for a level arc whose ends extend up and a vertical line extending up from the right end of the arc, corresponding to a letter J. If it is found that the character image is a "J", a "U" or a "u" (ALARM branch of block 1635) then the split at bottom process of FIG. 16 stops (block 1620) and the touching character separation operation of FIG. 15 goes on to the next splitting process. Otherwise (OK branch of block 1635), the thin point previously identified in the step of block 1610 is deemed to be valid and the split at bottom process of FIG. 16 commences a construct new boxes step (block 1640 of FIG. 16). The construct new boxes process of block 1560 produces a pair of split images from the original character image, using the valid split point as the boundary between the split image pair, as will be described below in greater detail with reference to FIG. 25. The construct new boxes process is implemented in a section of the program of Appendix E at page E5. After this, the touching character separation process of FIG. 15 takes the SUCCEED branch of block 1510 and continues in the manner described previously herein.

Split at COGO Process

Figure 17:
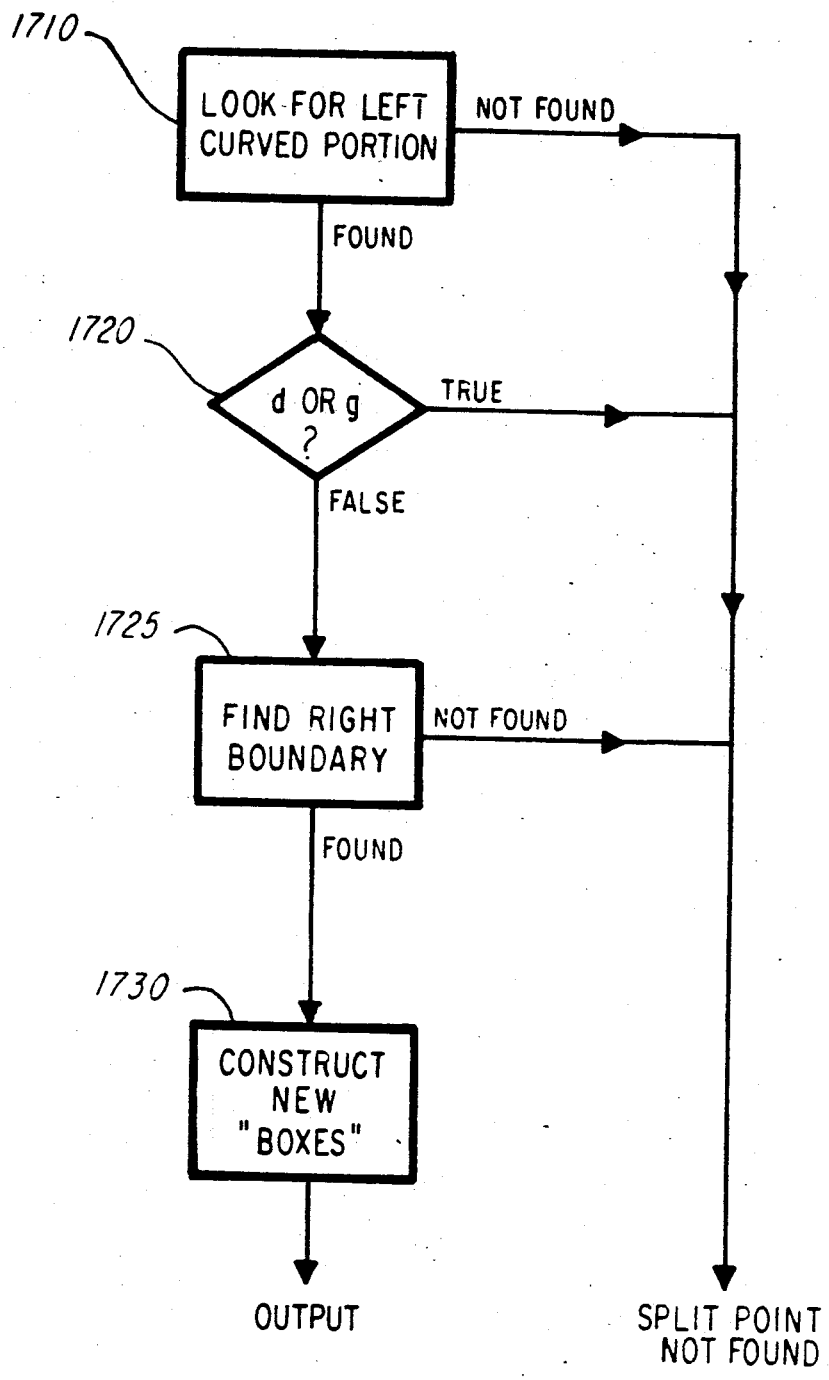

If the foregoing split at bottom process fails, the next step for the touching character separation process of FIG. 15 is the split COGQ process of block 1515. The split at COGQ process is illustrated in FIG. 17 and is implemented in a section of the program of Appendix E beginning at page E22 line 29 and ending at line 29 of page E27. Referring to FIG. 17, the split COGQ process begins with the step of searching for an arc corresponding approximately to the left-half of a circle (block 1710 of FIG. 17). The step of block 1710 is implemented in a section of the program of Appendix E beginning at page E23 line 6 and ending at page E24 line 2. If such an arc is not found (NOT FOUND branch of block 1710), the split COGQ process of FIG. 17 is abandoned and the touching character separation operation of FIG. 15 goes on to the next splitting process (FAIL branch of block 1515 of FIG. 15). Returning now to FIG. 17, if such an arc is found (FOUND branch of block 1710), the next step is to determine whether the character image is a letter "d" or "q" (block 1720 of FIG. 17). The step of block 1720 is implemented by a section of the program of Appendix E beginning at page E24 line 14 and ending at line 34 thereof. In essence, the step of block 1720 tries to find a vertical bar touching the right side of the arc whose height above or below the arc exceeds a predetermined ratio with respect to the height of the arc. If a "d" or "q" is present (TRUE branch of block 1720), then the split COGQ process of FIG. 17 stops and the touching character separation operation of FIG. 15 takes the FAIL branch of block 1515 and goes on to the next character splitting process. This is necessary in order to avoid splitting a valid letter "d" or "q". Otherwise (FALSE branch of block 1720), the next step in the split COGQ process of FIG. 17 is to find a right hand boundary of the arc (block 1725 of FIG. 17). The step of block 1725 is implemented in a section of the program of Appendix E beginning at page E24 line 36 and ending at page E27 line 33. In essence, the step of block 1725 first determines whether the character is like a C (or 0) because the number of strokes in crossing each pixel column in the arc is either one or two. If this is found to be true, the right hand boundary of the arc is deemed to be the first point to the right at which the number of strokes per column changes to either one or at least three. Otherwise, the step of block 1725 determines whether the character is like a G (or Q) because the number of strokes crossing the pixel columns in the arc ranges all the way from one to three. If the 27 latter condition is found to be true, the right hand boundary of the arc is deemed to be the first point to the right at which there is a sharp vertical drop or rise in the column height. If no such boundary can be found or if there are more than three strokes in any column in the arc (NOT FOUND branch of block 1725), then the character cannot be a C, O, G or Q, and the touching character separation operation of FIG. 15 takes the FAIL branch of block 1515 and goes to the next character splitting process. Otherwise, if a right hand boundary can be found for the arc (FOUND branch of block 1725), the next step is to construct new boxes defining a pair of images formed by splitting the present character image at the right hand boundary of the arc (block 1730 of FIG. 17). The construct new boxes step of block 1730 is performed by a section of the program of Appendix E at page E27 line 35. This step corresponds to the construct new boxes step 1640 of FIG. 16 discussed above. The touching character separation process of FIG. 15 then stops the split COGQ step of block 1515 and takes the SUCCEED branch of block 1515 to block 1565 which has been previously described.

Split FTE Process

Figure 18:
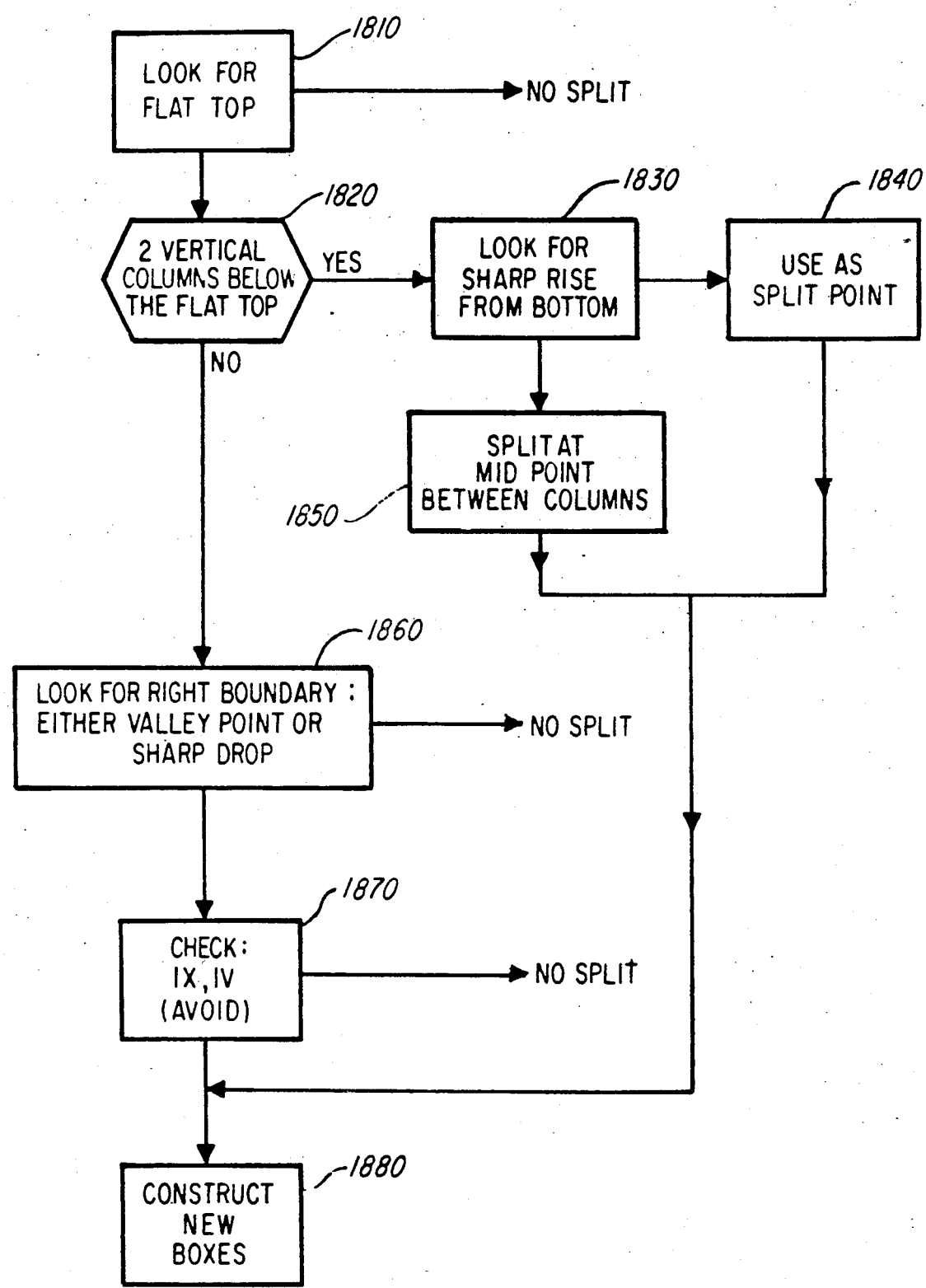
Figure 19:
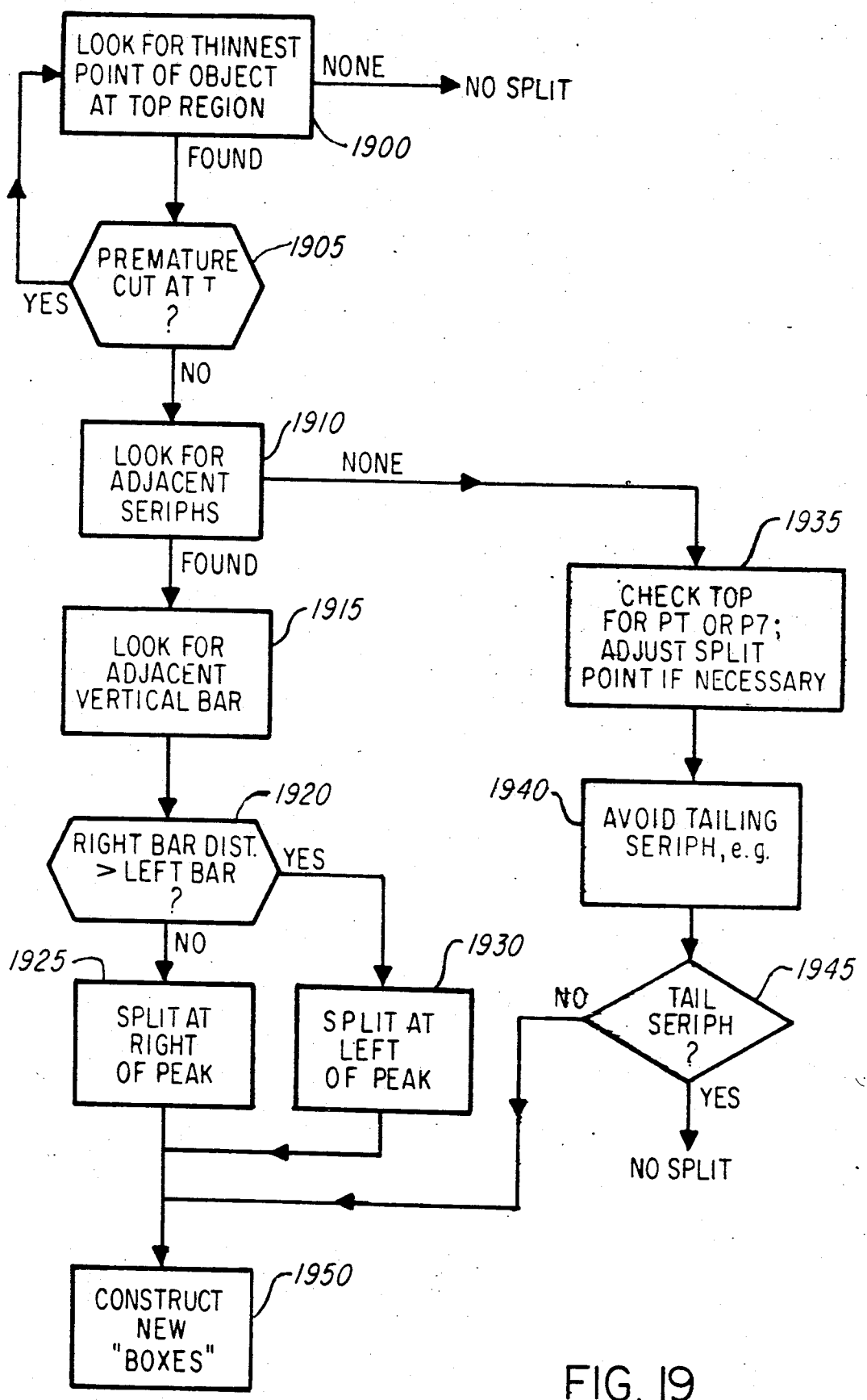

If the foregoing split COGQ process fails to split the character image, the next step in the touching character separation operation of FIG. 15 is the split FTE process of block 1520. This process is now described in detail with reference to FIG. 18 and is implemented by a section of the program of Appendix E beginning at page E28 line 26 and ending at page E32 line 6. Referring now to FIG. 18, the first step (block 1810 of FIG. 18) is to determine whether there is a flat top —or horizontal line in the character image at the ascender line height (as defined in FIG. 7). This step is implemented in a section of the program of Appendix E beginning at page 230 line 32 and ending at page 231 line 27. If no flat top is found (NO branch of block 1810), the split FTE process is terminated and the touching character separation process of FIG. 15 takes the FAIL branch of block 1520 and goes to the next character split process. Otherwise, a flat top is present (FOUND branch of block 1810) and the next step is to determine whether there are two vertical lines extending up from the base line to the flat top (block 1820 of FIG. 18) —a condition corresponding, for example, to a capital "I" touching a capital "M". If so (YES branch of block 1820), the next step is to look between the two columns for a sharp rise in the bottom of the column bottom location —a condition corresponding, for example, to the I and the M being joined only at their tops. If such a condition is found (FOUND branch of block 1830), then the column having the sharp rise is deemed to be the boundary at which the image is to be split (block 1840 of FIG. 18). If no such rise can be found (NOT FOUND branch of block 1850), then the midpoint between the two columns defines a vertical boundary at which the image is to be split (block 1850). The steps of blocks 1820, 1830, 1840 and 1850 are implemented in a section of the program of Appendix E beginning at page E29 line 28 and ending at page E30 line 30. If two vertical columns are not found beneath the flat top (NO branch of block 1820), then the character is most likely a letter F, T or E. The next step is to look to the right for the boundary of the flat top (block 1860). The step of block 1860 is implemented in a section of the program of Appendix E beginnging at page E30 line 33 and ending at page E31 line 13. In essence, the step of block 1860 looks for either a slight dip or valley point in the line extending along the ascender line height (FIG. 7) comprising the flat top —a condition corresponding for example to a letter F adjoining a letter T at the top. This step also looks for a sharp drop to the right in column height —a condition corresponding to a letter F adjoining a small letter o to the right. Whenever either a dip or a sharp drop is thus located, the next step is to be sure that splitting the image at that location will not split a valid X adjoining the right side of a capital I nor split a V adjoining the right side of a capital I, for example (block 1870). The step of block 1870 is implemented in the section of the program of Appendix E beginning at page E31 line 13 and ending at the bottom of page E32 line 19. In essence, the step of block 1870 detects the IX pattern if the spaces both above and below the dip or drop detected by the step of block 1860 are empty (devoid of "on" pixels). The step of block 1870 detects the IV pattern if the drop in column height detected by the step of block 1860 extends below the middle line height (FIG. 7) and the space over the drop is empty. If either the IX or the IV pattern is detected (FOUND branch of block 1870), the split FTE process of FIG. 18 fails and the touching character separation operation of FIG. 15 takes the FAIL branch of block 1520 and goes to the next process. Otherwise (OK branch of block 1870), the image is split at the boundary identified by the step of block 1860. Whenever the image is split any of the steps of blocks 1840, 1850 or 1870, the next step is the construct new boxes step of block 1880. This latter step is implemented in a section of the program of Appendix E at page E32 line 8, and corresponds to the construct new boxes step of block 1640 of FIG. 16.

Split Top Process

If the foregoing split FTE process fails to split the character image, then the touching character separation process of FIG. 15 takes the FAIL branch of block 1520 and begins the split top process of block 1525. The split top process is now described in detail with reference to FIG. 19. It is implemented by a section of the program of Appendix E beginning at page E32 line 33 and ending at page E39 line 23 thereof. The first step is to look for the weakest point in the object along the ascender line height (FIG. 7) at the top of the image (block 1900 of FIG. 19). This step is implemented in the section of the program of Appendix E beginning at page E32 line 37 and ending at page E33 line 37. In essence, this step looks for the shortest column of "on" pixels touching the ascender line and determines whether the length of that column is less than a predetermined amount. If no such weak point is found (NO branch of block 1900), then the split top process of FIG. 19 fails. Otherwise (FOUND branch of block 1900), the weak point thus found is deemed to be a possible location for vertically splitting the character image. A determination therefore is made whether splitting the image at the weak point thus located would cut the left side of the horizontal bar across the top of a capital letter "T" (block 1905). The step of block 1905 is implemented in a section of the program of Appendix E beginning at page E34 line 2 and ending at page E34 line 26. In essence, the step of block 1905 looks for a horizontal line at the top (ascender line height of FIG. 7) of the character image and in particular that portion of the line to the left of the weak point discovered in the step of block 1900. In the step of block 1905, a determination is made whether the region below that portion of the line is empty (devoid of "on" pixels). If so (YES branch of block 1905), the horizontal line is deemed to be the left side of the line crossing the top of a letter "T", and so the weak point identified above is not used to split the image. The process continues searching to the right along the ascender line height for a weak point in the object by returning to the step of block 1900. Otherwise (NO branch of block 1905), the next step is to look for adjacent seriphs in the character image (block 1910 of FIG. 19). The step of block 1910 is implemented in a section of the program of Appendix E beginning at page E34 line 31 and ending at page E36 line 7 thereof. In essence, the step of block 1910 looks for a column extending down for a short distance from the top of the object and terminating above the middle line height (FIG. 7). If an adjacent seriph is found (FOUND branch of block 1910), the next step is to find any vertical bars in the image which are adjacent the seriph (block 1915 of FIG. 19). Next, a determination is made whether the distance from the top of the seriph is greater to the vertical bar on the right than to the vertical bar on the left (block 1920 of FIG. 19). If so (YES branch of block 1920), this condition corresponds to the pattern IT for example, and the image is split to the left of the peak of the seriph (block 1925). Otherwise (NO branch of block 1920), the condition corresponds to the pattern TI for example, and the image is split to the right of the peak of the seriph (block 1930). The steps of blocks 1915, 1920, 1925 and 1930 are implemented in a section of the program of Appendix E beginning at page E36 line 9 and ending at page E38 line 5. Returning now to the step of block 1910, if no adjacent seriphs were found (NONE branch of block 1910), then the weak point found in the step of block 1900 may be the correct point at which to vertically split the character image. However, the next step is to determine whether the pattern PT or P7 is present and, if so, to adjust the split point so as to avoid splitting the left side of the top of the T or the 7 to the right of the P (block 1935). The step of block 1935 is implemented in a section of the program of Appendix E beginning at page E38 line 10 and ending at page E39 line 2. In essence, the step of block 1935 follows the bottom of a horizontal bar at the top (ascender line height of FIG. 7) of the image and watches for dips in the height of the bottom of the horizontal bar which do not extend below the middle line height (FIG. 7). Any such dip corresponds to the boundary between the two symbols in either a PT pattern or a P7 pattern. The step of block 1935 adjusts the split point to the left of the dip in such as case. The next step is to look for tailing seriphs (block 1940 of FIG. 19). The step of block 1940 is implemented in a section of the program of Appendix E starting at page E39 line 4 and ending at line 9 thereof. A tailing seriph is a very short vertical line to the right of the proposed split point which extends down from the top of the image (ascender line height) to a height above the middle line height. If no tailing seriph is found (NO branch of block 1945), the image is vertically split at the proposed location. Otherwise, if a tailing seriph is found at this point (YES branch of block 1945), the split top process fails and the touching character separation operation of FIG. 15 takes the FAIL branch of block 1525 to the next process, namely the split top and bottom process of block 1530. Whenever the split top process of FIG. 19 splits the character image, it employs the construct new boxes step of block 1950. This step is implemented in a section of the program of Appendix E beginning at page E39 line 12 and ending at line 18 thereof and corresponds to the construct new boxes step of block 1640 of FIG. 16.

Split Top and Bottom Process

Figure 20:
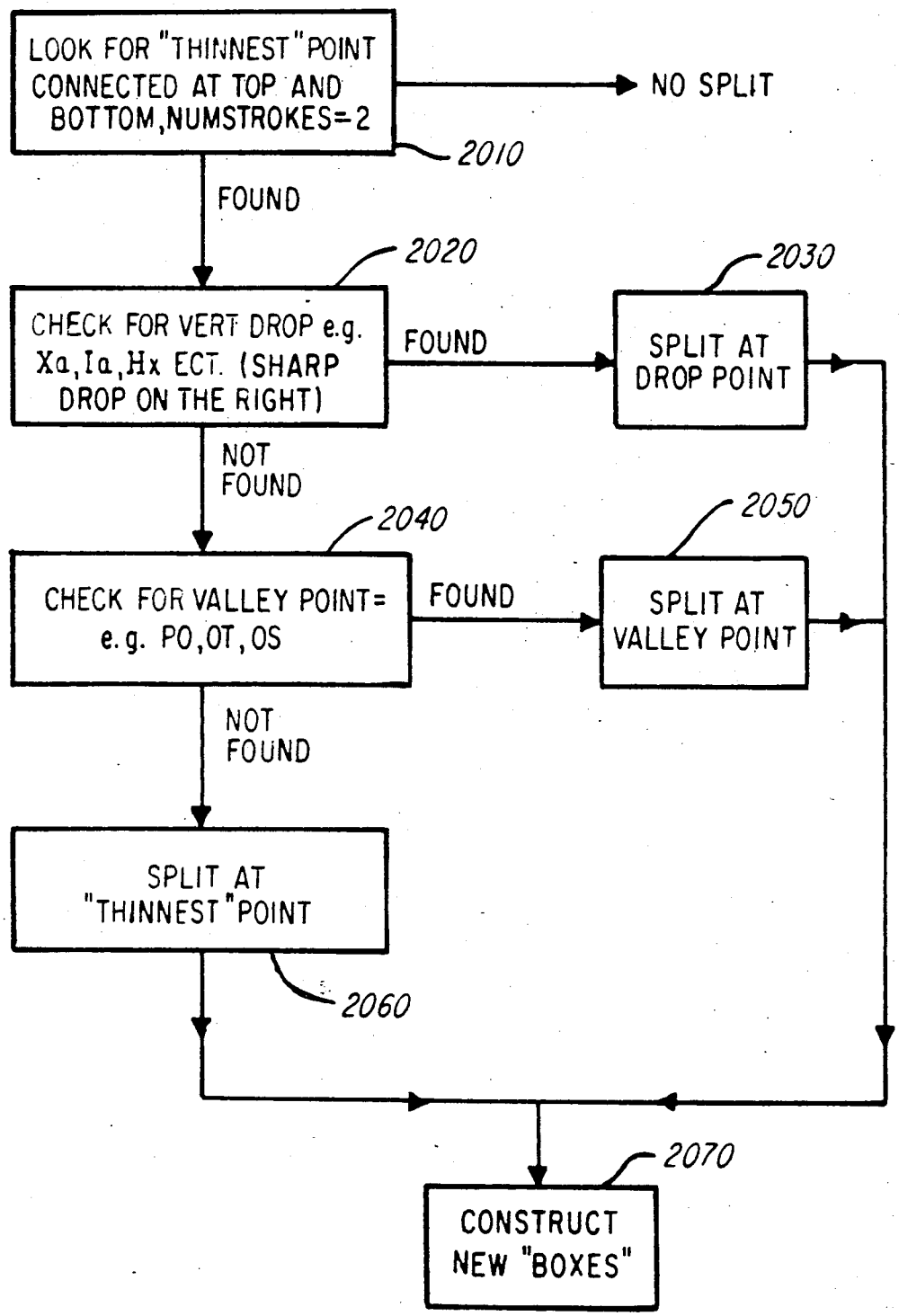

The split top and bottom process of block 1530 of FIG. 15 illustrated in detail in FIG. 20 and is implemented by a section of the program of Appendix,E beginning at page E39 line 31 and ending at page E94 line 8. The split top and bottom process of block 1530 is useful in those instances where the split at bottom process (block 1510) and the split at top process (block 1525) have failed to find unconnected regions at the bottom and top of the image, respectively, and the intervening split processes have also failed. The first step (block 2010) of the split at top and bottom process illustrated in FIG. 20 is to find the vertical pixel 27 column in the image having two strokes crossing it and having the least strength (number of "on" pixels). This condition corresponds, for example, to the pattern HI or IH whose facing seriphs are connected at the top and bottom of the vertical column of minimum strength. This step is implemented in a section of the program of Appendix E beginning at page E40 line 2 and ending at page E40 line 31. If no such column can be located (NO SPLIT branch of block 2010), the split at top and bottom process of FIG. 20 fails and the touching character separation operation of FIG. 15 takes the FAIL branch of block 1530 to the next split process. Otherwise, if such a vertical pixel column is found (FOUND branch of block 2010), the next step in the process of FIG. 20 is to check for the presence of character patterns such as Xa, Ia, Hx, etc., which can be vertically split at the point at which the column height drops suddenly (block 2020). This step is implemented in a section of the program of Appendix E beginning at page E40 line 33 and ending at page E41 line 17. In essence, the step of block 2020 looks for a sharp drop in vertical column height to the right of the location found in step 2010. If a such sharp drop is found (FOUND branch of block 2020), the image is vertically split at the location of the drop (block 2030). If no such drop is found (NOT FOUND branch of block 2020), the next step (block 2040 of FIG. 20) is to look for character patterns in the image such as PO, OT, OS, etc. in order to avoid splitting the leading character at the location identified in the step of block 2010. The step of block 2040 is implemented in a section of the program of Appendix E beginning at page E41 line 18 and ending at page E43 line 31 thereof. In essence, the step of block 2040 looks for a valley point or slight dip in the column height below the ascender line height (FIG. 7). If such a valley point is found (FOUND branch of block 2040), the character image is split vertically at the valley point (block 2050). Otherwise (NOT FOUND branch of block 2040), the character image is vertically split at the location identified in block 2010 (block 2060). Whenever the split at top and bottom process of FIG. 20 splits the character image (by any of the steps of blocks 2030, 2050 or 2060), the next step is the construct new boxes step of block 2070. The step of block 2070 is implemented in a section of the program of Appendix E beginning at page E43 line 35 and ending at page E44 line 8 and corresponds to the construct new boxes step of block 1640 of FIG. 16.

Split VW Process

Figure 21:
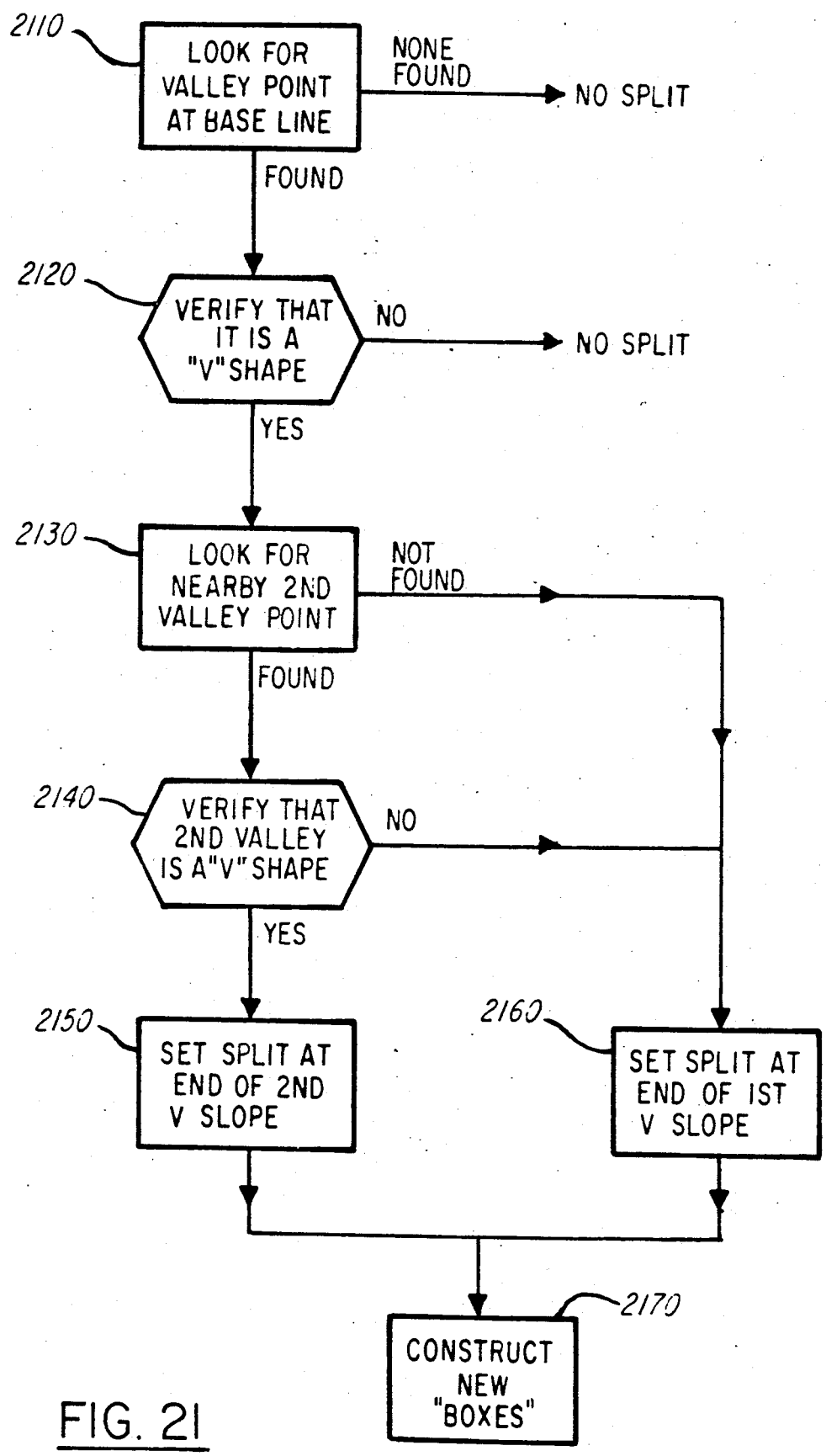

If the split top and bottom process of block 1530 of FIG. 15 fails, the touching character separation operation of FIG. 15 takes the FAIL branch of block 1530 to the split VW process of block 1535. The split VW process of block 1535 is illustrated in FIG. 21 and is implemented in a section of the program of Appendix E beginning at page E44 line 20 and ending at page E47 line 18. The first step in the split VW process of FIG. 21 is to look for a valley point or a dip in the column height that goes down from at least the middle line height (FIG. 7) all the way to the base line (block 2110). If no such valley point is found (NOT FOUND branch of block 2110), the split VW process of FIG. 21 fails and the touching character separation process of FIG. 15 takes the FAIL branch of block 1535 to the next process. Otherwise (FOUND branch of block 2110), the next step is to verify that the valley point identified by the step of block 2110 is "V"-shaped (block 2120 of FIG. 21). In essence, the step of block 2120 determines that the valley point is V-shaped if its width at the base line is below a predetermined threshold and increases monotonically with height. If the point is not V-shaped, the split VW process of FIG. 21 fails (NO branch of block 2120). The steps of blocks 2110 and 2120 are implemented in a section of the program of Appendix E beginning at page E45 line 12 and ending at line 26 thereof. If the point is V-shaped (YES branch of block 2120), the next step (block 2130) is to look for a second valley point to the right of the first one located by the step of block 2110. This step is performed in a manner like that of the step of block 2110. If such a second valley point is found (FOUND branch of block 2130), the next step is to determine whether it corresponds to a V-shape (block 2140). The step of block 2140 is performed in a manner like that of block 2120. The steps of blocks 2130 and 2140 are performed by a section of the program of Appendix E beginning at page E46 line 8 and ending at line 28 thereof. If the second valley point is V-shaped (YES branch of block 2140), the character on the left side of the image is deemed to be a W and is therefore split at the end of the slope rising to the right from the second valley (block 2150). (The step of block 2150 is implemented in a section of the program of Appendix E beginning at page E46 line b 29 and ending at line 37 thereof.) Otherwise, if there is only one V-shaped valley (NO branch of block 2140), the character on the left side of the image is deemed to be a V and is therefore split at the end of the slope rising to the right from the first valley (step 2160). The step of block 2160 is implemented in a section of the program of Appendix E beginning at page E45 line 28 and ending at page E47 line 7. The same step is followed if the step of block 2130 fails to find a second valley point (NOT FOUND branch of block 2130). Whenever the character image is split by either of the steps of blocks 2150 or 2160, the next step is the construct new boxes step of block 2170 which is implemented by a section of the program of Appendix E beginning at page E47 line 5 and ending at line 12 thereof and corresponds to the construct new boxes step of block 1640 of FIG. 16.

Split OO Process

Figure 22:
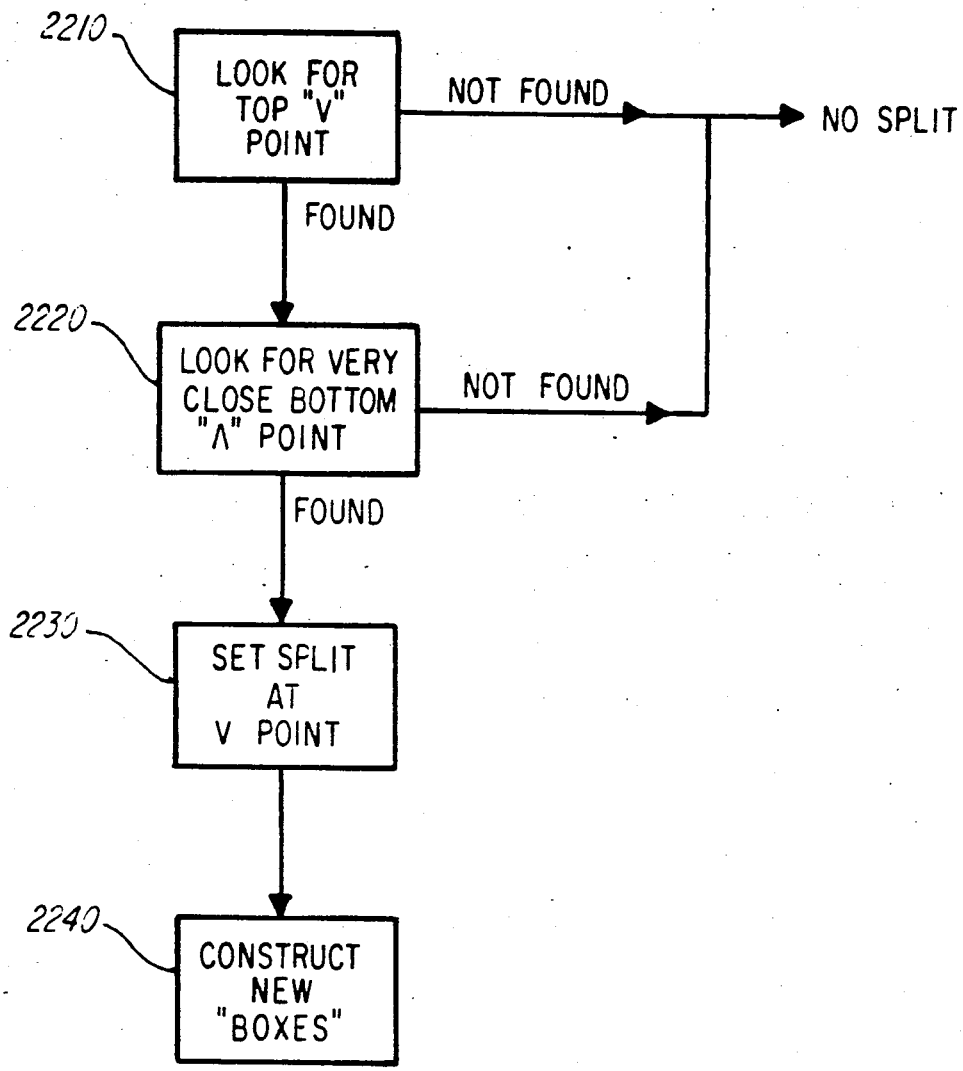

The touching character separation operation of FIG. 15 takes the FAIL branch of block 1535 if the split VW process fails, and begins the split 00 process of block 1540. The split 00 process is illustrated in FIG. 22 and is implemented in a section of the program of Appendix E beginning at page E47 line 20 and ending at page E49 line 10. The first step is to look for a small "v" shape in the object which points down from the top toward its apex (block 2210). The step of block 2210 is implemented in a section of the program of Appendix E beginning at page E48 line 1 and ending at line 5 thereof. If no such shape is found (NOT FOUND branch of block 2210), then the split OO process of FIG. 22 fails and the touching character separation operation of FIG. 15 takes the FAIL branch of block 1540 to the next process. Otherwise, if such a v-shape is found (FOUND branch of block 2210), the next step is to look for a small upside down v-shape pointing up from the base line towards the apex of the first small v-shape (block 2220). The step of block 2220 is implemented by a section of the program of Appendix E beginning at page E48 line 6 and ending at line 33 thereof. If such an upside down v-shape is not found (NOT FOUND branch of block 2220), the split OO process of FIG. 22 fails. Otherwise, the presence of the "up" and "down" v-shapes pointing at one another corresponds to the presence of a character pattern such as OO, OC, OD, OP, etc., which can be split at the apex of the v-shapes (block 2230). The next step is to construct new boxes for the split images (block 2240). The step of block 2240 is implemented in a section of the program of Appendix E at page E49 line 4 and corresponds to the construct new boxes step of block 1640 of FIG. 16.

Split Small f Process

Figure 23:
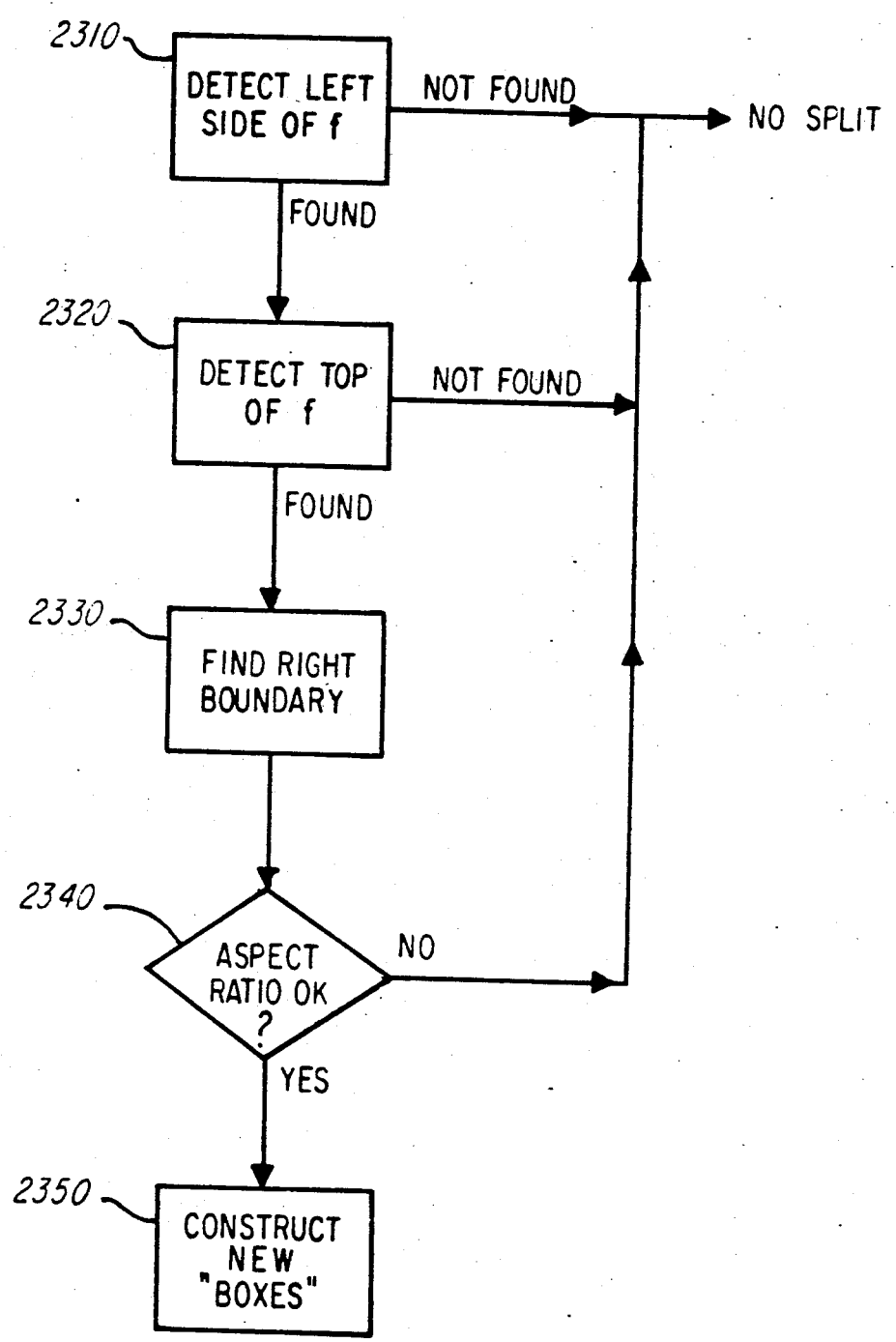

The touching character separation operation of FIG. 15 takes the FAIL branch of block 1540 if the split OO process fails and goes to the split small f process of block 1545. The split small f process is illustrated in FIG. 23 and is implemented by a section of the program of Appendix E beginning at page E49 line 12 and ending at page E51 line 31. The first step is to detect the left side of a small f (block 2310). This step is implemented in a section of the program of Appendix E beginning at page E49 line 29 and ending at page E50 line 2. In essence, the step of block 2310 looks for a tall column in the image having a short bar at about the middle line height (FIG. 7) extending leftward from the tall column (block 2310). If such a feature is not found (NOT FOUND branch of block 2310), the split small f process of FIG. 23 fails, and the touching character separation operation of FIG. 15 takes the FAIL branch of block 1545 to the next process. Otherwise, if such a feature is found (FOUND branch of block 2310), the next step is to detect the top of the small f (block 2320 of FIG. 23). The step of block 2320 is implemented in a section of the program of Appendix E beginning at page E50 line 9 and ending line 26 thereof. In essence, the step of block 2320 looks for a small arc at the top of the vertical line referenced in the step of block 2310 extending to the right and tangent with the ascender line (FIG. 7), its two ends sloping downwardly. If this latter feature is not found (NOT FOUND branch of block 2320), the split small f process of FIG. 23 fails. Otherwise (FOUND branch of block 2320), a small letter f is deemed to be found and the next step is to find the right boundary of the small f (block 2330). The step of block 2330 is implemented in a section of the program of Appendix E beginning at page E50 line 28 and ending at line 37 thereof. In essence, the step of block 2330 looks for either a vertical drop to the right of the arc detected in the step of block 2320 or an upward slope at the downward sloping right end of the arc. A vertical drop corresponds to the character pattern fe or fa, for example. An upward slope corresponds to the character pattern fO, for example. In either case, the beginning of the vertical drop or the upward slope is deemed to be the right boundary of the small f. However, before vertically splitting the image at this boundary, the aspect ratio of the image must be checked (block 2340). The step of block 2340 is implemented in a section of the program of Appendix E beginning at page E51 line 1 and ending at line 3 thereof. If the image is not sufficiently wide (NO branch of block 2340), then it is unlikely that there is a small letter f followed by another character in the same image, and the split small f process of FIG. 23 fails. Otherwise (OK branch of block 2340), the character is split at the boundary located by the step of block 2330 and new boxes are constructed defining the new split images (block 2350). The construct new boxes step of block 2350 is implemented in the program of Appendix E at page E57 line 17.

Split Miscellaneous

Figure 24:
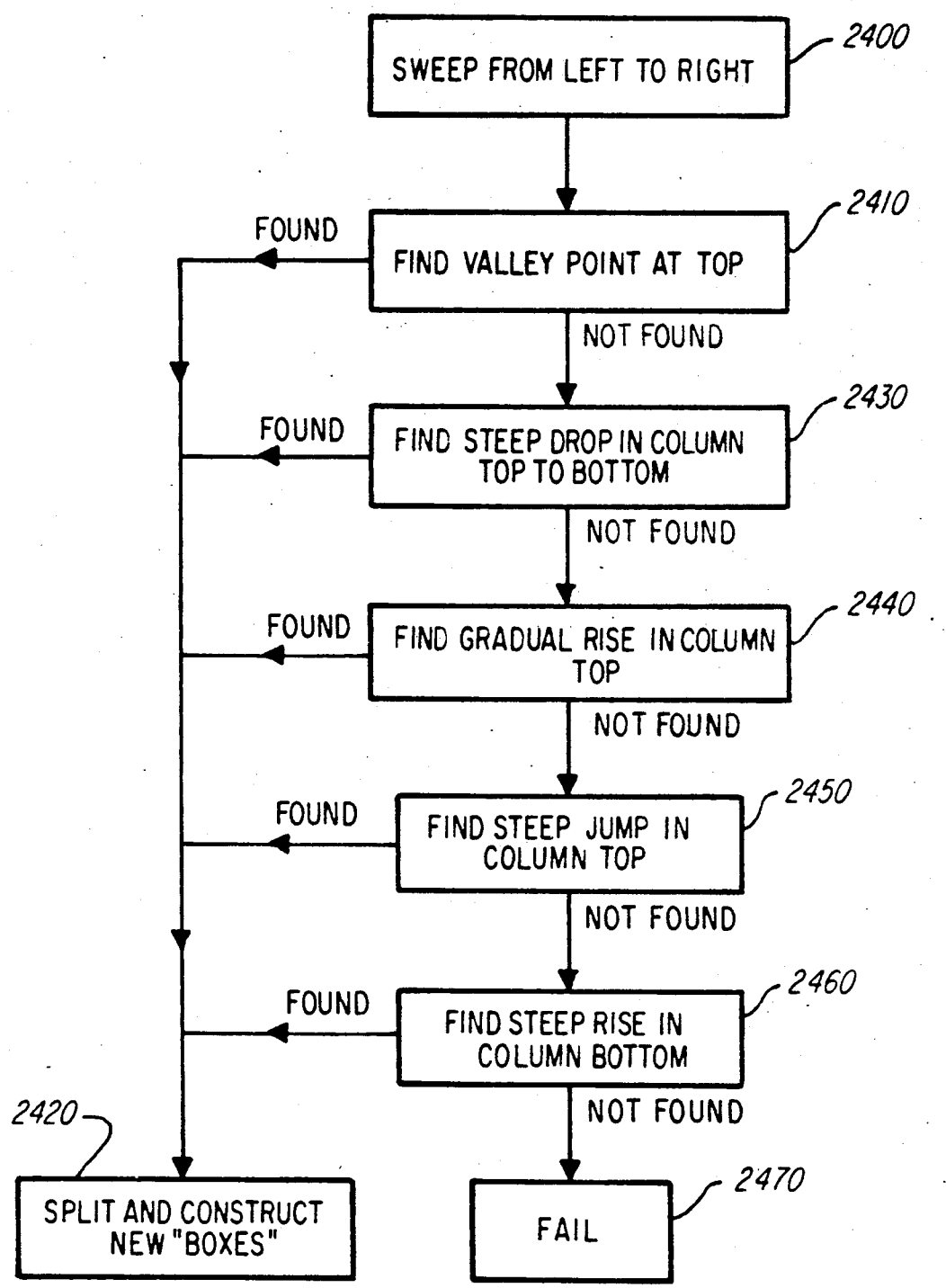

If all of the split character processes of blocks 1510 through 1545 of FIG. 15 fail, the remaining possibilities for splitting the image are explored by the split miscellaneous process of block 1550. The split miscellaneous process of block 1550 is illustrated in FIG. 24 and is implemented in a section of the program of Appendix E beginning at page E51 line 33 and ending at page E54 line 27. The image is analyzed from left to right as usual (block 2400) and the first step is to look for a valley point at the top or middle of the image (block 2410). Such a valley point would correspond to the juncture of two letters in the pattern bc or oo. The step of block 2410 is implemented in a section of the program of Appendix E beginning at page E52 line 31 ending ending at line 37 thereof. In essence, this step monitors the top height of each column and watches for a slight dip followed by a slight rise in column height over several columns. If such a feature is found (FOUND branch of block 2410), the next step is to vertically split the image at the bottom of the valley and construct new boxes for the pair of split images (block 2420 of FIG. 24). The step of block 2420 is implemented in a section of the program of Appendix E beginning at page E57 line 16 and ending at line 27 thereof. However, if such a feature is not found (NOT FOUND branch of block 2410), then the next step is to look for a steep drop in column height (block 2430). Such a feature corresponds to the juncture between the adjoining letters in the pattern De, for example. The step of block 2430 is implemented in a section of the program of Appendix E beginning at page E53 line 2 and ending at line 6 thereof. If this feature is found (FOUND branch of block 2430), then the next step is to vertically split the image at the point identified and construct new boxes for the two split images (block 2420). Otherwise (NOT FOUND branch of block 2430), the next step is to look for a gradual rise in the top column height (block 2440). This feature corresponds to the juncture between the two adjoining letters in the pattern rt, for example. The step of block 2440 is implemented in a section of the program of Appendix E beginning at page E53 line 7 and ending at line 14 thereof. If such a feature is found (FOUND branch of block 2440), the next step is to vertically split the image at the point thus identified and construct new image boxes for the resulting split images (block 2420). Otherwise (NOT FOUND branch of block 2440), the next step is to look for a steep rise in column height (block 2450). Such a feature corresponds to the juncture between the adjoining letters in the pattern gl or kh, for example. The step of block 2450 is implemented in a section of the program of Appendix E beginning at page E56 line 15 and ending at line 30 thereof. If this feature is found (FOUND branch of block 2450), the next step is the construct new boxes step of block 2420. Otherwise (NOT FOUND branch of block 2450), the next step is to look for a steep rise in the location of the bottom of the columns (block 2460 of FIG. 24). Such a feature corresponds to the juncture between the adjoining letters in the pattern qu or ga, for example. The step of block 2460 is implemented in a section of the program of Appendix E beginning at page E53 line 32 and ending at page E54 line 3. If such a feature is found (FOUND branch of block 2460), the next step is the construct new boxes step of block 2420. Otherwise (NOT FOUND branch of block 2460), if this last step fails, the split miscellaneous process of FIG. 24 fails, signaling the failure of the entire touching character separation process of FIG. 15 (block 1555 of FIG. 15).

The inquiries regarding the foregoing geometric features of the character image in each subsequent splitting process of blocks 1510 through 1550 of FIG. 15 have definite meaning only in the light of the results of previous inquiries of preceding ones of the processes of blocks 1510 through 1550. As an extreme example, the inquiries regarding geometric features made in the split miscellaneous process of block 1550 could not possibly result in meaningful information without the results of the eight preceding character split processes of blocks 1510 through 1545. The corollary is that the elimination of a host of possibilities by the previous eight processes (blocks 1510 through 1545) greatly simplifies the inquiries which must be made in the final process of block 1550 to ferret out all of the miscellaneous possibilities for character split locations not explored in the preceding processes. Thus, the sequence of nine character split processes (blocks 1510 through 1545) comprising the touching character separation operation of FIG. 15 are a logically progressive elimination of all possible patterns of adjoining characters susceptible of separation, culminating in the elimination of 27 miscellaneous cases by the split miscellaneous process of block 1550.

Construct New Boxes Step

Figure 25:
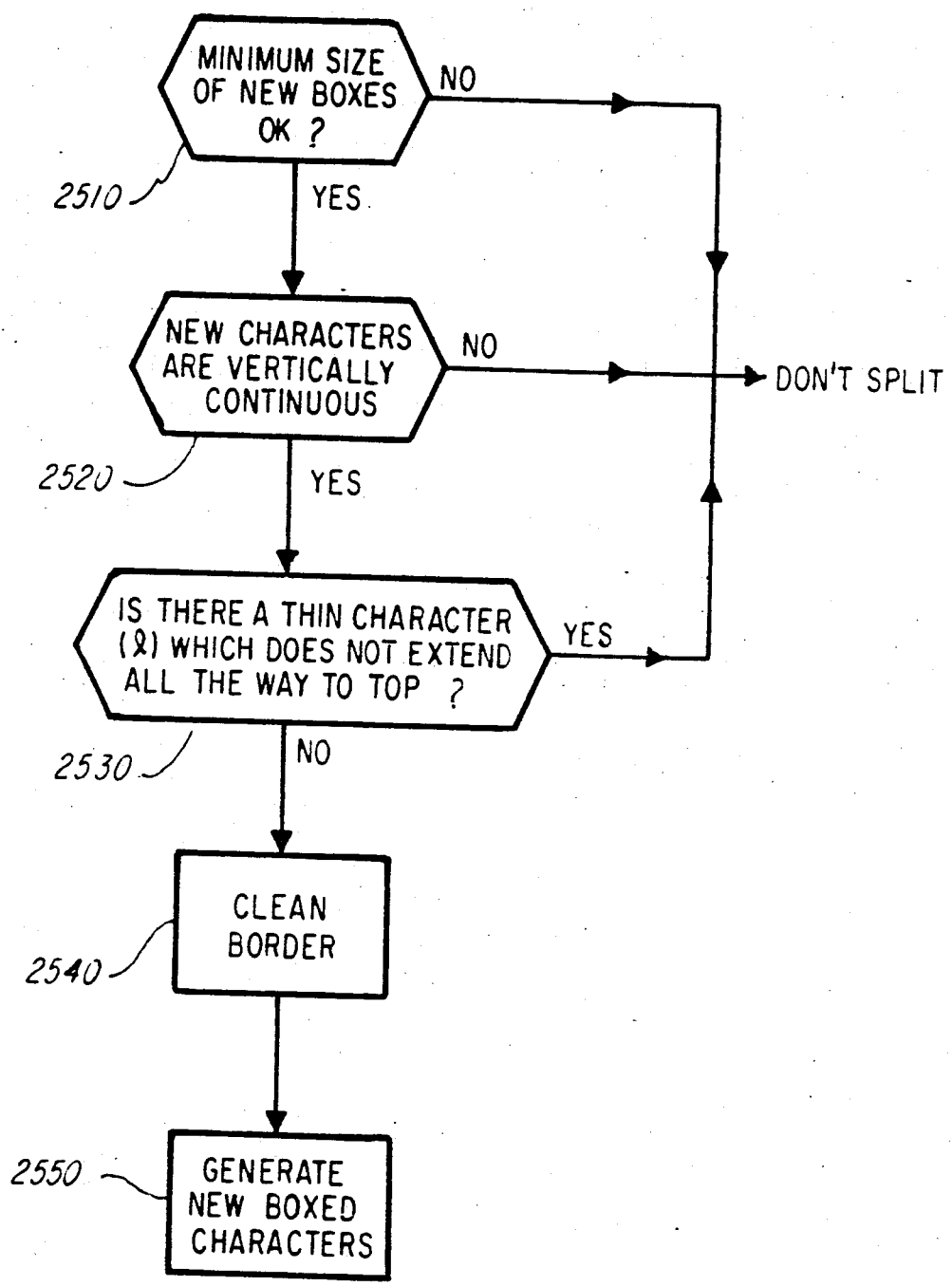
FIG. 25 illustrates how new images are framed in the touching character operation of FIG. 15.

Each of the nine processes of FIGS. 16 through 24 concluded with a construct new boxes step. This step will now be described in detail with reference to FIG. 25. The implementation of the nine processes of FIGS. 16 through 24 in nine respective sections of the program of Appendix E performs the construct new boxes step by calling for a routine defined in another section of the program of Appendix E beginning at page E54 line 29 and concluding at the end of page E63. This routine is an implementation of the process of FIG. 25 and is performed by the construct new boxes step in each one of the nine processes of FIGS. 16 through 24. The construct new boxes process of FIG. 25 responds to the identification of a point at which the character image is to be vertically split and forms a new pair of images accordingly whose boundaries ("boxes") are suitably defined. The first step in the construct new boxes process of FIG. 25 is to determine the size of each of the pair of images formed by vertically splitting the image at the specified point and then make sure that the size of each new image is greater than a predetermined minimum threshold size (block 2510 of FIG. 25). In the preferred embodiment, this determination is made by inquiring whether the height of each of the new images is at least 35% of the width of the original unsplit image. This test detects whether a letter J has been vertically split down its middle. The step of block 2510 is implemented in a section of the program of Appendix E starting at page E62 line 20 and ending at line 26 thereof. If both new images do not pass muster (NO branch of block 2510), the image is not split at this point and the touching character separation operation of FIG. 15 follows the FAIL branch of that one of the nine character split processes currently being performed to begin the next one. Otherwise (YES branch of block 2510), the next step is to make sure that each one of the pair of new images split from the original image is vertically continuous (block 2520 of FIG. 25). The step of block 2520 is implemented in a section of the program of Appendix E beginning at page E62 line 28 and ending at page E63 line 13 thereof. In essence, the step of block 2520 makes sure that there are no objects at the top and bottom of the image which are unconnected to one another. This step detects the splitting of a letter C down its middle, for example. If the characters in the two split images are not continuous (NO branch of block 2520), the original image is not split at this point, in the manner of the NO branch of block 2510 discussed above. Otherwise (YES branch of block 2520), the next step is to determine whether there is a thin object which does not extend all the way from the base line to the ascender line height or top of the image (block 2530). This step is implemented in a section of the program of Appendix E beginning at page E63 line 15 and ending at line 28 thereof. In essence, the step of block 2530 determines whether the width of the object in either one of the pair of split images relative to its height is such as to indicate a letter "l". If such an object is found which does not extend all the way to the top (ascender line height) of the image (YES branch of block 2530), the original image is not split at this point, in the manner of the NO branch of block 2510 discussed above. If no such feature is found (NO branch of block 2530), then the proposed split point is deemed to be correct. The next step is then to clean away debris near the border of each split image created by splitting the image (block 2540). Such debris, for example, may be created when the adjoining character pattern Ix is split so as to catch the right end of the seriph on the capital I into the split image containing the small x. The result of such a mistake would be an image containing the letter x and a small blob above the x on the left side of the image separated from the x by a large space. The step of block 2540 discards the blob and eliminates the empty space by lowering the top border of the image until it is adjacent the top of the letter x, in this example. To eliminate such empty spaces, the step of block 2540 looks for empty rows or columns in the image. The step of block 2540 is implemented in a section of the program of Appendix E starting at page E54 line 33 and ending at page E58 line 20. The next step is to generate the newly boxed character images formed by splitting the original image (block 2550). The step of block 2550 is implemented in a section of the program of Appendix E beginning at page E61 line 11 and ending at page E62 line 18 thereof.

Check Split Process

Figure 26:
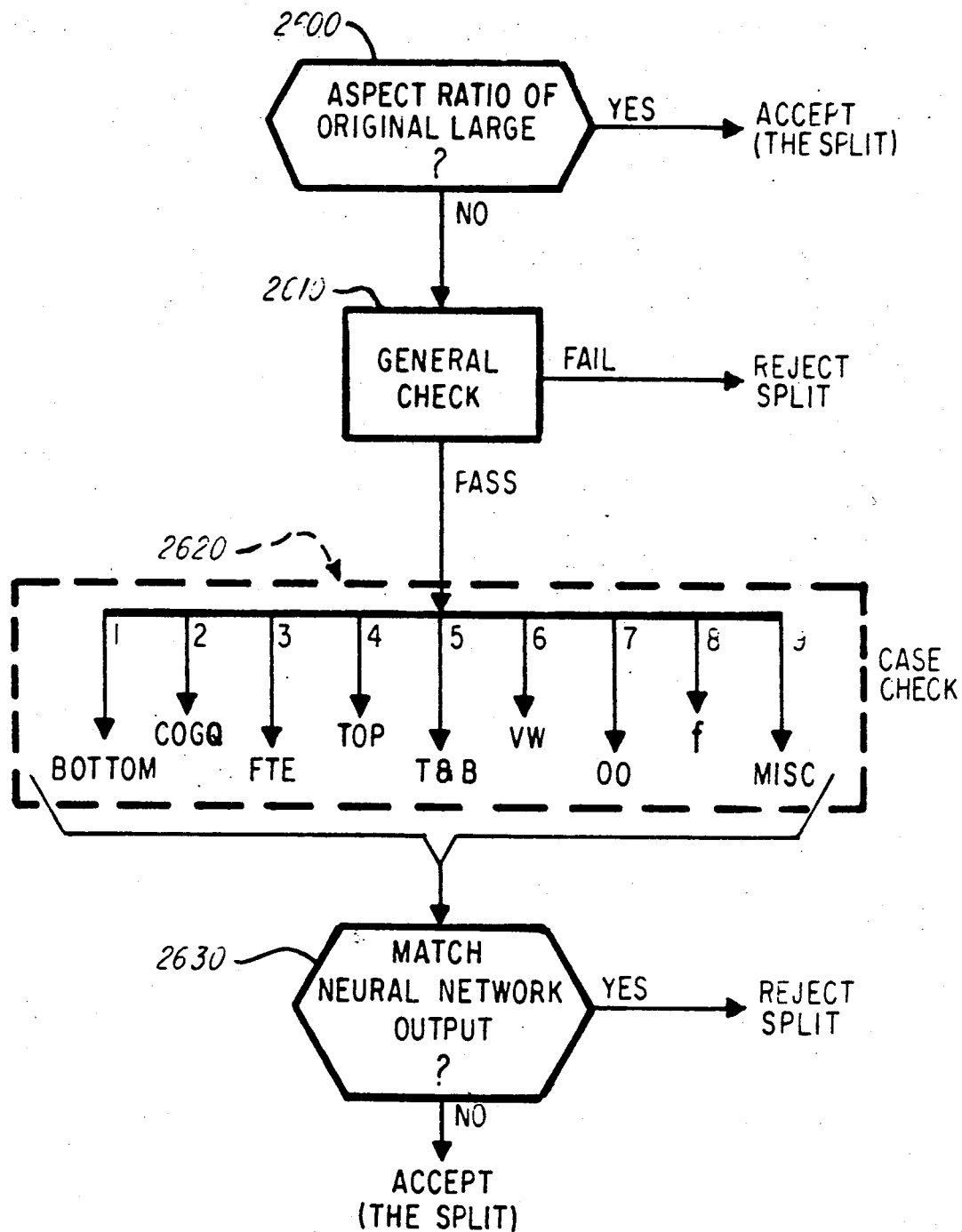
FIG. 26 illustrates a check split operation used in the touching character operation of FIG. 15 which guards against incorrect splitting of character images.

After the completion of the construct new boxes process of FIG. 25, the next step performed by the touching character separation operation of FIG. 15 is to feed back the new pair of split images one at a time to the neural network 320 (block 1565 of FIG. 15) and then use the results generated by the neural network to determine whether an image has been improperly split (block 1570 of FIG. 15), as previously discussed herein. The check split process of block 1570 is illustrated in detail in FIG. 26. The purpose of the check split process of FIG. 26 is to guard against any of the nine character splitting processes of FIG. 15 splitting a single valid symbol into two meaningless or misleading objects. All of the safeguards built into each of the nine processes of FIG. 15 (blocks 1510 though 1550) assumed that the original character image actually contained two characters. Thus, an additional safeguard is required to guard against the splitting of a character image which truly contains only a single character. This safeguard is provided by the check split process of block 1570 of FIG. 15 illustrated in FIG. 26.

The check split process of FIG. 26 commences at block at block 2600 by determining whether the aspect ratio of the original (unsplit) character image was greater than a predetermined magnitude (indicating a rather wide image). If so, the splitting of the image is deemed to be valid (YES branch of block 2600) and no further checking is performed. Generally, the predetermined aspect ratio is 2.1 if the neural network identifies one of the split images as an m or w, and is 1.5 otherwise. (Preferably, if the character image has three vertical crossings of three horizontal lines superimposed on the character image it is probably an "m", and the aspect ratio is set to 2.1. Also, if the width of the character image is found to continually decrease from top to bottom the character is probably a "w" and the aspect ratio is set to 2.1.) If the aspect ratio fails to reach this magnitude (NO branch of block 2600), then the next step is a general check process (block 2610).

In the general check process of block 2610, the splitting of the image into the two new images is rejected if, for either of the two new images, the ratio of the scores of the highest and second highest scoring symbol choices made by the neural network is less than a predetermined threshold. In the preferred embodiment, this threshold is 50. Then, the general check process of block 2610 compares the highest scoring symbol choice made by the neural network 330 for the original (unsplit) image before it was routed to the touching character separator 348 (FIG. 3) and the two symbol choices now made by the neural network 320 for the two new images into which the original image has been split with the split choice patterns illustrated in FIG. 27. If, for example, the original image was identified by the neural 27 network as a letter u and the two split images are now identified by the neural network 330 as and L and a J, for example, a match is found with one of the split choice patterns of FIG. 27 and the split is rejected. This process guards against a set of predictable mistakes liable to be made by any one of the nine splitting processes of FIG. 15 (i.e., blocks 1510 through 1550) in splitting single symbols into more than one object. If any of the split choice patterns of FIG. 27 is identified (FAIL branch of block 2610), the split is rejected. The general check process of block 2610 is implemented in a C language program attached to this specification a Appendix F beginning at page F23 line 1 and extending to page F5 line 36 thereof.

If the two split images pass all of the foregoing tests performed by the general check process (PASS branch of block 2610), then the next step is to perform one of nine individual check processes in block 2620, depending upon which one of the nine processes of blocks 1510 through 1550 of FIG. 15 identified the point at which the original image was split. The nine individual check processes are labelled inside block 2620 as 1, 2, 3, 4, 4, 6, 7, 8 and 9. While the general check process or block 2610 guarded against single character splitting mistakes common to all nine split processes of FIG. 15, the purpose of the nine individual check processes of block 2620 is to guard against single character splitting mistakes unique to individual ones of the nine split processes of FIG. 15. One version if the nine individual check processes of block 2620 is implemented in a section of the program of Appendix F beginning at page F6 line 3 through page F13 line 15. In essence, the applicable one of the noine individual check process first rejects any split for which either one of the split images produces a symbol choice by the neural network 330 (FIG. 3) whose score is less than a minimum factor greater than the second highest scoring symbol choice. The magnitude of the factor depends upon which one of the nine individual check processes of block 2620 is involved. In the preferred embodiment, this factor is 50 for the check processes 1 through 8 of block 2620 and is 100 for the individual check process 9 dedicated to the split miscellaneous process of block 1550 of FIG. 15. Assuming the split image pair passes this test, the next step in each one of the individual check processes 1 through 9 of block 2620 is analogous to the process depicted in FIG. 27. Specifically, the symbol choice previously made by the neural network 330 for the original (unsplit) image and the two symbol choices now made by the neural network 330 for the pair of images split from the original image may be thought of as being compared as a three member set to one of nine tables of split symbol choices similar to that of FIG. 27. Each one of these tables is unique to the corresponding one of the nine individual check processes of block 2620 and may be thought of as tables 1 through 9 of block 1575 of FIG. 15. While the contents of each table in the preferred embodiment may be readily deduced from the section of the program of Appendix F pertaining to block 2620, it is more useful to describe how the contents of each one of the nine tables is generated. Referring to FIG. 15, table 1 is associated with the individual check process dedicated to the first one of the split processes, namely the split at bottom process of block 1510. The contents of table 1 are generated by inputting the image of each character in a complete character set as many as 100 times and observing the output of the neural network (block 1565) whenever the character image is split by the split at bottom process of block 1510. The predominant splitting choices thus observed are mapped into table 1. For example, if the split at bottom process of block 1510 splits the letter A into a pair of symbols identified by the neural network as P and 7 fifty out of one hundred times, then A mapped to P and 7 is a pattern recorded in table 1. The same routine is followed for all of the nine processes of FIG. 15, their observed split symbol choices being recorded in the corresponding ones of the nine individual tables as an entire symbol set is tested one symbol at a time.

During actual operation, the split symbol choice pattern produced by the original and split images is compared at with the contents of the actual table called for by the corresponding one of the nine individual check processes of block 2620. If a match is found (YES branch of block 2630) the spit is rejected. Otherwise (NO branch of block 2630), the split is deemed to be valid.

INDUSTRIAL UTILITY

The invention is useful as an optical character recognition system for reading printed documents or machine-printed characters on a media.

While the invention has been described in detail by specific reference to preferred embodiments thereof, it is understood that variations and modifications may be made without departing from the true spirit and scope of the invention.

APPENDIX A1

Copyright 1990 by Eastman Kodak Company

```
/*****************************************************
********/
/**           PROCESS_WORD.C              **/
/*****************************************************
********/

/* This file contains functions for computing reference heights */
/* and lines, case correction, small symbol identification, and */
/* determination of classification confidence for each character */ include <stdio.h>
include "[tan.touch.common_modules]common.h"

/* NON-INTEGER FUNCTION DECLARATIONS */
char Determine_Symbol();
float Diff();
float find_max_aspect();
float Get_Max_Aspect_Ratio();
float Get_Min_Aspect_Ratio();
```

```c
/****************************************************************/
/*  VARIABLES GLOBAL TO THIS FILE ONLY        */
/****************************************************************/

/* WORD MAXIMUM HEIGHT AND LINE VALUES */
static int WordHeight = 0;
static int Word_Y = 0;
static int Old_Word_Y = 0;

/* REFERENCE HEIGHTS */
static float FullHeight = 0.0;
static float BigHeight = 0.0;
static float SmallHeight = 0.0;

/* REFERENCE LINES */
static int Ascender_Y = -1;
static int Descender_Y = -1;
static int Baseline = -1;

/* MAXIMUM ALLOWABLE ASPECT RATIO */
static float max_aspect;

/* COUNTERS FOR COMPUTING REFERENCE HEIGHT AVERAGES */
static int NumSmalls = 0;
static int NumBigs = 0;
static int NumFulls = 0;
static int SmallSum = 0;
static int BigSum = 0;
static int FullSum = 0;
```

```
/***********************************************
 ********/
/*                                             */
/*    Process_Word                             */
/*    ============                             */
/*        The major routine in this file. It loops   */
/*    through the given input word determining
classification */
/*        confidences, calculating reference heights and
lines,    */
/*    performing case correction, and identifying small
   */
/*        symbols.                             */
/*                                             */
/***********************************************
 ********/

Process_Word( Wordptr )

CHAR_STRUCT *Wordptr;

{
   CHAR_STRUCT *Charptr, *LastChar;
   int NumChars;
   int Word_X;
   short CharHeightType;

/* If end of line, reset all reference values */
   if (Wordptr == NULL)
   {
     WordHeight = 0;
     Word_Y = 0;
     FullHeight = 0.0;
```

```
      BigHeight = 0.0;
      SmallHeight = 0.0;
      Ascender_Y = -1;
      Descender_Y = -1;
      Baseline = -1;
      NumSmalls = 0;
      NumBigs = 0;
      NumFulls = 0;
      SmallSum = 0;
      BigSum = 0;
      FullSum = 0;
   }
   else
   {
     NumChars = 0;
     Word_X = Wordptr->Location.X;
     Word_Y = Wordptr->Location.Y;
     Charptr = Wordptr;

/* Loop through word calculating reference heights and lines */
     /* when possible.                                            */
     while (Charptr != NULL)
     {
     /* Set word maximum height and line values */
        if (Charptr->CharHeight > WordHeight)
           WordHeight = Charptr->CharHeight;
        if (Charptr->Location.Y < Word_Y)
           Word_Y = Charptr->Location.Y;

Charptr->BitmapHeightType = Determine_Bitmap_Height_Type(Charptr);
```

```
   /* Determine maximum allowable aspect ratio for this
character */
      max_aspect = find_max_aspect(Charptr);

if (Is_Good_Reference_Char(Charptr))
       Set_Reference_Heights_and_Lines(Charptr);

LastChar = Charptr;
       NumChars++;

Charptr=Charptr->NextChar;
      } if (NumChars == 1)
       Word_Y = Old_Word_Y;
       else Old_Word_Y = Word_Y;

/* Loop back through word determining
classification confidences, */
       /* performing case correction, and identifying
small symbols.     */
       Charptr = LastChar;
       while (Charptr != NULL)
       {

/* If it's the first time through PROCESS_WORD,
calculate and   */
       /* set the character's actual bitmap height type.
          */
   /*   if (Charptr->OutputChoice.Character == '*')   */
          Charptr->BitmapHeightType =
Determine_Bitmap_Height_Type(Charptr);

max_aspect = find_max_aspect(Charptr);
```

```
        if (Is_Good_Reference_Char(Charptr))
          Set_Reference_Heights_and_Lines(Charptr);

/* If character has not already been confidently
classified */
      if (Charptr->Final == FALSE)
       /* If character is a small symbol, determine what
that    */
       /* symbol is and classify character as that
symbol.      */
         if (Is_Small_Symbol(Charptr))
         {
           Charptr->OutputChoice.Character =
Determine_Symbol(Charptr);
           Charptr->OutputCharacterConfid = OK;
         Charptr->OutputChoice.Score = 1.0;
           Charptr->OutputChoice.HeightType = UNKNOWN;
         Charptr->BitmapHeightType = UNKNOWN;
         }
           else /* If classification score is high enough,
accept    */
       /* classification and set confidence to OK.
   */
           if ((Charptr->NN1_FirstChoice.Score >
FIRST_SCORE_THRES) &&
              (Charptr->ScoreRatio > FIRST_RATIO_THRES) &&
             (Charptr->AspectRatio < max_aspect) &&
             (Charptr->AspectRatio <

Get_Max_Aspect_Ratio(Charptr->NN1_FirstChoice.Character))
&&
```

```
                (Charptr->AspectRatio >

Get_Min_Aspect_Ratio(Charptr->NN1_FirstChoice.Character))
&&
                (Charptr->AspectRatio < max_aspect) &&
                ((Charptr->BitmapHeightType == UNKNOWN) ||
                 (Charptr->BitmapHeightType &
                  Determine_Char_Height_Type( Charptr->NN1_FirstChoice.Character))))
                    {
                Charptr->OutputChoice.Character =
                    Charptr->NN1_FirstChoice.Character;
                    if
(Is_Case_Ambiguous(Charptr->OutputChoice.Character))
                    {
                    /* Do case correction */
                        Case_Correct(Charptr);
                    if (Charptr->OutputChoice.Character ==
                        Charptr->NN1_FirstChoice.Character - 32)
                    {
                       if ((SmallHeight != 0.0) || (BigHeight !=
0.0))
                            {
                            NumBigs++;
                            BigSum += Charptr->CharHeight;
                            BigHeight = (float)BigSum /
(float)NumBigs;
                            }
                        }
                        else
                            if (Charptr->OutputChoice.Character !=
```

```
'p')
              {
                if ((SmallHeight != 0.0) || (BigHeight != 0.0))
                {
                  NumSmalls++;
                  SmallSum += Charptr->CharHeight;
                  SmallHeight = (float)SmallSum / (float)NumSmalls;
                }
              }
            }
          }
          Charptr->OutputCharacterConfid = OK;
          Charptr->OutputChoice.Score = Charptr->NN1_FirstChoice.Score;
          Charptr->OutputChoice.HeightType =
              Determine_Char_Height_Type(Charptr->OutputChoice.Character);
        }
            else /* Leave confidence as DONT_KNOW, but still do case */
          /* correction.                                      */
          {
            Charptr->OutputChoice.Character =
              Charptr->NN1_FirstChoice.Character;
            if (Is_Case_Ambiguous(Charptr->OutputChoice.Character))
              Case_Correct(Charptr);
            Charptr->OutputChoice.Score = Charptr->NN1_FirstChoice.Score;
            Charptr->OutputChoice.HeightType =
```

```
Determine_Char_Height_Type(Charptr->OutputChoice.Character);
        }

/* Merge consecutive single quotes to a double quote */
        if (Charptr->NextChar != NULL)
            if ((Charptr->OutputChoice.Character == '\'') &&
                (Charptr->NextChar->OutputChoice.Character == '\''))
                Merge_Single_Quotes(Charptr);

/* Equal Sign - Colon Discrimination */
        if ((Charptr->OutputChoice.Character == '=') &&
            (Charptr->AspectRatio < 0.88))
            Charptr->OutputChoice.Character = ':';

Charptr = Charptr->PreviousChar;
        }
    }
}

/***************************************************************/
/*                                                             */
/*   Determine_Symbol                                          */
/*   ================                                          */
/*     Function called by PROCESS_WORD when a small            */
/*     symbol is detected. This function determines what the   */
/*     small symbol actually is (e.g. period, comma, etc.)
```

```
/*       and sets the character's classification to that
symbol. */
/*                                                    */
/*************************************************
*******/ char
Determine_Symbol( Charptr )

CHAR_STRUCT * Charptr;

{
  char symbol;
  float AspectRatio;
  float VerticalPosition;

/* Calculate Height to Width ratio and charcter's
vertical position */
  /* in the line.                                    */
  AspectRatio = (1.0 * Charptr->CharHeight) / (1.0 *
Charptr->CharWidth);
  if ((BigHeight != 0.0) && (Ascender_Y != -1))
    VerticalPosition = ((float)(Charptr->Location.Y -
Ascender_Y) /
              BigHeight);
   else VerticalPosition = (1.0 * (Charptr->Location.Y -
Word_Y)) /
                 (1.0 * WordHeight);

symbol = '*';

if (Charptr->NN1_FirstChoice.Character == '=')
```

```
{
  if (AspectRatio < 0.88)
    symbol = '=';                    /* EQUALS SIGN */
    else symbol = ':';
}
else
if (AspectRatio < 0.65)
{
  symbol = '-';                      /* DASH */
}
  else
  if (VerticalPosition > 0.3)
  {
    if ((AspectRatio > 1.35) ||
      ((AspectRatio > 1.25) &&
        ((Baseline != -1) &&

(Diff((float)(Charptr->Location.Y+Charptr->CharHeight),
        (float)Baseline) > 2))))
    symbol = ',';                    /* COMMA */
    else symbol = '.';               /* PERIOD */
  }
    else
    if (AspectRatio > 1.2)
      symbol = '\'';                 /* SINGLE QUOTE */
      else symbol = '\"';            /* DOUBLE QOUTE */
  return(symbol);
}

/*******************************************************/
/*                                                   */
```

```
/*    Merge_Single_Quotes                              */
/*    ==================                               */
/*       Called by PROCESS_WORD to merge together two  */
/*       consecutive single quotes which were most likely */
/*       separately segmented from a double quote character.  */
/*                                                     */
/*******************************************************
********/

Merge_Single_Quotes( Charptr )

CHAR_STRUCT *Charptr;

{
  Charptr->OutputChoice.Character = '\"';
  Delete_Char(Charptr->NextChar);
}

/*******************************************************
********/
/*                                                     */
/*    Is_Case_Ambiguous                                */
/*    ================                                 */
/*       Lookup function which returns TRUE if the given */
/*    input letter is case ambiguous to the neural net */
/*    classifier, FALSE otherwise..                    */
/*                                                     */
```

```
/***********************************************
********/

Is_Case_Ambiguous( Letter )

char Letter;

{
  switch (Letter)
  {
     case 'c':
     case 'o':
     case 'p':
     case 's':
     case 'u':
     case 'v':
     case 'w':
     case 'x':
     case 'z': return(TRUE); break;
     default : return(FALSE);
  }
}

/***********************************************
********/
/*                                              */
/*    Determine_Char_Height_Type                */
/*    ==========================                */
/*            Functions which returns the theoretical height   */
/*    type for the given input symbol.          */
/*                                              */
```

```c
/***********************************************************
********/

Determine_Char_Height_Type( Symbol )
char Symbol;

{
  switch (Symbol)
  {
    case 'j': return(FULL); break;

case 'g':
    case 'q':
    case 'y': return(DESCENDER); break;

case 'a':
    case 'e':
    case 'm':
    case 'n':
    case 'r': return(SMALL); break;

case 'b':
    case 'd':
    case 'f':
    case 'h':
    case 'k':
    case 'l':
    case 'A':
    case 'B':
    case 'C':
    case 'D':
    case 'E':
    case 'F':
```

```
case 'G':
case 'H':
case 'I':
case 'J':
case 'K':
case 'L':
case 'M':
case 'N':
case 'O':
case 'P':
case 'R':
case 'S':
case 'T':
case 'U':
case 'V':
case 'W':
case 'Y':
case 'Z':
case '2':
case '3':
case '4':
case '5':
case '6':
case '7':
case '8':
case '9': return(ASCENDER); break;

case 'c':
case 'o':
case 's':
case 't':
case 'u':
case 'v':
```

```
    case 'w':
    case 'x':
    case 'z':
        case '=':
    case ':':
    case '+': return(SMALL|ASCENDER); break;

case 'i':           return(SMALL|ASCENDER|FULL);
break;

case 'p': return(ASCENDER|DESCENDER); break;

case ';':           return(SMALL|DESCENDER); break;

case 'Q':
    case '\@':
    case '\#':
    case '\$':
    case '\%':
    case '\&':
    case '\(':
    case '\)':
    case '\\':
    case '\/':
    case '\?':      return(ASCENDER|FULL);  break;

default : return(UNKNOWN);
    }
}

/*************************************************************
********/
/*                                                         */
```

```
/*    Determine_Bitmap_Height_Type                      */
/*    =============================                     */
/*         Function which calculates the given character's */
/*    actual bitmap height type with respect to the current */
/*    reference height and line values.                 */
/*                                                      */
/**************************************************************/

Determine_Bitmap_Height_Type ( Charptr )

CHAR_STRUCT *Charptr;

{
  float BitmapHeight;
  float SmallDiff, BigDiff, FullDiff;

BitmapHeight = (float)Charptr->CharHeight;

/* SMALL, BIG, FULL */
  if ((SmallHeight != 0.0) && (BigHeight != 0.0) && (FullHeight != 0.0))
    {
    SmallDiff = Diff(SmallHeight,BitmapHeight);
    BigDiff = Diff(BigHeight,BitmapHeight);
    FullDiff = Diff(FullHeight,BitmapHeight);

if (SmallDiff < BigDiff)
      return(SMALL);
      else
      if ((BigDiff < SmallDiff) && (BigDiff < FullDiff))
```

```
return(Determine_Ascender_or_Descender(Charptr));
    else
       if (FullDiff < BigDiff)
          return(FULL);
} else

/* SMALL, BIG, NO FULL */
  if ((SmallHeight != 0.0) && (BigHeight != 0.0) &&
(FullHeight == 0.0))
  {
    SmallDiff = Diff(SmallHeight,BitmapHeight);
    BigDiff = Diff(BigHeight,BitmapHeight);
    if (SmallDiff < BigDiff)
      return(SMALL);
     else
      if ((BigDiff < SmallDiff) && ((BitmapHeight -
BigHeight) <=3))
        return(Determine_Ascender_or_Descender(Charptr));
       else
         if (SmallDiff != BigDiff)
            return(FULL);
  } else

/* SMALL, NO BIG, FULL */
  if ((SmallHeight != 0.0) && (BigHeight == 0.0) &&
(FullHeight != 0.0))
  {
    if (BitmapHeight - SmallHeight < 3)
       return(SMALL);
```

```
        else
    if (BitmapHeight - FullHeight > -3)
      return(FULL);
      else
return(Determine_Ascender_or_Descender(Charptr));
  } else

/* SMALL, NO BIG, NO FULL */
  if ((SmallHeight != 0.0) && (BigHeight == 0.0) &&
(FullHeight == 0.0))
    {
    if (Diff(SmallHeight,BitmapHeight) < 3)
      return(SMALL);
    } else
  /* NO SMALL, BIG, FULL */
  if ((SmallHeight == 0.0) && (BigHeight != 0.0) &&
(FullHeight != 0.0))
    {
    BigDiff = Diff(BigHeight,BitmapHeight);
    FullDiff = Diff(FullHeight,BitmapHeight);

if (FullDiff < BigDiff)
      return(FULL);
      else
    if ((BigDiff < FullDiff) && ((BitmapHeight -
BigHeight) > -3))
        return(Determine_Ascender_or_Descender(Charptr));
        else
          if (BigDiff != FullDiff)
```

```
        return(SMALL);
  } else

/* NO SMALL, BIG, NO FULL */
  if ((SmallHeight == 0.0) && (BigHeight != 0.0) &&
(FullHeight == 0.0))
  {
    if (Diff(BigHeight,BitmapHeight) < 3)
      return(Determine_Ascender_or_Descender(Charptr));
    else
    if (BitmapHeight < BigHeight)
      return(SMALL);
      else return(FULL);
  }
  else /* NO SMALL, NO BIG, FULL */
  if ((SmallHeight == 0.0) && (BigHeight == 0.0) &&
(FullHeight != 0.0))
  {
    if (Diff(FullHeight,BitmapHeight) < 3)
      return(FULL);
  } return(UNKNOWN);
}

/*************************************************
********/
/*                                              */
/*   Determine_Ascender_or_Descender            */
```

```
/*   ===========================                              */
/*                                                  */
/*****************************************************************/

Determine_Ascender_or_Descender( Charptr )

CHAR_STRUCT *Charptr;

{
  if ((Charptr->Location.Y + Charptr->CharHeight - Baseline) > 2)
    return(DESCENDER);
    else return(ASCENDER);
}

/*****************************************************************/
/*                                                  */
/*   Case_Correct                                   */
/*   ============                                   */
/*       Performs case correction for a case ambiguous */
/*   character by comparing its heights and vertical */
/*   positioning to current reference heights and lines. */
/*                                                  */
/*****************************************************************/

Case_Correct ( Charptr )

CHAR_STRUCT *Charptr;
```

```
{
    if (Charptr->OutputChoice.Character == 'p')
    {
        if (Baseline != -1)
        {
            if
(Diff((float)(Charptr->Location.Y+Charptr->CharHeight),
            (float)Baseline) < 3)
                Charptr->OutputChoice.Character = 'P';
        }
    }
    else
        if ((BigHeight != 0.0) && (SmallHeight != 0.0))
        {
            if ((Charptr->CharHeight >= BigHeight) ||
                (Diff((float)Charptr->CharHeight,BigHeight) <
                 Diff((float)Charptr->CharHeight,SmallHeight)))
              Charptr->OutputChoice.Character =
              Charptr->NN1_FirstChoice.Character - 32;
        }
        else
    if ((BigHeight == 0.0) && (SmallHeight != 0.0))
    {
        if (Diff((float)Charptr->CharHeight,SmallHeight) >
2)
            Charptr->OutputChoice.Character =
            Charptr->NN1_FirstChoice.Character - 32;
    }
        else
    if ((BigHeight != 0.0) && (SmallHeight == 0.0))
    {
        if ((Charptr->CharHeight >= BigHeight) ||
            (Diff((float)Charptr->CharHeight,BigHeight) <
```

```
3))
            Charptr->OutputChoice.Character =
            Charptr->NN1_FirstChoice.Character - 32;
        }
/*
        else
            if ((float)Charptr->CharHeight /
(float)WordHeight > 0.85)
                Charptr->OutputChoice.Character =
            Charptr->NN1_FirstChoice.Character - 32;
*/
}

/************************************************
********/
/*                                              */
/*   Diff                                       */
/*   ====                                       */
/*      Calculates and returns the absolute difference
*/
/*   between two numbers.                       */
/*                                              */
/************************************************
********/ float
Diff ( Int1, Int2 )

float Int1;
float Int2;

{
    float diff;
```

```
   diff = Int1 - Int2;
   if (diff < 0)
     diff = -diff;
   return(diff);
}
```

```
/*************************************************
********/
/*                                              */
/*   Is_Small_Symbol                            */
/*   ===============                            */
/*                                              */
/*      Called by PROCESS_WORD to determine whether the */
/*   given character is a small symbol or not. Returns TRUE */
/*   if the given character is small enough with respect to */
/*   current reference heights to be a small symbol, FALSE */
/*   otherwise.                                 */
/*                                              */
/*************************************************
********/ int
Is_Small_Symbol( Charptr )

CHAR_STRUCT *Charptr;

{
   float SmallRatio;
   float BigRatio;
   if (SmallHeight != 0.0)
```

```c
{
    SmallRatio = (float)Charptr->CharHeight /
(float)SmallHeight;
    if (SmallRatio < 0.82)
      return(TRUE);
      else
        if ((SmallRatio < 0.95) &&
          ((Baseline - Charptr->Location.Y -
Charptr->CharHeight) > 3))
          return(TRUE);
          else return(FALSE);
  } if (BigHeight != 0.0)
  {
    BigRatio = (float)Charptr->CharHeight /
(float)BigHeight;
    if (BigRatio < 0.55)
      return(TRUE);
      else
      if ((BigRatio < 0.68) &&
          ((Baseline - Charptr->Location.Y -
Charptr->CharHeight) > 3))
          return(TRUE);
            else return(FALSE);

} if ((((float)Charptr->CharHeight) /
((float)WordHeight)) < 0.45)
    return(TRUE);
    else return(FALSE);

}
```

```
/***********************************************************/
/*                                                         */
/*   Is_Good_Reference_Char                                */
/*   =====================                                 */
/*       Called by PROCESS_WORD to determine whether the   */
/*   given character should be used as a reference for     */
/*   computing reference heights and lines. Returns TRUE if*/
/*   the given character has a high classification score,  */
/*   acceptable aspect ratio, and is not a small symbol.   */
/*   Returns FALSE otherwise.                              */
/*                                                         */
/***********************************************************/

Is_Good_Reference_Char (Charptr)

CHAR_STRUCT *Charptr;

{
  if ((Charptr->NN1_FirstChoice.Score > FIRST_SCORE_THRES) &&
      (Charptr->ScoreRatio > FIRST_RATIO_THRES) &&
      (Charptr->AspectRatio < max_aspect) &&
      (Charptr->AspectRatio <

Get_Max_Aspect_Ratio(Charptr->NN1_FirstChoice.Character)) &&
```

```c
        (Charptr->AspectRatio >

Get_Min_Aspect_Ratio(Charptr->NN1_FirstChoice.Character))
&&
        (Is_Small_Symbol(Charptr) == FALSE))
    {
    /* This may not be necessary with 24 x 18 scaler */
      if ((SmallHeight == 0.0) &&
(Charptr->NN1_FirstChoice.Character == 'm'))
            return(FALSE);
      else
      if ((SmallHeight != 0.0) && (BigHeight != 0.0))
      {
         if ((Charptr->BitmapHeightType != UNKNOWN) &&
           (Charptr->BitmapHeightType &

Determine_Char_Height_Type(Charptr->NN1_FirstChoice.Chara
cter) == 0))
             return(FALSE);
         else return(TRUE);
      }
        else
      if ((SmallHeight != 0.0) && (BigHeight == 0.0))
      {
            if
(((Determine_Char_Height_Type(Charptr->NN1_FirstChoice.Ch
aracter)
                & (SMALL | FULL)) == 0) &&
              ((SmallHeight / (float)Charptr->CharHeight)
> 0.9))
               return(FALSE);
            else return(TRUE);
      }
```

```
            else
                if((SmallHeight == 0.0) && (BigHeight != 0.0))
                {
                    if
((Determine_Char_Height_Type(Charptr->NN1_FirstChoice.Character)
                        == SMALL) &&
                        (((float)Charptr->CharHeight /
BigHeight) > 0.9))
                        return(FALSE);
                    else return(TRUE);
                }
                else return(TRUE);
    }
    else return(FALSE);
}

/*************************************************************/
/*                                                           */
/*   Set_Reference_Heights_and_Lines                         */
/*   ================================                        */
/*       Computes new values for reference heights and       */
/*   lines based on the given reference character's height   */
/*   type.                                                   */
/*                                                           */
/*************************************************************/

Set_Reference_Heights_and_Lines (Charptr)

CHAR_STRUCT *Charptr;
```

```
{
   int HeightType;
   HeightType =
Determine_Char_Height_Type(Charptr->NN1_FirstChoice.Chara
cter);

switch (HeightType)
   {
      case FULL : NumFulls++;
                  FullSum += Charptr->CharHeight;
                  FullHeight = (float)FullSum /
(float)NumFulls;
                  Ascender_Y = Charptr->Location.Y;
                  Descender_Y = Ascender_Y + FullHeight;
                  break;

case ASCENDER  : NumBigs++;
                  BigSum += Charptr->CharHeight;
                  BigHeight = (float)BigSum /
(float)NumBigs;
                  Ascender_Y = Charptr->Location.Y;
                  Baseline = Charptr->Location.Y +
                        Charptr->CharHeight;
                  break;

case DESCENDER : NumBigs++;
                  BigSum += Charptr->CharHeight;
                  BigHeight = (float)BigSum /
(float)NumBigs;
                  Descender_Y = Charptr->Location.Y +
BigHeight;
                  break;
```

```
        case SMALL       : NumSmalls++;
                           SmallSum += Charptr->CharHeight;
                           SmallHeight = (float)SmallSum /
(float)NumSmalls;
                           Baseline = Charptr->Location.Y +
                                   Charptr->CharHeight;
                           break;

case SMALL|ASCENDER : Baseline = Charptr->Location.Y +

Charptr->CharHeight;
                           break;

case ASCENDER|DESCENDER : NumBigs++;
                           BigSum += Charptr->CharHeight;
                           BigHeight = (float)BigSum /
(float)NumBigs;

break;
    }
}
```

APPENDIX A2

Copyright 1990 by Eastman Kodak Company

```
/*******************************************************/
/*         CHARACTER_LIST_FUNCTIONS.C                  */
/*******************************************************/

/* This file contains the basic routines for creating and main- */
/* taining lists of character data structures.         */ include <stdio.h>
```

```c
#include "[tan.touch.common_modules]common.h"
#ifdef PC
#include <malloc.h>
endif /************************************************
****/
/*                                              */
/*    Create_Char                               */
/*    ===========                               */
/*        Creates a new character data structure. */
/*    Allocates memory, initializes field values, and returns */
/*    a pointer to the structure.               */
/*                                              */
/************************************************
****/

CHAR_STRUCT *
Create_Char( CharImagePtr, ScaledImagePtr, Width, Height, X ,Y )

byte *CharImagePtr[];        /* pointer to actual character bitmap */
byte *ScaledImagePtr[];      /* pointer to scaled character bitmap */
int  Width;                  /* character height */
int  Height;                 /* character width */
int  X;                      /* (x,y) location in document image    */
int  Y;                      /* of top left corner of character's   */
```

/* bounding box */

```c
{
   CHAR_STRUCT *Charptr;

if ((Charptr = (CHAR_STRUCT *)malloc(sizeof(CHAR_STRUCT))) == 0)
      printf("********** CREATE CHAR MALLOC ERROR *********\n");
   Charptr->CharImagePtr = CharImagePtr;
   Charptr->ScaledImagePtr = ScaledImagePtr;
   Charptr->OutputChoice.Character = '*';
   Charptr->OutputCharacterConfid = NOT_SURE;
   Charptr->CharWidth = Width;
   Charptr->CharHeight = Height;
   Charptr->BitmapHeightType = UNKNOWN;
   Charptr->AspectRatio = (double)Width / (double)Height;
   Charptr->Location.X = X;
   Charptr->Location.Y = Y;
   Charptr->DeKerned = false;
   Charptr->DeTouched = false;
   Charptr->Merged = false;
   Charptr->Final = false;
   Charptr->TouchingChar = false;
   Charptr->NextChar = NULL;
   Charptr->PreviousChar = NULL;
   return(Charptr);
}
```

/*************************************************/
/* */

```
/*   Insert_Char                                    */
/*   ==========                                     */
/*       Creates and inserts a new character data   */
/*   structure into a character list after the given */
/*   Charptr. Returns a pointer to the newly inserted */
/*   character.                                     */
/*                                                  */
/**********************************************************/

CHAR_STRUCT *
Insert_Char( Charptr, CharImagePtr, ScaledImagePtr,
Width, Height, X, Y )

CHAR_STRUCT *Charptr;
byte         *CharImagePtr[];
byte         *ScaledImagePtr[];
int     Width;
int     Height;
int     X;
int     Y;

{
  CHAR_STRUCT *NewCharptr;

NewCharptr =
Create_Char(CharImagePtr,ScaledImagePtr,Width,Height,X,Y)
;
  NewCharptr->NextChar = Charptr->NextChar;
  Charptr->NextChar = NewCharptr;
  NewCharptr->PreviousChar = Charptr;
```

```
    if (NewCharptr->NextChar != NULL)
      NewCharptr->NextChar->PreviousChar = NewCharptr;
    return(NewCharptr);
}

/***********************************************************
*******/
/*                                                         */
/*    Delete_Char                                          */
/*    ===========                                          */
/*        Removes the given character data structure       */
/*    from a character list.                               */
/*                                                         */
/***********************************************************
*******/

Delete_Char( Charptr )
CHAR_STRUCT *Charptr;
{
  if (Charptr->PreviousChar != NULL)
    Charptr->PreviousChar->NextChar = Charptr->NextChar;
  if (Charptr->NextChar != NULL)
    Charptr->NextChar->PreviousChar = Charptr->PreviousChar;
}
```

APPENDIX A3

Copyright 1990 by Eastman Kodak Company

```
/***********************************************************
******************/
/*                                                         */
/*                        Second_Guess
```

```
/*                              */
/*      This will be called if:                       */
/*              The character is not OK
                        */
/*              The character has been Dekerned and
Detouched               */
/*              The BitmapHeightType is not UNKNOWN
                        */
/*              The first choice's HeightType is not the
same as the             */
/*              BitmapHeightType OR the Bitmap's Aspect
Ratio is                */
/*              not within the range of Aspect Ratios
for the first           */
/*              choice character
                        */
/*                              */
/*      If second OR third choice have the same
HeightType as the               */
/*      BitmapHeightType AND if the Bitmap's Aspect Ratio
is within the           */
/*      range of Aspect Ratios for the second or third
choice, the             */
/*      Output character will be changed to that of
character with the              */
/*      correct HeightType AND the correct Aspect_Ratio.
                        */
/*      If both second AND third choice have the same
HeightType as          */
```

/*     the BitmapHeightType AND the Probabilitiy Error Matrix is used to     */
/*     determine which character is most likely to be confused with the     */
/*     first choice character.  The Output Character is changed to that of     */
/*     of the second or third choice character that is most confusable with     */
/*     the first choice character.
                */
/*          If neither the second OR the third choice characters have the     */
/*     same HeightType as the BitmapHeightType the PEM will be used to make     */
/*     A Last Ditch Guess.  The PEM is used to determine which character     */
/*     is most likely to be confused with the first choice made AND has a     */
/*     HeightType congruent with that of the BitmapHeightType.  This     */
/*     will be the Output character.
                */
/*
                */
/*********************************************************************************/

```
#include <stdio.h>
#include <math.h>
#include "[tan.touch.common_modules]common.h"

typedef unsigned char Boolean;
#define TRUE 1
```

```
define False 0 static char charset[64] =
     { 'A', 'a', 'B', 'b', 'c', 'D', 'd', 'E', 'e', 'F',
'f', 'G', 'g', 'H',
       'h', 'I', 'i', 'J', 'j', 'K', 'k', 'L', 'l', 'M',
'm', 'N', 'n', 'o',
       'p', 'Q', 'q', 'R', 'r', 's', 'T', 't', 'u', 'v',
'w', 'x', 'Y', 'y',
       'z', '2', '3', '4', '5', '6', '7', '8', '9', '\@',
'\#', '\$', '\%',
       '\&', '\(', '\)', '\+', '\=', '\\', '\;', '\?',
'\/' };

Second_Guess (Charptr)

CHAR_STRUCT  *Charptr;

{
  int      FirstChoiceIndex, SecondChoiceIndex,
ThirdChoiceIndex;
  int      MaxConfusedIndex, i, j;
  int      NoGood[64];

double   SecondScore, ThirdScore, MaxConfusedScore;
double      PEM[64][64];

char     MaxConfusedChar;

Boolean    NoOutputChar;

Charptr->NN1_SecondChoice.HeightType =
```

```
Determine_Char_Height_Type(Charptr->NN1_SecondChoice.Character);
        Charptr->NN1_ThirdChoice.HeightType =

Determine_Char_Height_Type(Charptr->NN1_ThirdChoice.Character);

FirstChoiceIndex =
Get_Index(Charptr->NN1_FirstChoice.Character);
    SecondChoiceIndex =
Get_Index(Charptr->NN1_SecondChoice.Character);
    ThirdChoiceIndex =
Get_Index(Charptr->NN1_ThirdChoice.Character);

if ((Charptr->BitmapHeightType &
              Charptr->NN1_SecondChoice.HeightType))
         &&
      (Charptr->BitmapHeightType &
              Charptr->NN1_ThirdChoice.HeightType))
       {
     SecondScore
=(PEM[SecondChoiceIndex][FirstChoiceIndex]);
        ThirdScore =
(PEM[ThirdChoiceIndex][FirstChoiceIndex]);

if (SecondScore >= ThirdScore)
           Charptr->OutputChoice.Character =
             Charptr->NN1_SecondChoice.Character;
         else
           Charptr->OutputChoice.Character =
             Charptr->NN1_ThirdChoice.Character;
       }
```

```
    else if ((Charptr->BitmapHeightType &
            Charptr->NN1-SecondChoice.HeightType)
          ||
        (Charptr->BitmapHeightType &
            Charptr->NN1_ThirdChoice.HeightType))
{
        if (Charptr->BitmapHeightType &
            Charptr->NN1_SecondChoice.HeightType)
          Charptr->OutputChoice.Character =
            Charptr->NN1_SecondChoice.Character;

else if (Charptr->BitmapHeightType &
                Charptr->NN1_ThirdChoice.HeightType)
          Charptr->OutputChoice.Character =
            Charptr->NN1_ThirdChoice.Character;
    } else if ((Charptr->BitmapHeightType &
            Charptr->NN1_SecondChoice.HeightType ==
0)
            &&
        (Charptr->BitmapHeightType &
            Charptr->NN1_ThirdChoice.HeightType ==
0))
    {
        for (i=0;i<64;i++)
          {
            NoGood[i] = -1;
          }
        NoOutputChar = TRUE;
        while (NoOutputChar == TRUE)
          {
            for (i=0;i<64;i++)
```

```
            {
                MaxConfusedScore = 0;
                MaxConfusedIndex = 0;

if ((PEM[i][FirstChoiceIndex] >
MaxConfusedScore) &&
                    (NoGood[i] != 1))
                    {
                       MaxConfusedIndex = i;
                       MaxConfusedScore =
PEM[i][FirstChoiceIndex];
                    }
                MaxConfusedChar =
charset[MaConfusedIndex];
                if (Charptr->BitmapHeightType &

(Determine_Char_Height_Type(MaxConfusedChar)))
                    {
                       Charptr->OutputChoice.Character =
MaxConfusedChar;
                       NoOutputChar = FALSE;
                    }
                else
                    {
                       NoGood[MaxConfusedIndex] = 1;
                    }
                if (i == 63 && NoOutputChar == TRUE)
                    NoOutputChar = FALSE;
            }
        }
    } int   Get_Index (ch)
char ch;
```

```
{
    int i;

for (i=0; i<64; i++)
    {
        if (ch == charset[i])
            return (i);
    }
}
```

APPENDIX B

Copyright 1990 by Eastman Kodak Company

```
/****************************************************
********************
*
*       Procedure: ComputeFai
*
*       Author: Louis J. Beato
*       Date:    04/06/88
*
*       Modification History:
*
*       Purpose: This procedure computes F(ai) which is
the output firing
*                function for the neurons.
*
*       Calling Sequence:  ComputeFai();
*
*       Operational Details: The function is of the form:
*                                          1
*                                      -------------
*                                          -ax
```

```
 *                                            1 + e
 *
 *************************************************
 ******************/
ComputeFail()
{
#ifdef PC
#else
register double *WeightPtr,
                *BiasPtr,
                Sum,
                *InputPtr,
                *HiddenPtr,
                *OutputPtr;

register int    I, J;

/* First we do the hidden layer */
        HiddenPtr = HiddenUnit1;
        BiasPtr   = Bias_HiddenUnit1;
        for (I = 0; I < NumberOfHiddenUnits1; I++)
        {
                /* Point to each weight array for each
 neuron on this level */
                WeightPtr = Weight_HiddenUnit1[I];
                InputPtr  = InputUnit1;

Sum = 0;

for (J = 0; J < NumberOfInputUnits1; J++)
                {
                        /* Check to see if the input is a
``` zero or a 1 */

```
                if (*InputPtr++ != 0)
                    Sum += *WeightPtr;
                WeightPtr++;
            }
            Sum += *BiasPtr++;
            *HiddenPtr++ =   ((double)1.0 /
                                ((double)1.0 +
exp(-Sum))) - 0.5;
        }
        /* Next we do the output layer */
        OutputPtr = OutputUnit1;
        BiasPtr   = Bias_OutputUnit1;
        for (I = 0; I < NumberOfOutputUnits1; I++)
        {
            /* Point to each weight array for each
neuron on this level */
            WeightPtr = Weight_OutputUnit1[I];
            HiddenPtr = HiddenUnit1;

Sum = 0;

for (J = 0; J < NumberOfHiddenUnits1;
J++)
            {
                Sum += (*WeightPtr++ *
*HiddenPtr++);
            }
            Sum += *BiasPtr++;
            *OutputPtr++ =   (double)1.0 /
                                ((double)1.0 +
exp(-Sum));
        }
#endif
}
```

APPENDIX C

Copyright 1990 by Eastman Kodak Company

```c
#include <stdio.h>
#include "neural.h"

/* External file declarations */ double    exp(),
     fabs();

short     GetAscNumberOfInputUnits(),
     GetAscNumberOfOutputUnits(),
     GetNumberOfHiddenUnits();

FILE *fopen(),
     *fpread,
     *fpwrite;

/********************* Global Variable definitions
********************/

/* NOTE: Global variables will be used in this module for speed considerations.
     It is not the author's intention to violate good programming practices.
     Since this module is very time critical, every consideration will be
        made to increase speed of execution.                    */

/* Declarations for the Network matrix, Note that pointers are used and
     the arrays will be allocated with malloc. */
```

```
double      *OutputUnit;
double      *HiddenUnit;
double      *InputUnit;
double      *TargetOutputUnit;

/* Declarations for the Weight and Bias Matrices */ double      *Bias_HiddenUnit;
double      *Bias_OutputUnit;
double      *Weight_HiddenUnit[NETDEPTH];
double      *Weight_OutputUnit[NETDEPTH];

double      *DeltaBias_HiddenUnit;
double      *DeltaBias_OutputUnit;
double      *DeltaWeight_HiddenUnit[NETDEPTH];
double      *DeltaWeight_OutputUnit[NETDEPTH];

double      *PreviousDeltaBias_HiddenUnit;
double      *PreviousDeltaBias_OutputUnit;
double      *PreviousDeltaWeight_HiddenUnit[NETDEPTH];
double      *PreviousDeltaWeight_OutputUnit[NETDEPTH];

/* Declarations for the Weight and Bias Matrices */ double      *Error_HiddenUnit;
double      *Error_OutputUnit;

/* Support variables for calculations */ double      LearningRate;
double      Momentum = 0.9;
```

```c
/* General Declarations */ int  LookupTable[MAX_TRAINING_SIZE];   /* This allows 20,000 entries to be used in training */

TRAINING_DATA  TrainingData[MAX_TRAINING_SIZE];
int  TableMarker;
int  NumberOfTrainingElements;

int  NumberOfInputUnits,
     NumberOfOutputUnits,
     NumberOfHiddenUnits;

double   *debugptr;
double   MaxError;
int  MaxErrorIndex;

char TempFilename[80]="Weights_And_Bias.temp";
char OutFilename[80] ="Weights_And_Bias.out";

int  UpdateFrequency,
     DumpDataFrequency;

long LoopCounter;

char WeightsAndBiasFilename[80]="Weights_And_Bias.net",
     OutputDataFilename[80];
/********************************************************
********************
*
*     Procedure:    Main
*
```

```
*       Author: Louis J. Beato
*       Date:     03/23/88
*
*       Modification History:
*
*       Purpose: The purpose of the Main procedure is to act as the
*                beginning of the module.
*
*       Calling Sequence:   None
*
*       Operational Details:
*
***********************************************************************/
main()
{
static    char BuilderOutputFilename[80];
static    int  Index;

ClearScreen();

printf ("\n                              >>>>   NEURAL Network Trainer  <<<<\n");
     printf ("by: Louis J. Beato \n");
     printf ("Dept. 641 - Image Electronics Center \n");
     printf ("March 23, 1988 \n");
     printf ("Updated: August 01, 1988 \n");
```

```
    printf ("\nPlease enter the filename of the input
data -> ");
    scanf ("%s", BuilderOutputFilename);

NumberOfInputUnits  = GetAscNumberOfInputUnits
(BuilderOutputFilename);
    NumberOfOutputUnits = GetAscNumberOfOutputUnits
(BuilderOutputFilename);
    NumberOfTrainingElements =
GetAscNumberOfTrainingElements (BuilderOutputFilename);

printf ("The number of INPUT units is ->
%d\n",NumberOfInputUnits);
    printf ("The number of OUTPUT units is ->
%d\n",NumberOfOutputUnits);
    printf ("\nPlease enter the number of HIDDEN Units
-> ");
    scanf ("%d",&NumberOfHiddenUnits);

printf ("\nThe number of TRAINING Elements is ->
%d\n",NumberOfTrainingElements);
    printf ("\nPlease enter the Learning Rate -> ");
    scanf ("%lf", &LearningRate);

printf ("\n\nPlease enter the Screen Update
Frequency -> ");
    scanf ("%d", &UpdateFrequency);

printf ("\n\nPlease enter the Data Dump Frequency ->
");
    scanf ("%d", &DumpDataFrequency);
```

```
    AllocateStorage();

LoadTrainingData (BuilderOutputFilename);

InitializeNet();

/* Check to see if a Weights and Bias file exists
and load it
    if it does */

PreLoadNet();

SetupLookupTable();

LoopCounter = 0;
    do
    {
        Index = GetIndex();

SetupInputsAndTargets(Index);
/*      DumpNetData(); */

ComputeFai();

ComputeError();

AdjustWeightsAndBiases();

ExamineData();

CheckForScreenUpdate();

LoopCounter++;
```

```
        CheckForDataFileUpdate();

} while (MaxError > MAXERROR);

printf ("The number of iterations is ->
%d\n",LoopCounter);

printf ("Saving weights and biases\n");

WriteWeightsAndBiases (WeightsAndBiasFilename);

delete (OutFilename);
}
/***********************************************
********************
*
*   Procedure: InitializeNet
*
*   Author: Louis J. Beato
*   Date:       04/06/88
*
*   Modification History:
*
*   Purpose: The purpose of this procedure is to
initialize all the
*           variables associated with the network.
*
*   Calling Sequence: InitializeNet();
*
*   Operational Details:
*
***********************************************
********************/
```

```
InitializeNet()
{
int  I, J, K;

for (I = 0; I < NumberOfHiddenUnits; I++)
    {
        Bias_HiddenUnit[I] =
((double)GetRandomNumber(20)-10.0) /
            ((NumberOfHiddenUnits +
NumberOfOutputUnits) * 100);
        PreviousDeltaBias_HiddenUnit[I] = 0.0;
        for (J = 0; J < NumberOfInputUnits; J++)
        {
            Weight_HiddenUnit[I][J] =
                ((double)GetRandomNumber(20) - 10.0)
/
            ((NumberOfHiddenUnits +
NumberOfOutputUnits) * 100);
            PreviousDeltaWeight_HiddenUnit[I][J] =
0.0;

}
    }
    for (I = 0; I < NumberOfOutputUnits; I++)
    {
        Bias_OutputUnit[I] =
((double)GetRandomNumber(20)-10.0) /
            ((NumberOfHiddenUnits +
NumberOfOutputUnits) * 100);
        PreviousDeltaBias_OutputUnit[I] = 0.0;

for (J = 0; J < NumberOfHiddenUnits; J++)
        {
```

```
                Weight_OutputUnit[I][J] =
                        ((double)GetRandomNumber(20)-10.0) /
                        ((NumberOfHiddenUnits +
NumberOfOutputUnits) * 100);
                PreviousDeltaWeight_OutputUnit[I][J] =
0.0;

}
        }
    }
/*************************************************************
********************
*
*       Procedure: PreLoadNet
*
*       Author: Louis J. Beato
*       Date:      04/06/88
*
*       Modification History:
*
*       Purpose: The prupose of this procedure is to Preload
the neural net
*           if a weight/bias file exists with the name
WeightsAndBias.Out
*           of WeightsAndBias.tmp.
*
*       Calling Sequence: PreLoadNet
*
*       Operational Details:
*
*************************************************************
******************/
PreLoadNet()
```

```c
{
FILE *fpread;

fpread = fopen (TempFilename, "r");
    if (fpread != NULL)
    {
        fclose (fpread);
        ReadWeightsAndBiases(TempFilename);
    }
    else
    {
        fpread = fopen (OutFilename, "r");
        if (fpread != NULL)
        {
            fclose (fpread);
            ReadWeightsAndBiases(OutFilename);
        }

}
}
/*******************************************************************
 *
 *      Procedure: ComputeError
 *
 *      Author: Louis J. Beato
 *      Date:      04/06/88
 *
 *      Modification History:
 *
 *      Purpose: The purpose of this procedure is to compute the error terms for.
 *               the network for back propagation.
 *
```

```
*      Calling Sequence: ComputeError();
*
*      Operational Details:
*
***********************************************************
*******************/
ComputeError()
{
register double    *WeightPtr,
         Sum,
         *ErrorPtr,
         *HiddenPtr,
         *OutputPtr,
         *TargetPtr,
         *OutputErrorPtr;

register int   I, J;
    /* First we do the output layer */
    OutputPtr  = OutputUnit;
    ErrorPtr   = Error_OutputUnit;
    TargetPtr  = TargetOutputUnit;
    for (I = 0; I < NumberOfOutputUnits; I++)
    {
        *ErrorPtr++ =   (*TargetPtr++ - *OutputPtr) *
                    *OutputPtr *
                    (1.0 - *OutputPtr++);
    }

/* Next we do the hidden layer */
    HiddenPtr     = HiddenUnit;
    ErrorPtr      = Error_HiddenUnit;

for (I = 0; I < NumberOfHiddenUnits; I++)
```

```
            {

/* Point to each weight array for each neuron
on this level */

OutputErrorPtr = Error_OutputUnit;

Sum = 0.0;

for (J = 0; J < NumberOfOutputUnits; J++)

{

Sum = Sum + (Weight_OutputUnit[J][I] *
*OutputErrorPtr++);

}

*ErrorPtr++ =    Sum *
                        *HiddenPtr *
                        (1.0 - *HiddenPtr++);

}

}
/*******************************************************
*******************
*
*       Procedure: AdjustWeightsAndBiases
*
*       Author: Louis J. Beato
*       Date:      04/06/88
*
*       Modification History:
*
*       Purpose: The purpose of this procedure is to adjust
the weight and
*              bias matrices.
*
*       Calling Sequence: AdjustWeightsAndBiases();
*
```

```
 *      Operational Details:
 *
 ***************************************************
 *******************/
AdjustWeightsAndBiases()
{
register double    *WeightPtr,
        *DeltaWeightPtr,
        *PreviousDeltaWeightPtr,
        Sum,
        *ErrorPtr,
        *HiddenPtr,
        *OutputPtr,
        *InputPtr;
register double    *BiasPtr,
        *DeltaBiasPtr,
        *PreviousDeltaBiasPtr;

register int   I, J;

/* Start with the output layer */
    ErrorPtr              = Error_OutputUnit;

BiasPtr               = Bias_OutputUnit;
    DeltaBiasPtr          = DeltaBias_OutputUnit;
    PreviousDeltaBiasPtr  = PreviousDeltaBias_OutputUnit;

for (I = 0; I < NumberOfOutputUnits; I++)
    {
        HiddenPtr             = HiddenUnit;

WeightPtr             = Weight_OutputUnit[I];
```

```
            DeltaWeightPtr        =
DeltaWeight_OutputUnit[I];

PreviousDeltaWeightPtr =
PreviousDeltaWeight_OutputUnit[I];

for (J = 0; J < NumberOfHiddenUnits; J++)
        {
            *DeltaWeightPtr = ( LearningRate *
                        *HiddenPtr++ *
                        *ErrorPtr)     +
                     (    Momentum    *
                        *PreviousDeltaWeightPtr);
            *WeightPtr++ += *DeltaWeightPtr;

*PreviousDeltaWeightPtr++ =
*DeltaWeightPtr++;
        }
        *DeltaBiasPtr = (   LearningRate *
                    *ErrorPtr++) +
                 (    Momentum    *
                    *PreviousDeltaBiasPtr);

*BiasPtr++ += *DeltaBiasPtr;

*PreviousDeltaBiasPtr++ = *DeltaBiasPtr++;
    }

/* Start with the Hidden layer */
    ErrorPtr   = Error_HiddenUnit;

BiasPtr              = Bias_HiddenUnit;
    DeltaBiasPtr         = DeltaBias_HiddenUnit;
```

```
        PreviousDeltaBiasPtr = PreviousDeltaBias_HiddenUnit;

for (I = 0; I < NumberOfHiddenUnits; I++)
        {
                InputPtr                = InputUnit;

WeightPtr               = Weight_HiddenUnit[I];
                DeltaWeightPtr          =
        DeltaWeight_HiddenUnit[I];
                PreviousDeltaWeightPtr  =
        PreviousDeltaWeight_HiddenUnit[I];
                for (J = 0; J < NumberOfInputUnits; J++)
                {
                        *DeltaWeightPtr = ( LearningRate *
                                        *InputPtr++  *
                                        *ErrorPtr)   +
                                     (   Momentum    *
                                        *PreviousDeltaWeightPtr);

*WeightPtr++ += *DeltaWeightPtr;

*PreviousDeltaWeightPtr++ =
        *DeltaWeightPtr++;
                }
                *DeltaBiasPtr = (   LearningRate *
                                *ErrorPtr++) +
                             (   Momentum    *
                                *PreviousDeltaBiasPtr);
                *BiasPtr++ += *DeltaBiasPtr;

*PreviousDeltaBiasPtr++ = *DeltaBiasPtr++;
        }
}
```

```
/******************************************************
 *
 *    Procedure: ExamineData
 *
 *    Author: Louis J. Beato
 *    Date:      04/08/88
 *
 *    Modification History:
 *
 *    Purpose: The purpose of this procedure is to examine
 the target data
 *           to determine when the training is done.
 *
 *    Calling Sequence: ExamineData
 *
 *    Operational Details:
 *
 ******************************************************/
ExamineData()
{
register   int   I,J;
register   double    *OutputPtr, *TargetPtr, Error;

if ((LoopCounter % NumberOfTrainingElements) == 0)
    {
        MaxError = 0.0;
        for (I = 0; I < NumberOfTrainingElements; I++)
        {
            SetupInputsAndTargets(I);
            ComputeFai();
```

```
                OutputPtr = OutputUnit;
                TargetPtr = TargetOutputUnit;

for (J = 0; J < NumberOfOutputUnits; J++)
                {
                    Error = fabs(*TargetPtr - *OutputPtr);

TargetPtr++;
                    OutputPtr++;
                    if (Error > MaxError)
                    {
                        MaxError = Error;
                        MaxErrorIndex = I;
                    }
                }
            }
        }
    }
}

/***********************************************************************
 *
 *    Procedure: CheckForScreenUpdate
 *
 *    Author: Louis J. Beato
 *    Date:      04/11/88
 *
 *    Modification History:
 *
 *    Purpose: The purpose fo this procedure is to check to see when screen
 *             updates should be done.
 *
 *    Calling Sequence: CheckForScreenUpdate();
```

*

* Operational Details:

*

*************************************************************************/

```
CheckForScreenUpdate()
{
    if ((LoopCounter % UpdateFrequency) == 0)
    {
        printf ("Loop Counter -> %d\n",LoopCounter);
        printf ("Max error      ----------> %13.12f at %d\n",
            MaxError,
            MaxErrorIndex);
    }
}
```

/***********************************************************************

*

* Procedure: CheckForDataFileUpdate

*

* Author: Louis J. Beato

* Date: 04/06/88

*

* Modification History:

*

* Purpose: The purpose of this procedure is to check to see when the

* weights and biases file update should occur.

*

* Calling Sequence: CheckForFileUpdate();

*

```
*       Operational Details:
*
***********************************************************************/
CheckForDataFileUpdate()
{
    if ((LoopCounter % DumpDataFrequency) == 0)
    {
        rename (OutFilename, TempFilename);
        WriteWeightsAndBiases(OutFilename);
        delete (TempFilename);
    }
}
#include <stdio.h>
#include "neural.h"
#include "unpackd.h"
/* Define the max error which is used to tell the trainer when it is done */

/* External file declarations */ double   exp(),
    fabs(),
    ExamineData(),
    atof();

FILE *fopen(),
    *fpread,
    *fpwrite;

/********************* Global Variable definitions
********************/
```

```
/* NOTE: Global variables will be used in this module for
speed considerations.
    It is not the author's intention to violate good
programming practices.
    Since this module is very time critical, every
consideration will be
    made to increase speed of execution.               */

/* Declarations for the Network matrix, Note that
pointers are used and
    the arrays will be allocated with malloc. */ extern  double *OutputUnit;
extern  double *HiddenUnit;
extern  double *HiddenUnit2;
extern  double *InputUnit;
extern  double *TargetOutputUnit;

/* Declarations for the Weight and Bias Matrices */ extern  double *Bias_HiddenUnit;
extern  double *Bias_HiddenUnit2;
extern  double *Bias_OutputUnit;
extern  double *Weight_HiddenUnit[NETDEPTH];
extern  double *Weight_HiddenUnit2[NETDEPTH];
extern  double *Weight_OutputUnit[NETDEPTH];

extern  double *DeltaBias_HiddenUnit;
extern  double *DeltaBias_HiddenUnit2;
extern  double *DeltaBias_OutputUnit;
extern  double *DeltaWeight_HiddenUnit[NETDEPTH];
extern  double *DeltaWeight_HiddenUnit2[NETDEPTH];
extern  double *DeltaWeight_OutputUnit[NETDEPTH];
```

```
extern   double *PreviousDeltaBias_HiddenUnit;
extern   double    *PreviousDeltaBias_HiddenUnit2;
extern   double *PreviousDeltaBias_OutputUnit;
extern   double *PreviousDeltaWeight_HiddenUnit[NETDEPTH];
extern   double
*PreviousDeltaWeight_HiddenUnit2[NETDEPTH];

extern   double *PreviousDeltaWeight_OutputUnit[NETDEPTH];
/* Declarations for the Weight and Bias Matrices */ extern   double *Error_HiddenUnit;
extern   double    *Error_HiddenUnit2;
extern   double *Error_OutputUnit;

/* Support variables for calculations */ extern   double LearningRate;
extern   double Momentum;

/* General Declarations */ extern   int    LookupTable[MAX_TRAINING_SIZE];   /* This allows 10,000 entries to be
                           used in training */ extern   TRAINING_DATA    TrainingData[MAX_TRAINING_SIZE];

extern   double *ClassifyData[MAX_TRAINING_SIZE];
extern   double
*MultipleClassifyData[4][MAX_TRAINING_SIZE];
extern   int    TableMarker;
extern   int    NumberOfTrainingElements;
```

```
extern  int    NumberOfInputUnits,
               NumberOfOutputUnits,
               NumberOfHiddenUnits,
               NumberOfHiddenUnits2;
        char string    [MAXLINE];
```

```
/***********************************************************************
 *
 *   Procedure:    ClearScreen
 *
 *   Author: Louis J. Beato
 *   Date:    03/23/88
 *
 *   Modification History:
 *
 *   Purpose:  The purpose of this procedure is to clear the screen
 *             and place the cursor at the upper left hand corner.
 *
 *   Calling Sequence: ClearScreen();
 *
 *   Operational Details:
 *
 ***********************************************************************/
ClearScreen()
{
short    int X = 1, Y = 1;
    Lib$Erase_Page (&X, &Y);
}
```

```
/*******************************************************
 *
 *    Procedure:    GetNumberOfInputUnits
 *
 *    Author: Louis J. Beato
 *    Date:       03/23/88
 *
 *    Modification History:
 *
 *    Purpose:  The purpose of this procedure is to obtain the
 *              Number of input units.
 *
 *    Calling Sequence:   NumberOfInputUnits =
 *                        GetNumberOfInputUnits (BuilderOutputFilename);
 *
 *
 *    Operational Details:    Open the file generated by the Builder.
 *                            The first short integer value is the number
 *                            of input units.
 *
 *******************************************************/
short   GetNumberOfInputUnits (Filename)
char Filename[];
{
short     Array[4];
```

```
        fpread = fopen (Filename, "r");

/* If file cannot be opened ... keep trying */
    while (fpread == NULL)
    {
        printf ("FILE NOT FOUND... Please enter new filename -> ");
        scanf ("%s", Filename);
        fpread = fopen (Filename, "r");
    }
    fread (Array, 1, sizeof(Array), fpread);
    fclose (fpread);

return (Array[0]);
}
/*******************************************************************
 *
 *   Procedure:      GetNumberOfOutputUnits
 *
 *   Author: Louis J. Beato
 *   Date:      03/23/88
 *
 *   Modification History:
 *
 *   Purpose:  The purpose of this procedure is to obtain the
 *             Number of output units.
 *
 *   Calling Sequence:   NumberOfOutputUnits =
 *                       GetNumberOfOutputUnits (BuilderOutputFilename);
 *
 *
```

```
 *      Operational Details:      Open the file generated by
the Builder.
 *                        The second short integer value is the
number
 *                        of output units.
 *
 ***********************************************************
 ******************/
short    GetNumberOfOutputUnits (Filename)
char Filename[];
{
short     Array[4];
    fpread = fopen (Filename, "r");

/* If file cannot be opened ... keep trying */
    while (fpread == NULL)
    {
        printf ("FILE NOT FOUND... Please enter new
filename -> ");
        scanf ("%s", Filename);
        fpread = fopen (Filename, "r");
    }
    fread (Array, 1, sizeof(Array), fpread);
    fclose (fpread);

return (Array[1]);
}
/***********************************************************
 ******************
 *
 *      Procedure:     GetNumberOfHiddenUnits
 *
 *      Author: Louis J. Beato
```

```
*      Date:         04/07/88
*
*      Modification History:
*
*      Purpose:  The purpose of this procedure is to obtain the
*                Number of hodden units from the Weights and Bias file.
*
*      Calling Sequence:    NumberOfHiddenUnits =
*                           GetNumberOfHiddenUnits (WeightsAndBiasFilename);
*
*
*      Operational Details:    Open the file generated by the Builder.
*                              The third short integer value is the number
*                              of hidden units.
*
***********************************************************************/
short    GetNumberOfHiddenUnits (Filename)
char     Filename[];
short    Array[4];

fpread = fopen (Filename, "r");

/* If file cannot be opened ... keep trying */
    while (fpread == NULL)
    {
         printf ("FILE NOT FOUND... Please enter new filename -> ");
```

```
        scanf ("%s", Filename);
        fpread = fopen (Filename, "r");
    }
    fread (Array, 1, sizeof(Array), fpread);
    fclose (fpread);
    return (Array[2]);
}
```

/*******************************************************************
*
*   Procedure:      GetNumberOfTrainingElements
*
*   Author: Louis J. Beato
*   Date:       04/07/88
*
*   Modification History:
*
*   Purpose:  The purpose of this procedure is to obtain the
*             Number of training elements.
*
*   Calling Sequence:   NumberOfTrainingElements =
*   GetNumberOfTrainingElements(BuilderOutputFilename);
*
*
*   Operational Details:    Open the file generated by the Builder.
*                           The fourth short integer value is the number
*                           of training elements.
*
********************************************************************/

```c
short    GetNumberOfTrainingElements (Filename)
char Filename[];
{
short       Array[4];
FILE *fpread;

fpread = fopen (Filename, "r");

/* If file cannot be opened ... keep trying */
    while (fpread == NULL)
    {
        printf ("FILE NOT FOUND... Please enter new filename -> ");
        scanf ("%s", Filename);
        fpread = fopen (Filename, "r");
    }
    fread (Array, 1, sizeof(Array), fpread);
    fclose (fpread);

return (Array[3]);
}
```

```
/*******************************************************
*******************
*
*    Procedure:    GetAscNumberOfInputUnits
*
*    Author: Louis J. Beato
*    Date:    03/23/88
*
*    Modification History:
*
*    Purpose:  The purpose of this procedure is to obtain the
```

```
*              Number of input units.
*
*     Calling Sequence:    NumberOfInputUnits =
*                          GetAscNumberOfInputUnits
(BuilderOutputFilename);
*
*
*     Operational Details:    Open the file generated by
the Builder.
*                          The first short integer value is the number
*                          of input units.
*
******************************************************
*******************/
short   GetAscNumberOfInputUnits (Filename)
char Filename[];
{
static    short    ReturnVal;
    fpread = fopen (Filename, "r");

/* If file cannot be opened ... keep trying */
    while (fpread == NULL)
    {
        printf ("FILE NOT FOUND... Please enter new filename -> ");
        scanf ("%s", Filename);
        fpread = fopen (Filename, "r");
    }
    fgets (string, MAXLINE, fpread);
    sscanf (string, "%d", &ReturnVal);

fclose (fpread);
```

```
            return (ReturnVal);
}

/*************************************************************
 *
 *      Procedure:      GetAscNumberOfOutputUnits
 *
 *      Author: Louis J. Beato
 *      Date:       04/12/88
 *
 *      Modification History:
 *
 *      Purpose:  The purpose of this procedure is to obtain the
 *                Number of output units.
 *
 *      Calling Sequence:   NumberOfOutputUnits =
 *                          GetAscNumberOfOutputUnits (BuilderOutputFilename);
 *
 *
 *      Operational Details:    Open the file generated by the Builder.
 *                              The second short integer value is the number
 *                              of output units.
 *
 **************************************************************/
short   GetAscNumberOfOutputUnits (Filename)
char Filename[];
{
static  short   ReturnVal;
```

```
    fpread = fopen (Filename, "r");

/* If file cannot be opened ... keep trying */
    while (fpread == NULL)
    {
        printf ("FILE NOT FOUND... Please enter new
filename -> ");
        scanf ("%s", Filename);
        fpread = fopen (Filename, "r");
    }
    fgets (string, MAXLINE, fpread);
    fgets (string, MAXLINE, fpread);
    sscanf (string, "%d", &ReturnVal);

fclose (fpread);

return (ReturnVal);
}

/*******************************************************
********************
*
*   Procedure:     GetAscNumberOfTrainingElements
*
*   Author: Louis J. Beato
*   Date:       04/07/88
*
*   Modification History:
*
*   Purpose:  The purpose of this procedure is to obtain the
*             Number of training elements.
*
*   Calling Sequence:   NumberOfTrainingElements =
```

```
 *      GetNumberOfTrainingElements(BuilderOutputFilename);
 *
 *
 *      Operational Details:   Open the file generated by the Builder.
 *                             The fourth short integer value is the number
 *                             of training elements.
 *
 ***********************************************************************/
int    GetAscNumberOfTrainingElements (Filename)
char Filename[];
{
static    int   ReturnVal;
      fpread = fopen (Filename, "r");

/* If file cannot be opened ... keep trying */
      while (fpread == NULL)
      {
            printf ("FILE NOT FOUND... Please enter new filename -> ");
            scanf ("%s", Filename);
            fpread = fopen (Filename, "r");
      }
      fgets (string, MAXLINE, fpread);
      fgets (string, MAXLINE, fpread);
      fgets (string, MAXLINE, fpread);
      fgets (string, MAXLINE, fpread);
      sscanf (string, "%d", &ReturnVal);

fclose (fpread);
```

```
        return (ReturnVal);
}

/*******************************************************
*******************
*
*       Procedure: SetupLookupTable
*
*       Author: Louis J. Beato
*       Date:     04/06/88
*
*       Modification History:
*
*       Purpose: The purpose of this procedure is to set up
the table which
*               contains the indexes into the lookup table used
during
*               training presentation.
*
*       Calling Sequence: SetupLookupTable ();
*
*       Operational Details:
*
*******************************************************
*******************/
SetupLookupTable ()
{
int     I;
int     *Temp = LookupTable;

for (I = 0; I < NumberOfTrainingElements; I++)
            *Temp++ = I;
        TableMarker = NumberOfTrainingElements;
}
```

```
/****************************************************
********************
*
*     Procedure: GetIndex
*
*     Author: Louis J. Beato
*     Date:      04/06/88
*
*     Modification History:
*
*     Purpose: The purpose of this procedure is to return
an index (not to
*            be repeated until all have been used) for the
lookup table.
*
*     Calling Sequence: GetIndex ();
*
*     Operational Details:
*
****************************************************
*******************/
GetIndex ()
{
static    int  RetVal, RandomNumber;

RandomNumber = GetRandomNumber (TableMarker);
     RetVal = LookupTable [RandomNumber];
     TableMarker--;
     LookupTable[RandomNumber] = LookupTable
[TableMarker];

if (TableMarker == 0)
             SetupLookupTable ();
```

```
        return (RetVal);
}

/*******************************************************
 *********************
 *
 *      Procedure: GetRandomNumber
 *
 *      Author: Louis J. Beato
 *      Date:     04/06/88
 *
 *      Modification History:
 *
 *      Purpose: The purpose of this procedure is to return a random number
 *               between 0 and the input Range.
 *
 *      Calling Sequence:   Number = GetRandomNumber (TableMarker);
 *
 *      Operational Details:
 *
 *******************************************************
 *******************/
GetRandomNumber(Range)
int   Range;

{
double    Num1;
int   Index;

Index = rand() % Range;
return (Index);
}
```

```
/*************************************************************
 *
 *    Procedure: AllocateStorage
 *
 *    Author: Louis J. Beato
 *    Date:      04/06/88
 *
 *    Modification History:
 *
 *    Purpose: The purpose of this procedure is to allocate all storage
 *             necessary for the network to function.
 *
 *    Calling Sequence: AllocateStorage();
 *
 *    Operational Details:
 *
 *************************************************************/
AllocateStorage()
{
int   I;

InputUnit = (double *) malloc (NumberOfInputUnits * sizeof (double));
     if (InputUnit == NULL)
          printf ("Could not allocate storage\n");

TargetOutputUnit = (double *) malloc (NumberOfOutputUnits * sizeof (double));
     if (TargetOutputUnit == NULL)
          printf ("Could not allocate storage\n");
```

```
HiddenUnit = (double *) malloc (NumberOfHiddenUnits
* sizeof (double));
    if (HiddenUnit == NULL)
        printf ("Could not allocate storage\n");

OutputUnit = (double *) malloc (NumberOfOutputUnits
* sizeof (double));
    if (OutputUnit == NULL)
        printf ("Could not allocate storage\n");

Error_HiddenUnit = (double *) malloc
(NumberOfHiddenUnits * sizeof (double));
    if (Error_HiddenUnit == NULL)
        printf ("Could not allocate storage\n");

Error_OutputUnit = (double *) malloc
(NumberOfOutputUnits * sizeof (double));
    if (Error_OutputUnit == NULL)
        printf ("Could not allocate storage\n");

Bias_HiddenUnit = (double *) malloc
(NumberOfHiddenUnits * sizeof (double));
    if (Bias_HiddenUnit == NULL)
        printf ("Could not allocate storage\n");

Bias_OutputUnit = (double *) malloc
(NumberOfOutputUnits * sizeof (double));
    if (Bias_OutputUnit == NULL)
        printf ("Could not allocate storage\n");

DeltaBias_HiddenUnit = (double *) malloc
(NumberOfHiddenUnits * sizeof (double));
    if (DeltaBias_HiddenUnit == NULL)
        printf ("Could not allocate storage\n");
```

```c
DeltaBias_OutputUnit = (double *) malloc
    (NumberOfOutputUnits * sizeof (double));
    if (DeltaBias_OutputUnit == NULL)
        printf ("Could not allocate storage\n");

PreviousDeltaBias_HiddenUnit = (double *) malloc
    (NumberOfHiddenUnits * sizeof (double));
    if (PreviousDeltaBias_HiddenUnit == NULL)
        printf ("Could not allocate storage\n");

PreviousDeltaBias_OutputUnit = (double *) malloc
    (NumberOfOutputUnits * sizeof (double));
    if (PreviousDeltaBias_OutputUnit == NULL)
        printf ("Could not allocate storage\n");

for (I = 0; I < NumberOfHiddenUnits; I++)
{
    Weight_HiddenUnit[I] = (double *)
        malloc (NumberOfInputUnits * sizeof
    (double));
        if (Weight_HiddenUnit[I] == NULL)
            printf ("Could not allocate storage\n");
    DeltaWeight_HiddenUnit[I] = (double *)
        malloc (NumberOfInputUnits * sizeof
    (double));
        if (DeltaWeight_HiddenUnit[I] == NULL)
            printf ("Could not allocate storage\n");

PreviousDeltaWeight_HiddenUnit[I] = (double *)
        malloc (NumberOfInputUnits * sizeof
    (double));
        if (PreviousDeltaWeight_HiddenUnit[I] == NULL)
            printf ("Could not allocate storage\n");
```

```c
        }
        for (I = 0; I < NumberOfOutputUnits; I++)
        {
            Weight_OutputUnit[I] = (double *)
                malloc (NumberOfHiddenUnits * sizeof (double));
            if (Weight_OutputUnit[I] == NULL)
                printf ("Could not allocate storage\n");

DeltaWeight_OutputUnit[I] = (double *)
                malloc (NumberOfHiddenUnits * sizeof (double));
            if (DeltaWeight_OutputUnit[I] == NULL)
                printf ("Could not allocate storage\n");

PreviousDeltaWeight_OutputUnit[I] = (double *)
                malloc (NumberOfHiddenUnits * sizeof (double));
            if (PreviousDeltaWeight_OutputUnit[I] == NULL)
                printf ("Could not allocate storage\n");
        }
        for (I = 0; I < NumberOfTrainingElements; I++)
        {
            TrainingData[I].InputData = (BYTE *)
                calloc (((NumberOfInputUnits/8) + 1) , sizeof (BYTE));
            if (TrainingData[I].InputData == NULL)
                printf ("Could not allocate storage\n");

TrainingData[I].TargetData = (BYTE *)
                malloc (NumberOfOutputUnits * sizeof (BYTE));
            if (TrainingData[I].TargetData == NULL)
```

```
            printf ("Could not allocate storage\n");
        }
}

/*******************************************************
 *******************
 *
 *      Procedure: DeallocateStorage
 *
 *      Author: Louis J. Beato
 *      Date:    04/19/88
 *
 *      Modification History:
 *
 *      Purpose: The purpose of this procedure is to
 de-allocate all storage
 *               necessary for the network to function.
 *
 *      Calling Sequence: DeallocateStorage();
 *
 *      Operational Details:
 *
 *******************************************************
 *******************/
DeAllocateStorage()
{
int  I;

/*************************
        free (HiddenUnit);

free (OutputUnit);

free (Error_HiddenUnit);
```

```
free (Error_OutputUnit);

free (Bias_HiddenUnit);

free (Bias_OutputUnit);

free (DeltaBias_HiddenUnit);

free (DeltaBias_OutputUnit);

free (PreviousDeltaBias_HiddenUnit);

free (PreviousDeltaBias_OutputUnit);

for (I = 0; I < NumberOfHiddenUnits; I++)
{
    free (Weight_HiddenUnit[I]);

free (DeltaWeight_HiddenUnit[I]);

free (PreviousDeltaWeight_HiddenUnit[I]);
}
for (I = 0; I < NumberOfOutputUnits; I++)
{
    free (Weight_OutputUnit[I]);

free (DeltaWeight_OutputUnit[I]);

free (PreviousDeltaWeight_OutputUnit[I]);
}
for (I = 0; I < NumberOfTrainingElements; I++)
{
```

```
            free (TrainingData[I].InputData);
            free (TrainingData[I].TargetData);
        }

*********************************************/
}

/***********************************************************
********************
*
*       Procedure: ReadWeightsAndBiases
*
*       Author: Louis J. Beato
*       Date:     04/06/88
*
*       Modification History:
*
*       Purpose: The purpose of this procedure is to read
weights and biases
*               from a file to pre-load a net.
*
*
*       Calling Sequence: ReadWeightsAndBiases (Filename);
*
*       Operational Details: Assumes the NumberOfInputUnits
and the
*               NumberOfOutputUnits have been defined
previously.
*
************************************************************
******************/
ReadWeightsAndBiases (Filename)
```

```c
char Filename[];
{
FILE *fp;
short    Array[4];
int  I;
     fp = fopen (Filename, "r");
     if (fp != NULL)
     {
          fclose (fp);
          NumberOfHiddenUnits = GetNumberOfHiddenUnits (Filename);
          printf ("Number of HIDDEN units -> %d\n",NumberOfHiddenUnits);

fp = fopen (Filename, "r");
          /* strip off the 4 short integers */
          fread (Array, 1, sizeof(Array), fp);

/* Read the biases for the hidden units first */
          fread (  Bias_HiddenUnit,
               1,
               sizeof(double) * NumberOfHiddenUnits,
               fp);

/* Read the biases for the output units */
          fread (  Bias_OutputUnit,
               1,
               sizeof(double) * NumberOfOutputUnits,
               fp);

/* Read the Weights for the hidden units */
          for (I = 0; I < NumberOfHiddenUnits; I++)
          {
```

```
            fread (  Weight_HiddenUnit[I],
                    1,
                    sizeof(double) * NumberOfInputUnits,
                    fp);
        }

/* Read the weights for the output units */
        for (I = 0; I < NumberOfOutputUnits; I++)
        {
            fread (  Weight_OutputUnit[I],
                    1,
                    sizeof(double) * NumberOfHiddenUnits,
                    fp);
        } fclose (fp);
    }
    else printf ("Could not open Weights And Bias file\n");
}
/********************************************************************
*
*   Procedure: WriteWeightsAndBiases
*
*   Author: Louis J. Beato
*   Date:      04/08/88
*
*   Modification History:
*
*   Purpose: The purpose of this procedure is to write the weights and
*            biases to the desired file.
```

```
*
*     Calling Sequence: WriteWeightsAndBiases (Filename);
*
*     Operational Details: Assumes the NumberOfInputUnits and the
*                NumberOfOutputUnits have been defined previously.
*
*******************************************************************/
WriteWeightsAndBiases (Filename)
char Filename[];
{
FILE *fp;
short    Array[4];
int  I;

fp = fopen (Filename, "w");
    if (fp != NULL)
    {
        Array[0] = NumberOfInputUnits;
        Array[1] = NumberOfOutputUnits;
        Array[2] = NumberOfHiddenUnits;
        Array[3] = NumberOfTrainingElements;

/* write the 4 short integers */
        fwrite (Array, 1, sizeof(Array), fp);

/* Read the biases for the hidden units first */
        fwrite (Bias_HiddenUnit,
            1,
            sizeof(double) * NumberOfHiddenUnits,
            fp);
```

```c
        /* Read the biases for the output units */
        fwrite (Bias_OutputUnit,
                1,
                sizeof(double) * NumberOfOutputUnits,
                fp);

/* Read the Weights for the hidden units */
        for (I = 0; I < NumberOfHiddenUnits; I++)
        {
            fwrite (Weight_HiddenUnit[I],
                    1,
                    sizeof(double) * NumberOfInputUnits,
                    fp);
        }
        /* Read the weights for the output units */
        for (I = 0; I < NumberOfOutputUnits; I++)
        {
            fwrite (Weight_OutputUnit[I],
                    1,
                    sizeof(double) * NumberOfHiddenUnits,
                    fp);
        } fclose (fp);
    }
    else printf ("Could not open Weights And Bias file\n");
}

/*******************************************************
 *
 *  Procedure: LoadTrainingData
 *
```

```
*       Author: Louis J. Beato
*       Date:       04/06/88
*
*       Modification History:
*
*       Purpose: The purpose of this procedure is to load
the training data
*               from a file into the TrainingData array.
*
*
*       Calling Sequence: LoadTrainingData (Filename);
*
*       Operational Details: Assumes the NumberOfInputUnits
and the
*               NumberOfOutputUnits have been defined
previously.
*
*******************************************************
*******************/
LoadTrainingData (Filename)
char Filename[];
{
FILE *fp;
int  I, X, J, K, L;
BYTE BitPos;
int  InputData;
    printf ("Loading Data\n");
    fp = fopen (Filename, "r");
    if (fp != NULL)
    {
        /* strip off the 4 short integers */
        fgets (string, MAXLINE, fp);
        fgets (string, MAXLINE, fp);
```

```
fgets (string, MAXLINE, fp);
fgets (string, MAXLINE, fp);

for (I = 0; I < NumberOfTrainingElements; I++)
{
    BitPos = 128;
    L = 0;
    for (J = 0; J < NumberOfInputUnits; J++)
    {
        fscanf (fp, "%d", &InputData);
        if (InputData != 0)
            TrainingData[I].InputData[L] |= BitPos;

BitPos >>= 1;
        if (BitPos == 0)
        {
            BitPos = 128;
            L++;
        }
    } for (J = 0; J < NumberOfOutputUnits; J++)
    {
        fscanf (fp, "%s", string);
        if (atof(string) < 0.5)
            TrainingData[I].TargetData[J] = 0;

else TrainingData[I].TargetData[J] = 1;

}
}
```

```
                if ((I % 100) == 0)
                    printf ("Loading data element -> %d\n",I);
            } fclose (fp);
        }
        else printf ("Could not open Builder file\n");
}
/************************************************************
 *
 *   Procedure: SetupInputsAndTargets
 *
 *   Author: Louis J. Beato
 *   Date:      04/06/88
 *
 *   Modification History:
 *
 *   Purpose: The purpose of this procedure is to load the input and target
 *            nodes of the neural network.
 *
 *   Calling Sequence: SetupInputsAndTargets (Index);
 *
 *   Operational Details:
 *
 *************************************************************/
SetupInputsAndTargets (Index)
int  Index;
{
register  BYTE *InputDataPtr;
```

```
register  BYTE   *TargetDataPtr;
register  I;
register  double    *InputUnitPtr;
register  double    *TargetOutputUnitPtr;
register  int   PackedIndex, AdjustedIndex;
    /* The input data is stored as BYTEs, we need to
convert to doubles */
    InputDataPtr = TrainingData[Index].InputData;
    InputUnitPtr = InputUnit;
    for (I = 0; I < NumberOfInputUnits; I++)
    {
        PackedIndex = I / 8;
        AdjustedIndex = I % 8;

*InputUnitPtr++ = InputDataLUT
[InputDataPtr[PackedIndex]][AdjustedIndex];
    }

/* The target data is stored as floats, we need to
convert to doubles */
    TargetDataPtr = TrainingData[Index].TargetData;
    TargetOutputUnitPtr = TargetOutputUnit;
    for (I = 0; I < NumberOfOutputUnits; I++)
    {
        *TargetOutputUnitPtr++ =
TargetLUT[TargetDataPtr[I]];
    }
}
/***********************************************************
*******************
*
*    Procedure: ComputeFai
*
*    Author: Louis J. Beato
```

```
*       Date:      04/06/88
*
*       Modification History:
*
*       Purpose: This procedure computes F(ai) which is the
output firing
*                function for the neurons.
*
*       Calling Sequence:   ComputeFai();
*
*       Operational Details: The function is of the form:
*                               1
*                          -------------
*                                    -ax
*                            1 + e
*
********************************************************
******************/
ComputeFai()
{
register double     *WeightPtr,
          *BiasPtr,
          Sum,
          *InputPtr,
          *HiddenPtr,
          *OutputPtr;

register int   I, J;

/* First we do the hidden layer */
        HiddenPtr = HiddenUnit;
        BiasPtr   = Bias_HiddenUnit;
```

```
        for (I = 0; I < NumberOfHiddenUnits; I++)
        {
                /* Point to each weight array for each neuron
on this level */
                WeightPtr = Weight_HiddenUnit[I];
                InputPtr  = InputUnit;

Sum = 0.0;

for (J = 0; J < NumberOfInputUnits; J++)
                {
                        Sum += (*WeightPtr++ * *InputPtr++);
                }
                Sum += *BiasPtr++;
                *HiddenPtr++ =   (double)1.0 /
                        ((double)1.0 + exp(-Sum));
        }

/* Next we do the output layer */
        OutputPtr = OutputUnit;
        BiasPtr   = Bias_OutputUnit;
        for (I = 0; I < NumberOfOutputUnits; I++)
        {
                /* Point to each weight array for each neuron
on this level */
                WeightPtr = Weight_OutputUnit[I];
                HiddenPtr = HiddenUnit;

Sum = 0.0;

for (J = 0; J < NumberOfHiddenUnits; J++)
                {
                        Sum += (*WeightPtr++ * *HiddenPtr++);
```

```
            }
            Sum += *BiasPtr++;
            *OutputPtr++ =    (double)1.0 /
                    ((double)1.0 + exp(-Sum));
        }
}
/*******************************************************
*******************
*
*    Procedure: WriteSimulatorData
*
*    Author: Louis J. Beato
*    Date:      04/08/88
*
*    Modification History:
*
*    Purpose: The purpose of this procedure is to examine
the target data
*           to determine when the training is done and then
write it to a
*           file.
*
*    Calling Sequence: WriteSimulatorData (Filename)
*
*    Operational Details:
*
*******************************************************
*******************/
WriteSimulatorData(Filename)
char Filename[];
{
register   int   I,J;
FILE *fp;
```

```c
short     Array[4];

fp = fopen (Filename, "w");
    if (fp != NULL)
    {
        Array[0] = NumberOfInputUnits;
        Array[1] = NumberOfOutputUnits;
        Array[2] = NumberOfHiddenUnits;
        Array[3] = NumberOfTrainingElements;

/* write the 4 short integers */
        fwrite (Array, 1, sizeof(Array), fp);

for (I = 0; I < NumberOfTrainingElements; I++)
        {
            SetupInputsAndTargets(I);

ComputeFai();

fwrite (OutputUnit,
                1,
                sizeof(double) * NumberOfOutputUnits,
                fp);

if ((I % 100) == 0)
                printf ("Writing data element -> %d\n",I);
        } fclose (fp);
    }
    else printf ("Could not open output file\n");
}
```

```
/******************************************************

*

*      Procedure: ReadSimulatorData

*

*      Author: Louis J. Beato

*      Date:      04/12/88

*

*      Modification History:

*

*      Purpose: The purpose of this procedure is to read the data from the

*               simulator for classification.

*

*      Calling Sequence: ReadSimulatorData (Filename)

*

*      Operational Details:

*

******************************************************/
ReadSimulatorData(Filename)
char Filename[];
{
register   int   I,J;
FILE *fp;
short      Array[4];

fp = fopen (Filename, "r");
     if (fp != NULL)
     {
          /* read the 4 short integers */
```

```
        fread (Array, 1, sizeof(Array), fp);

NumberOfInputUnits      = Array[0];
        NumberOfOutputUnits     = Array[1];
        NumberOfHiddenUnits     = Array[2];
        NumberOfTrainingElements = Array[3];

for (I = 0; I < NumberOfTrainingElements; I++)
        {
            fread   (ClassifyData[I],
                    1,
                    sizeof(double) * NumberOfOutputUnits,
                    fp);

if ((I % 100) == 0)
                printf ("Reading data element -> %d\n",I);
        } fclose (fp);
    }
    else printf ("Could not open file\n");
}
/*******************************************************************
 *
 *   Procedure: ReadMultipleSimulatorData
 *
 *   Author: Louis J. Beato
 *   Date:     04/12/88
 *
 *   Modification History:
```

```
*
*      Purpose: The purpose of this procedure is to read the data from the
*              simulator for classification for all character types, UC
*              Lc, DIGITS, and SYMBOLS.
*
*      Calling Sequence: ReadMultipleSimulatorData (Filename, X, NumOutputUnits[I])
*
*      Operational Details:
*
********************************************************************************/
ReadMultipleSimulatorData(Filename, X, NumOutputUnits)
char Filename[];
int  X;
short    NumOutputUnits;
{
register int I,J;
FILE *fp;
short    Array[4];
fp = fopen (Filename, "r");
if (fp != NULL)
{
    /* read the 4 short integers */
    fread (Array, 1, sizeof(Array), fp);

NumberOfInputUnits       = Array[0];
    NumberOfOutputUnits      = Array[1];
    NumberOfHiddenUnits      = Array[2];
    NumberOfTrainingElements = Array[3];
```

```
            for (I = 0; I < NumberOfTrainingElements; I++)
            {
                    fread   (MultipleClassifyData[X][I],
                            1,
                            sizeof(double) * NumOutputUnits,
                            fp);

if ((I % 100) == 0)
                            printf ("Reading data element ->
%d\n",I);
            } fclose (fp);
    }
    else printf ("Could not open file\n");
}

/********************************************************
*******************
*
*       Procedure: DumpNetData
*
*       Author: Louis J. Beato
*       Date:     04/06/88
*
*       Modification History:
*
*       Purpose: This procedure is for diagnostic purposes only.
*
*       Calling Sequence: DumpNetData();
*
```

```c
 *      Operational Details:
 *
 ***************************************************************************/
DumpNetData()
{
int   I, J;

printf ("\nInput Data\n");
    for (I = 0; I < NumberOfInputUnits; I++)
        printf ("%15.12f  ",InputUnit[I]);

printf ("\n\nHidden Data\n");
    for (I = 0; I < NumberOfHiddenUnits; I++)
        printf ("%15.12f  ",HiddenUnit[I]);
    printf ("\n\nOutput Data\n");
    for (I = 0; I < NumberOfOutputUnits; I++)
        printf ("%15.12f  ",OutputUnit[I]);

printf ("\n\nTarget Data\n");
    for (I = 0; I < NumberOfOutputUnits; I++)
        printf ("%15.12f  ",TargetOutputUnit[I]);

printf ("\n\nBias Hidden Units\n");
    for (I = 0; I < NumberOfHiddenUnits; I++)
    {
        printf ("%15.12f  ",Bias_HiddenUnit[I]);
    } printf ("\n\nBias Output Units\n");
    for (I = 0; I < NumberOfOutputUnits; I++)
    {
        printf ("%15.12f  ",Bias_OutputUnit[I]);
```

```
} printf ("\n\nDelta Bias Hidden Units\n");
for (I = 0; I < NumberOfHiddenUnits; I++)
{
    printf ("%15.12f  ",DeltaBias_HiddenUnit[I]);
} printf ("\n\nDelta Bias Output Units\n");
for (I = 0; I < NumberOfOutputUnits; I++)
{
    printf ("%15.12f  ",DeltaBias_OutputUnit[I]);
}
    printf ("\n\nPrevious Delta Bias Hidden Units\n");
    for (I = 0; I < NumberOfHiddenUnits; I++)
    {
        printf ("%15.12f   ",PreviousDeltaBias_HiddenUnit[I]);
    } printf ("\n\nPrevious Delta Bias Output Units\n");
    for (I = 0; I < NumberOfOutputUnits; I++)
    {
        printf ("%15.12f   ",PreviousDeltaBias_OutputUnit[I]);
    } printf ("\n\nWeight Hidden Units\n");
    for (I = 0; I < NumberOfHiddenUnits; I++)
    {
        for (J = 0; J < NumberOfInputUnits; J++)
```

```c
              {
                    printf ("%15.12f
",Weight_HiddenUnit[I][J]);
              }
        } printf ("\n\nWeight Output Units\n");
      for (I = 0; I < NumberOfOutputUnits; I++)
      {
            for (J = 0; J < NumberOfHiddenUnits; J++)
            {
                    printf ("%15.12f
",Weight_OutputUnit[I][J]);
            }
      } printf ("\n\nDelta Weight Hidden Units\n");
      for (I = 0; I < NumberOfHiddenUnits; I++)
      {
            for (J = 0; J < NumberOfInputUnits; J++)
            {
                    printf ("%15.12f
",DeltaWeight_HiddenUnit[I][J]);
            }
      } printf ("\n\nDelta Weight Output Units\n");
      for (I = 0; I < NumberOfOutputUnits; I++)
      {
            for (J = 0; J < NumberOfHiddenUnits; J++)
            {
                    printf ("%15.12f
",DeltaWeight_OutputUnit[I][J]);
```

```
        }
    } printf ("\n\nPrevious Delta Weight Hidden Units\n");
    for (I = 0; I < NumberOfHiddenUnits; I++)
    {
        for (J = 0; J < NumberOfInputUnits; J++)
        {
            printf ("%15.12f
",PreviousDeltaWeight_HiddenUnit[I][J]);
        }
    } printf ("\n\nPrevious Delta Weight Output Units\n");
    for (I = 0; I < NumberOfOutputUnits; I++)
    {
        for (J = 0; J < NumberOfHiddenUnits; J++)
        {
            printf ("%15.12f
",PreviousDeltaWeight_OutputUnit[I][J]);
        }
    }
}
```

APPENDIX D

Copyright 1990 by Eastman Kodak Company

```
#include <stdio.h>
#include <math.h>
#include "[beato.neural.bis.ksu]common.h"
#include "[tan.touch.system]segment.h"

#define L1   400  /* max # cols for char split features */
```

```
/*---------------------------------*/
int strength[L1],num_strokes[L1],col_top[L1],col_bot[L1],
    extreme_top[L1],extreme_bot[L1];
/*---------------------------------*/ split_process(comp, new_comp,p_stage)
COMPONENT *comp, *new_comp[];
int *p_stage;
/*********************************************
*********************************************/
{
   int ht,width,past_label,i,j;
   int split_found;

if( *p_stage == 0 ){
     /* compute features to be used for splitting */
     ht = comp->height;
     width = comp->width;

for ( j=0; j < width; ++j){
       strength[j] = 0;
       col_top[j] = 999;
       col_bot[j] = 0;
       past_label = 0;
       num_strokes[j] = 0;

for( i=0; i < ht; ++i){
         if( comp->im[i][j] != 0 ) {
           ++strength[j];
           col_top[j] = ( col_top[j] > i)? i : col_top[j];
           col_bot[j] = ( col_bot[j] < i)? i : col_bot[j];
           if( past_label == 0){
             ++num_strokes[j];
             past_label = 1;
```

```
        }
      }
      else
        past_label = 0;
    }/* for i */ if(j==0){
      extreme_top[j] = col_top[j];
      extreme_bot[j] = col_bot[j];
    }
    else{ extreme_top[j]=(extreme_top[j-1]>col_top[j])?col_top[j]:extreme_top[j-1];

extreme_bot[j]=(extreme_bot[j-1]<col_bot[j])?col_bot[j]:extreme_bot[j-1];
    }
  }

}/*endif *p_stage==0 */ switch (*p_stage) {
    case 0:

case 1:   split_found = split_bot(comp,new_comp,0);
              if( split_found==1){
                *p_stage = 1;
                return(2);
              }
    case 2:   split_found = split_COGQ(comp,new_comp,0);
              if( split_found==1){
                *p_stage = 2;
                return(2);
```

```
          }
case 3:   split_found = split_FTE(comp,new_comp,0);
          if( split_found==1){
             *p_stage = 3;
             return(2);
          }
case 4:   split_found = split_top(comp,new_comp,0);
          if( split_found==1){
             *p_stage = 4;
             return(2);
          }
case 5:   split_found = split_tb(comp,new_comp,1);
          if( split_found==1){
             *p_stage = 5;
             return(2);
          }
case 6:   split_found = split_vw(comp,new_comp,0);
          if( split_found==1){
             *p_stage = 6;
             return(2);
          }
case 7:   split_found = split_oo(comp,new_comp,0);
          if( split_found==1){
             *p_stage = 7;
             return(2);
          }
case 8:   split_found = split_f(comp,new_comp,1);
          if( split_found==1){
             *p_stage = 8;
             return(2);
          }
case 9:   split_found = split_misc(comp,new_comp,1);
          if( split_found==1){
```

```
            *p_stage = 9;
            return(2);
         }
      }

/* no split point found; return the number of components */
  return(1);
} include "[tan.touch]split_functions.c"
```

APPENDIX E

Copyright 1990 by Eastman Kodak Company

```
#define BOT_FACTOR1   0.15    /*dist to left boundary used for determining
                                the lower edge of a char*/
#define BOT_FACTOR2   0.30    /*fraction of height for bottom region */
#define END_FACTOR    0.20    /*fraction of width to be skipped (end portions)
                                when searching for split point */
define MAX_STRENGTH  0.3     /*max strength of stroke at min_point */ split_bot(comp,new_comp,cleanup)
int cleanup;
COMPONENT *comp, *new_comp[];
{
  int i,j,high_bot_region,min_point,min_point1,end_cols,start_col,fd_vwy;
  int nominal_base_col,l_ht,max_str,min_point2,top,bot,k;
  char c;
```

```c
    int ht,width,found;

ht = comp->height;
    width = comp->width;

/* estimate nominal base column of char (avoid
descenders) */
    i = 0.6*ht;
    i = (i >= width)? width-1:i;
    j = ht * BOT_FACTOR1;
    /*slide down */
    while((extreme_bot[j] < 0.6*ht || extreme_bot[j+1] >
extreme_bot[j])
          && j < i)
      ++j;
    nominal_base_col = j;

/* aviod splitting qu; adjust base col */
    i = ( ht - extreme_top[nominal_base_col] ) * 0.6;
    if( extreme_bot[i] > (extreme_bot[nominal_base_col] +
1) )
       nominal_base_col = i;

j = ht * BOT_FACTOR1;
    /*slide up */
    while((extreme_bot[j+1] < extreme_bot[j])
          && j < i)
      ++j;
    nominal_base_col = (j > nominal_base_col)? j :
nominal_base_col;

l_ht = extreme_bot[nominal_base_col] -
extreme_top[nominal_base_col] + 1 ;

/* correct for the nominal base col for an A and also,
       in case of noise errors, check height ratio */
    if( l_ht < 0.5 * ht || extreme_bot[nominal_base_col] <
0.6 * ht){
```

```
    nominal_base_col = 0.5*ht;
    l_ht = extreme_bot[nominal_base_col] -
extreme_top[nominal_base_col] + 1 ;
  } high_bot_region = extreme_bot[nominal_base_col]
                 - BOT_FACTOR2 * l_ht ;

end_cols = l_ht * END_FACTOR;

/*set start point dist of at least end_cols away from
left
    such that the col top is above the bot region */
  start_col = ((end_cols -1) < 0)? 0: end_cols-1;
  do{
     ++start_col;
  }while(col_top[start_col] >= high_bot_region &&
start_col < width);

/*look for the 1st point of occurrence (from left) of
the
    weakest single stroke bottom line */
  max_str = MAX_STRENGTH * l_ht + 0.5;
  min_point = start_col;
  for(j=start_col+1; j <= (width-end_cols-1); ++j){
    if((strength[j] < strength[min_point]) && strength[j]
<= max_str
       && num_strokes[j]==1 && col_top[j] >=
high_bot_region)
      min_point = j;
  }

/* ensure that the point found is beyond the initial
start column */
  if(min_point > start_col){
```

```
    min_point1 =
check_l(comp,min_point,ht,width,nominal_base_col);

if(min_point1 <= width-end_cols-1){ if( min_point1 == min_point)
        fd_vwy =
check_vwy(comp,min_point,ht,width,nominal_base_col);
      else
        fd_vwy = 0;

if(fd_vwy == 0){ if( min_point1 == min_point)
          min_point2 =
check_ju(comp,min_point1,ht,width);
        else
          min_point2 = min_point1;

if(min_point2 <= start_col || min_point2 >
width-end_cols-1){
          /* the break_point is not suitable */
          return(0);
        }

/* a suitable split point has been found */
        found =
find_new_comp(comp,new_comp,min_point2,cleanup);
        if( found==1)
          return (1);
        else
          return(0);

}/*if fd_vwy */
    }/*if min_point1 <= */
  }/*if min_point1 > */
```

```
/*could not find split point*/
    return(0);
} define U_BAR_RATIO   1.1 /* max ratio of left/right heights of u bar */
define MIN_GAP       0.13 /* min gap length at bottom of U bar;
                                        take note of cases like mx */
#define MAX_GAP       0.4 /* max gap length at bottom of U bar */
#define MAX_J_TAIL_HT 0.4 /* max height of J tail */
#define U_HT_FAC      0.2 /* min dist from top when searching for lower
                                        contours of U or J */
#define RIGHT_STR     0.4 /* max strength on right region before termination
                                        of search for valley col */ check_ju(comp,min_point,ht,width)
COMPONENT *comp;
int min_point,ht,width;
{
    int i,j,valley_col,base_row,blank_row,search_dist,right_bar_start;
    int gap1,gap2,left_bar_start,right_bar_end,left_bar_end,char_ht;
    int contour_left,contour_right,right_slope_up,left_slope_up;
    int current_row,char_top,peak,up,right_u_ht,left_u_ht;
    float ratio;

/* find the low valley region */
```

```c
/*slide left then right to the lowest point for
col_bot*/
   j = min_point;
   while(j >= 1 && col_bot[j-1] >= col_bot[j] &&
num_strokes[j-1] == 1 )
      --j;
   /* set strength bound for sliding right */
   i = RIGHT_STR * ht;
   while( j < width-1 && col_bot[j+1] >= col_bot[j] &&
strength[j+1] < i &&
         num_strokes[j+1] <= 2)
      ++j;
   valley_col = (col_bot[min_point] == col_bot[j])?
min_point : j;
   base_row = col_bot[valley_col];

/* look for right/left bars of U */
   /*search for right "vertical" bar */
   j = min_point;
   blank_row = 0.65 * base_row + 0.5;
   search_dist = j + 0.6 * base_row;
   search_dist = ( search_dist >= width )? width-1 :
search_dist ;

/*advance to the start of the right bar */
   while(comp->im[blank_row][j] == 0 && j < search_dist)
      ++j;
   right_bar_start = j;
   /* advance to the right end col of the bar */
   while(comp->im[blank_row][j+1] == 1 && j < search_dist)
      ++j;

right_bar_end = j;

/* cannot be J or U if right bar not found */
   if(right_bar_start == search_dist)
      return(min_point);
```

```
j=min_point;
search_dist = j - 0.6 * base_row;
search_dist = ( search_dist < 0 )? 0 : search_dist ;

/*advance to the start of the left bar */
while(comp->im[blank_row][j] == 0 && j > search_dist)
   --j;
left_bar_start = j;
/* advance to the left end col of the bar */
while(comp->im[blank_row][j-1] == 1 && j > search_dist)
   --j;
  left_bar_end = j;

/* compute height of char */
 i = (col_top[right_bar_end] >
col_top[right_bar_end+1])?
       col_top[right_bar_end+1] : col_top[right_bar_end] ;
  char_ht = col_bot[valley_col] - i + 1;

/* check the 2 contours that rise from the bottom of a
U */

/* check right contour */
 j = valley_col;
 search_dist = j + char_ht;
 search_dist = ( search_dist >= width-1 )? width-2 :
search_dist ;
 current_row = col_bot[j];

/*find the top of the right portion */
 i = (right_bar_end > right_bar_start)?
right_bar_start+1 : right_bar_start;
 /* in case of an 'A', slide to the top */
 while( (i+1) < width && col_top[i+1] < col_top[i] )
   ++i;
 char_top = col_top[i] + U_HT_FAC * char_ht + 0.5;
```

```
  contour_right = 1;
  while(contour_right == 1 && current_row > char_top && j
< search_dist){
     ++j;
     if( col_bot[j] > current_row &&
col_bot[j+1]>current_row){
        contour_right = 0;
     }
     else if( col_bot[j] == current_row )
        {}
     else{
while((comp->im[current_row-1][j-1]==1||comp->im[current_
row-1][j-2]==1)
           && current_row > col_bot[j] && current_row-1
> 0 )
        --current_row;
     if(current_row > col_bot[j])
        contour_right = 0;
     }
  }/*while contour_right */

/* check for cases like RD */
  i = j - right_bar_end;
  i = (i < 0) ? -i : i;
  if(i > 0.15 * char_ht)
     contour_right == 0;

/* check left contour */
  j = valley_col;
  search_dist = j - 0.9 * char_ht;
  search_dist = ( search_dist < 1 )? 1 : search_dist ;
  current_row = col_bot[j];
  i = (left_bar_end < left_bar_start)?
left_bar_start-1:left_bar_start;

/* in case of an 'A', slide to the top */
  while( col_top[i-1] < col_top[i] && i > 0 )
     --i;
```

```
    char_top = col_top[i] + U_HT_FAC * char_ht + 0.5;
    if(left_bar_start==1)
      contour_left = 0;
    else
      contour_left = 1;
    while(contour_left == 1 && current_row > char_top && j
> search_dist){
      --j;
        if( col_bot[j] > current_row && col_bot[j-1] >
current_row ){
          contour_left = 0;
        }
        else if( col_bot[j] == current_row )
          {}
        else{ while((comp->im[current_row-1][j+1]==1||comp->im[current_
row-1][j+2]==1)
            && current_row > col_bot[j] )
          --current_row;
        if(current_row > col_bot[j])
          contour_left = 0;
      }
    }/*while contour_left */

/* check for cases like RD */
    i = j - left_bar_end;
    i = (i < 0) ? -i : i;
    if(i > 0.1 * char_ht)
      contour_left == 0;

/* verify contours that they belong to U or J */
    i = MIN_GAP * char_ht + 0.5;
    j = MAX_GAP * char_ht + 0.5;
    right_slope_up = 0;
    if(contour_right == 1){
      gap1 = col_bot[valley_col] - col_bot[right_bar_end];
      gap2 = col_bot[valley_col] -
```

```
col_bot[right_bar_end-1];
    if( (gap1 >= i && gap1 <= j) || (gap2 >= i && gap2 <=
j) )
        right_slope_up = 1;
  } left_slope_up = 0;
  if(contour_left == 1){
    gap1 = col_bot[valley_col] - col_bot[left_bar_end];
    gap2 = col_bot[valley_col] - col_bot[left_bar_end+1];
    if( (gap1 >= i && gap1 <= j) || (gap2 >= i && gap2 <=
j) )
        left_slope_up = 1;
  } left_u_ht  = col_bot[valley_col] -
col_top[left_bar_start-1] ;
  right_u_ht = col_bot[valley_col] -
col_top[right_bar_start+1] ;

ratio = (left_u_ht > right_u_ht)? (float)left_u_ht /
(float)right_u_ht :
            (float)right_u_ht / (float)left_u_ht ;

if(right_slope_up==1 && left_slope_up==1 && ratio <
U_BAR_RATIO){
    /* found a U; return 0 to indicate that cut should
not be made */
    return(0);
  }
  else if ( right_slope_up == 1){
    /* possible J */

/*look for J's left peak*/
    peak=0;
    up=0;
    j = valley_col;
```

```
      i = j - (0.6 * char_ht);
      i = (i < 0)? 0 : i;
      do{
        --j;
        if(col_top[j] < col_top[j+1]){
          up=1;
        }
        else if(col_top[j] > col_top[j+1] && up==1){
          peak = 1;
        }
      }while(j > i && peak==0);

i = col_bot[valley_col] - col_top[j+1];
      /* found a peak; must not exceed half the height of J */
      if(peak==1 && i <= MAX_J_TAIL_HT*char_ht){
        /*slide left until col_top is below half the peak ht, or above
          the peak */
        while( j > 0 && col_top[j] < (col_bot[valley_col] - i/2)
              && col_top[j] > (col_bot[valley_col] - i) )
          --j;
        return(j);
      }
      else if(j==0 && (col_top[0] > 0.5 * col_bot[valley_col]) ){
        /* in case peak==0 but col 0 is the tail of a J, return 0 to
           prevent cutting at min_point */
        return(0);
      }
      else{
        /* although found right slope, cound not find peak;
           not sure, don't cut */
        return(0);
      }
  }
```

```c
    else if( left_slope_up==1 ){
      /* check for u */ if( ratio < U_BAR_RATIO ){
          /* found a u; advance past the right bar */
          j = right_bar_start;
          j = (j < width-1)? j+1: j;
          i = col_top[j] + 0.15 * right_u_ht + 0.5;

/*advance past the vertical bar */
          while( j < width-1 && col_top[j] <= i )
            ++j;
          /* correct for cases like touching uv */
          j = ( right_bar_end > j)? j : right_bar_end ;

/*shift little more past right bar */
          j += 0.1 * char_ht;
          return(j);
        }
        else{
          return(min_point);
        }
    }
    else{
      return(min_point);
    }
} define MAX_V_POINT  0.25 /* max ratio of base/height for v point */
define Y_DESCEND    0.15 /* max dist below nominal baseline to be
                             considered a y descender */ check_vwy(comp,min_point,ht,width,nom_base_col)
int min_point,ht,width,nom_base_col;
COMPONENT *comp;
{
```

```
   int i,j,right_end,left_end,basewidth1,basewidth2;
   int valley,valley_col,l_ht,baseline;

l_ht = col_bot[min_point] - extreme_top[min_point] + 1
;

j = min_point;
/*slide right to the lowest point*/
while(col_bot[j+1] > col_bot[j] && j < width-1)
   ++j;

/*slide left to lowest point*/
while(col_bot[j-1] > col_bot[j] && j > 0)
   --j;

/* store the low point */
valley_col = j;

/* check for y descender */
i = (col_bot[valley_col] - extreme_bot[nom_base_col]);
if( i >= Y_DESCEND * extreme_bot[nom_base_col])
   /* it is a y */
   valley = 1;
else
   valley = 0;

/* if not a y, check for other valley points such as o,
e, a etc */
if( valley==0 && (num_strokes[j] > 1 || col_top[j] <=
0.6*l_ht) ){
   /* valley_col is not a v or w */
   return(0);
} else{
   /*could be a y, v or w; check base features */
```

```
/*check base width*/
baseline = col_bot[valley_col];

/*slide right*/
j = valley_col;
while( col_bot[j+1] >= baseline && j < width-1)
   ++j;
right_end = j;

/*slide left*/
j = valley_col;
while(col_bot[j-1] >= baseline && j > 0)
   --j;
left_end = j;

basewidth1 = right_end - left_end + 1;

if( (float)basewidth1/(float)l_ht <= MAX_V_POINT ){

/*check base width again at upshifted baseline*/
   --baseline ;

/*slide right*/
   j = valley_col;
   while( col_bot[j+1] >= baseline && j < width-1)
      ++j;
   right_end = j;

/*slide left*/
   j = valley_col;
   while(col_bot[j-1] >= baseline && j > 0)
      --j;
   left_end = j;

basewidth2 = right_end - left_end + 1;

if(basewidth2 >= basewidth1 && ( (basewidth2 <=
basewidth1 + 3)
```

```
            || ((float)basewidth2 / (float)l_ht <=
MAX_V_POINT) ) )
          valley = 1;
      }/* if basewidth1/l_ht */
    }/*else */ if(valley==1){
      /*found a v/w/y cut point */
      return(1);
    }
    else{
      return(0);
    }

} define MAX_SERIPH_HT1 0.5 /* max height for tracking
seriph in L */
#define MAX_SERIPH_HT2 0.45 /* max height for clearing
seriph in L */
#define MIN_L_RATIO   0.4 /* min W/L ratio for an L bar
*/
#define MIN_SERIPH_RATIO 0.4 /* min of (dist of seriph to
L bar)/(L height)*/ check_l(comp,min_point,ht,width,nom_base_col)
int min_point,ht,width,nom_base_col;
COMPONENT *comp;
{
   int break_pt,i,j,k,l_ht,fd,peak,up,upp_bnd;
   int fd_v_bar,a_break_pt,offset;
   int blank_row,search_dist,bar_start,maxv,minv;
   float ratio;
   /* check the "height" of the left region */
   i = 2 * min_point;
   i = ( i > width-1)? width-1 : i ;
   if( (float)(extreme_top[i]+1) /
```

```
  (float)(extreme_top[min_point]+1) > 1.1 ){
    /* min_point cannot be cutting an L */
    return(min_point);
  }

/*search for adjacent left vertical bar */
  j=min_point;
  l_ht = extreme_bot[nom_base_col] -
extreme_top[min_point] + 1 ;
  blank_row = 0.6 * l_ht;
  search_dist = min_point - 0.6 * l_ht;
  search_dist = (search_dist < 0)? 0 : search_dist;
  fd = fd_v_bar = 0;

/*look for at least 2 cols of char pixels such that the
region to the
    right of the cols contains no char pixels */
  k = l_ht * 0.95 ;
  i = col_bot[min_point] * 0.95;
  do{
    --j;
    offset = min_point - j;
    offset = (offset > 3)? 3 : offset;
    if(strength[j] >= k && col_bot[j] >= i ){
      ++fd;
      if( fd >= 2){
        fd_v_bar = 1;
      }
    }
  }while( j > search_dist &&
comp->im[blank_row][j+offset]==0 && fd_v_bar==0
        && (num_strokes[j] <= 2 || num_strokes[j-1] <=
2) );

bar_start = j + 1;
```

```c
if(fd_v_bar == 1){
  /* check for left bar of u */
  /* advance to the left end col of the bar */
  while(strength[j-1] > 0.5*l_ht && j > search_dist)
    --j;
  if(col_bot[min_point] - col_bot[j] > 2)
    fd_v_bar = 0;
} if(fd_v_bar == 1){
  /*look for small seriph peak*/
  peak=0;
  up=0;
  j=min_point;
  i = j + (0.6 * l_ht);
  i = (i > width-1)? width-1 : i;
  do{
    ++j;
    if(col_top[j] < col_top[j-1]){
      up=1;
    }
    else if(col_top[j] > col_top[j-1] && up==1){
      peak = 1;
    }
  }while(j < i && peak==0);

/* found a correct peak; must not exceed half the
height of L */
  if((extreme_bot[nom_base_col]-col_top[j-1]) <=
(MAX_SERIPH_HT1*l_ht+0.5)
     && peak ==1 ){
    /* check w/l ratio of seriph in "L" to avoid cases
like IJ */
    i = j - bar_start -1;
    if( (float)i / (float)l_ht > MIN_SERIPH_RATIO ){
      /* check bottom edge to confirm  seriphed "L" */
      minv = 1000;
```

```
            maxv = -1;
            for(i = bar_start; i < j-1; ++i){
               minv = (col_bot[i] < minv)? col_bot[i] : minv;
               maxv = (col_bot[i] > maxv)? col_bot[i] : maxv;
            }
            if( (maxv - minv) > 2 )
               /* don't have a straight bottom edge */
               break_pt = min_point;
            else
               break_pt = j-1;
         }
         else{
            break_pt = min_point;
         }
      } else{
         /*no peak found; set upper bound for col_top and
scan right*/
         upp_bnd = extreme_bot[nom_base_col] -
MAX_SERIPH_HT2 * l_ht;
         j = min_point;
         do{
            ++j;
         }while(num_strokes[j]==1 && col_top[j] >= upp_bnd
&& j < width-1);

/* check W/L ratio for min requirement */
         i = j - bar_start - 1;
         ratio = (float) i / (float) l_ht;
         if(ratio < MIN_L_RATIO)
            /* false detection of L bar */
            return(min_point);

/* correction for a vertical bar followed by an A
            e.g.   HA IA MA etc. */
         a_break_pt =
check_a_slope(comp,j,min_point,ht,width);
```

```
          if(a_break_pt == 0){
          break_pt = j-1;
          /* slide back 1 if possible */
          if(col_top[break_pt-1] < col_top[break_pt])
            --break_pt;
        }
        else{
          break_pt = a_break_pt;
        }
      }
    }/*if fd_v_bar */ else{
    /* did not find left vertical bar */
      break_pt = min_point;
    }
    return(break_pt);
} define MAX_A_JUMP 4 /*max increase in #char pixels
across 1 column
                              on slope of side of A */
#define MAX_ROW2 0.55 /*bound for the detection of upper
slope of A */ check_a_slope(comp,break_col,min_point,ht,width)
COMPONENT *comp;
int break_col,min_point,ht,width;
{
   int start_col,end,j,a_slope,row1,row2,A_ht;

A_ht = col_bot[min_point];

start_col = break_col-1;
   row1 = col_top[start_col];

/*scroll up to the top of A */
   j = start_col;
```

```
    end = j + 0.4 * A_ht;
    end = (end > width-1)? width-1 : end;
    a_slope=1;
    do{
      ++j;
      if( comp->im[row1][j]==0 || comp->im[row1-1][j]==0 ||
j==end)
          a_slope=0;
      if(a_slope ==1){
        row2=row1;
        do{
          --row1;
        }while(comp->im[row1-1][j] != 0 && row1 > 0);
        if( (row2 > (MAX_ROW2*A_ht+0.5)) && (row2-row1) >
MAX_A_JUMP ) a_slope=0;
        /* Nb: 1st condition necessary to counter the
seriph of A */
      }
    }while(a_slope==1 && row1 > (0.1*A_ht + 0.5) );

if(a_slope == 1){
      /*scroll down to the bot of A */
      row1 = col_top[start_col];
      j = start_col;
      end = j - 0.4 * A_ht;
      end = (end < 0)? 0 : end;
      do{
        --j;
      if(comp->im[row1][j]==1 || comp->im[row1-1][j]==1
|| j==end )
          a_slope=0;
        if(a_slope == 1){
          row2=row1;
          do{
            ++row1;
          }while(comp->im[row1][j] == 0 && row1 < ht-1);
          if( (row1-row2) > MAX_A_JUMP ) a_slope = 0;
```

```
        }
      }while(a_slope == 1 && row1 < (0.8*A_ht + 0.5) );
    } if(a_slope==0){
      return(0);
    }
    else{
      /*slide down to the bottom of A and return col number
*/
      do{
        row2 = row1;
        --j;
        while(comp->im[row1][j] == 0 && row1 < ht-1)
          ++row1;
      }while( row1 > row2 && row1 < A_ht &&
num_strokes[j]==1 && j >0);

return(j);
    }
} define MIN_C_RATIO 0.7  /* min W/L ratio for C */
define DROP_HT   0.2  /*vertical drop from top of C
considered as break point*/
#define QD_RATIO  0.6  /* max dist of v_bar from left
boundary of q & d */ split_COGQ(comp,new_comp,cleanup)
int cleanup;
COMPONENT *comp, *new_comp[];
/*************************************************************
************
 split at first char if it is one of the following:
      C, O, ( notice that each char has left  "(" portion
**************************************************************
*************/
```

```
{
  int i,j,break_pt,mid,mid_plus,char_ht,co,l_top,l_bot;
  int stroke1,stroke2,stroke3,stroke4p,len,diff;
  int ht,width,v_bar,bar_str;
  int success;

ht = comp->height;
  width = comp->width;

mid = ht/2;
  if(mid >= width-1)
    return(0);

char_ht = extreme_bot[mid] - extreme_top[mid] + 1;
  mid = char_ht/2;

/* first condition for leading C, O, G or Q*/
  i = 0.1 * char_ht + 0.5;
  if( num_strokes[1]==1 && col_top[1] > extreme_top[mid] + i
      && col_bot[1] < (extreme_bot[mid]-i) )
    co = 1;
  else
    co = 0;

/* check for left curve portion */ if( co == 1 && extreme_top[mid] <= i ){

/* look for pt when curve breaks into 2 strokes */
    j = 1;
    while(num_strokes[j] == 1 && j < mid && co==1){
      ++j;
      /* ensure that boundary is monotonically ascending/descending */
      if( col_top[j] > col_top[j-1] || col_bot[j] < col_bot[j-1] )
```

```
            co = 0;
    } if( j==mid || num_strokes[j] != 2 ){
        co = 0;
    }
    else{
        /* ensure that boundary has "spread out" */
        if(col_top[j] == col_top[1] || col_bot[j] ==
col_bot[1] )
            co = 0;
    }

/* weed out d and q possibilities */
    /* find distances to extreme point */
    mid_plus = QD_RATIO * char_ht ;
    /* check for vertical bar */
    v_bar = 0;
    bar_str = extreme_bot[mid_plus] -
extreme_top[mid_plus];
    i = j;
    while( v_bar ==0 && i < mid_plus ){
        ++i;
        if( strength[i] >= 0.9 * bar_str)
            v_bar=1;
    }
    if( v_bar==1 || num_strokes[mid_plus] == 1) {
        l_top = col_top[j+1] - extreme_top[mid_plus];
        l_bot = extreme_bot[mid_plus] - col_bot[j+1];
        diff = l_top - l_bot;
        diff = ( diff >= 0)? diff : -diff ;
        if( diff > (0.15 * char_ht + 0.5) )
            co = 0;
    }

/* at this point, could be C, O Q or G */
    if( co == 1){
```

```c
    /* check for continuation of 2 strokes */
    i = MIN_C_RATIO * char_ht;
    if( i >= width-1)
        return(0);

stroke1 = stroke2 = stroke3 = stroke4p = 0;
    while( j <= i ){
        if( num_strokes[j] == 1 )
            ++stroke1;
        else if( num_strokes[j] == 2 )
            ++stroke2;
        else if( num_strokes[j] == 3 )
            ++stroke3;
        else
            ++stroke4p;

/* check for case of 60, 64, 6G etc */
        if( num_strokes[j]==1 && num_strokes[j-1]==1 &&
            strength[j] > strength[j-1] ){
            break_pt=j-1;
            success =
find_new_comp(comp,new_comp,break_pt,cleanup);
            if(success == 1)
                return(1);
            else
                return(0);
        }
        ++j;

} if( stroke4p > 1){
        /* inconsistency; can't be a C,O,G, or Q */
        return(0);
    }
    else if ( stroke3 > 1 || (stroke3==1 &&
num_strokes[j] >= 2) ){
```

```
      /* could be Q or G */
      /* slide right to the end */
      len = 2 * char_ht;
      len = ( len > width-3 )? width-3 : len;
      i = 0.2 * char_ht;
      while( (col_top[j] <= i || col_top[j+1] > col_top[j] ||
              col_top[j+2] > col_top[j]) &&
             (col_bot[j] >= char_ht-i) &&
             (strength[j] < 0.9*char_ht || num_strokes[j] != 1) &&
             (j < len)  )
        ++j;
      if ( j < len )
        break_pt = j;
      else
        break_pt = 0;
    }
    else{
      /* i.e C or O */

/*look for break point */
      break_pt = 0;
      i = 2 * char_ht;
      i = ( i > width-1 )? width-1 : i;

/*slide right until num_strokes becomes 1 (or 3+), OR until
        col_bot increases OR col_top drops suddenly */
      while( (num_strokes[j] == 2) &&
             (col_bot[j] <= col_bot[j-1] || col_bot[j-1] > col_bot[j-2]
              || col_bot[j-1] > col_bot[j-3]) &&
             (col_top[j] < col_top[j-1] + DROP_HT*char_ht) && (j < i)  )
        ++j;
```

```c
        if( col_bot[j] > col_bot[j-1] ){
          /* col_bot increases; could be a
             C break point ( although num_strokes == 2)
             */ break_pt = j-1;
        }
        else if( col_top[j] >= col_bot[j-1] +
DROP_HT*char_ht ){
          /* sudden drop; eg Cx, Cp */
           break_pt = j-1;
        }
        else if ( num_strokes[j] == 1 ||
num_strokes[j+1]==1 ){
          /* could be O or C connecting at 1 point */
          if( strength[j+1] >= 0.9 * char_ht ){
            /* C connecting at 1 point; eg. CI, CH */
            j -= 0.1*char_ht;
          }
          else if(strength[j] > strength[mid] + 0.1 *
char_ht &&
                  col_top[j] >= col_top[j-1] &&
col_bot[j] <= col_bot[j-1] ){
             /* an O; advance till min strength */
             ++j;
             while( strength[j+1] < strength[j] &&
num_strokes[j+1]==1
                    && j < width-1)
                ++j;
          }
          break_pt = j;
        }
      } /*else C or O */ if(break_pt != 0){
        success =
find_new_comp(comp,new_comp,break_pt,cleanup);
```

```
                if(success == 1)
                    return(1);
                else
                    return(0);
            }
            else{
                return(0);
            }
        } /* if co == 1 */ else{
            return(0);
        }
    }/*if co ==1 && ... */
    else{
        return(0);
    }
} define MAX_FTE_RATIO 0.7   /* max length of horizontal
top of F,T, or E
                                        w.r.t char height */
#define DROP_FACT     0.15  /* sudden drop in col top for
break point */ split_FTE(comp,new_comp)
COMPONENT *comp, *new_comp[];
/*********************************************
split at first char if it is F, T, or E.
*********************************************/
{
    int i,j,mid,char_ht,src_len,k,valley,bar_col[5],num_col;
    int past_blank, break_pt, R_flag;
    int ht,width,success;

ht = comp->height;
```

```
width = comp->width;

mid = ht/2;
if(mid >= width-1)
   return(0);

char_ht = extreme_bot[mid] - extreme_top[mid] + 1;
mid = char_ht/2;

/* ensure that top boundary is flat & near the top */
j = 0.1 * char_ht + 0.5;
i = 0.1 * char_ht + 0.5;

/* adjust boundries so that they begin from 0 */
i = ( i >= 1)? i-1: i;
j = ( j >= 1)? j-1: j;

k = 0.9 * char_ht + 0.5;
src_len = MAX_FTE_RATIO * char_ht -1 ;
src_len = (src_len > width-1)? width-1 : src_len ;
num_col = 0;
past_blank = 1;
while( j < src_len && col_top[j] <= i && num_col < 2){
   if( strength[j] >= k && past_blank==1){
      ++num_col;
      past_blank = 0;
   }
   if( strength[j] < 0.4 * char_ht && past_blank == 0 ){
      /* store the right col position of the bar */
      bar_col[num_col] = j-1;
      past_blank = 1;
   }
   ++j;
} if( (j < src_len && num_col <= 1) || num_col==0 ){
   /* top boundary incorrect */
```

```
      return(0);
   } if(num_col == 2){
      /* possibly IB, ID etc */
      /* backtrack & check for continuity of 2 strokes */
      break_pt = 0;
      i = bar_col[1] + 1;
      R_flag = 0;
      while( i < j && R_flag == 0 && break_pt == 0){
         if( break_pt == 0 && num_strokes[i]==1 &&
col_bot[i] <= char_ht*0.6){
            if( num_strokes[i] == 2)
               R_flag = 1;
            else
               break_pt = i-1;
         }
         ++i;
      }
      if( R_flag==0){
         if( break_pt == 0)
            break_pt =  bar_col[1] + (j - bar_col[1])/2.0 -
1.0 ;

success = find_new_comp(comp, new_comp, break_pt );
         if(success==1)
            return(1);
         else
            return(0);
      }
   } /* num_col==2 */

/* found a flat top with 1 (or 2 if R_flag) vertical
bar   somewhere below */
   /* could be F T E (or R if R_flag is set); find break
point */
```

```c
   /* slide right until valley point OR large col_top drop
*/
   i = DROP_FACT * char_ht + 0.5 ;
   src_len = char_ht + 1;
   src_len = ( src_len > width-1)? width-1 : src_len;
   valley = 0;
   while( (col_top[j] -col_top[j-1]) < i && valley == 0 &&
j < src_len){
      if( (col_top[j] > col_top[j-1]) && col_top[j] >
col_top[j+1] )
         valley = 1;
      ++j;
   } if( j == src_len ){
      /* i.e. no valley & vertical drop not encounted */
      return(0);
   }
   else {

/* store possible break point */
      break_pt = j-1;

i = j*0.7;
      if ( num_strokes[i] <= 2) { /* avoid Ee, Es etc */
         /* check for IX, IV */
         i = j + 0.2 * char_ht + 0.5 ;
         i = (i > width-1)? width-1 : i;

/* slide down right (if possible)  */
         while( col_top[j+1] > col_top[j] && j < i)
            ++j;

/* IX condition */
         if( j > break_pt + 2 && col_bot[j] < 0.8*char_ht && col_top[j] >0.3*char_ht )
```

```
            return(0);

/* IV condition */
        if( col_top[j] > char_ht/2 )
            return(0);
    } success = find_new_comp(comp, new_comp, break_pt );
        if(success == 1)
            return(1);
        else
            return(0);
    }
} define TOP_FACT1   0.4    /*fraction of ht for determining top row of char*/
define MAX_STR_TOP 0.25   /*max strength of stroke at min_point */
#define TOP_END_FACT 0.2   /*dist to end where split cannot occur */
#define MAX_SERIF_TO_BAR_DIST  0.9 /* ratio of
                                   (max serif peak to bar dist)/(bar height) */
#define BAR_FACT1   0.75  /* stength factor for avoiding false bars (U) but
                            also taking into account the case of F */
#define MAX_VALLEY_DES 0.4  /* max valley depth at connection pt between
                               07, P7, PT etc */ split_top(comp,new_comp,cleanup)
int cleanup;
COMPONENT *comp, *new_comp[];
{
    int i,char_ht,end_cols,start_col,top_bnd;
```

```
  int min_point,min_str,j,seriph,down,search_len;
  int
up,current_row,k,peak_pt,right_peak,left_peak,search_dist
;
  int
left_bar_col,right_bar_col,right_dist,left_dist,half_str_
count;
  int ht,width,success;

ht = comp->height;
  width = comp->width;

/* look for char top */
  i = TOP_FACT1 * ht;
  i = (i > width-1)? width-1 : i;
  char_ht = extreme_bot[i] - extreme_top[i] + 1;
  top_bnd = MAX_STR_TOP * char_ht;

end_cols = char_ht * TOP_END_FACT;

/*set start point dist of at least end_cols away from
left
    such that the col top is above the bot region */
  start_col = end_cols ;

/*look for the 1st point of occurrence (from left) of
the
    weakest single stroke above top bnd */
  min_str = 1000;
  min_point = 0;
  for(j=start_col+1; j < (width-end_cols); ++j){
    if(strength[j] < min_str && num_strokes[j]==1 &&
col_bot[j] <= top_bnd){
      min_point = j;
      min_str = strength[j];
    }
  }
```

```
   if(min_point > start_col && min_point <
width-end_cols-1){
      /* avoid premature cut of T before bar */
      seriph = 1;
      for(j=start_col+1; j <= min_point; ++j){
         if(strength[j] >= 0.5 * char_ht)
            seriph = 0;
      }
      if(seriph==1){
         /*if previous cut was at a leading seriph, repeat
min_point search
         at point farther to the right */
         j = 2 * min_point;
         j = (j > width-1)? width-1: j;
         start_col = j-1;
         min_str = 1000;
         for( ; j < (width-end_cols-1); ++j){
            if(strength[j] < min_str && num_strokes[j]==1 &&
col_bot[j] <= top_bnd){
               min_point = j;
               min_str = strength[j];
            }
         }
      }
   } if(min_point > start_col && min_point <
width-end_cols-1){

/*look for adjacent seriphs*/
      /* search left */
      left_peak=0;
      up=0;
      j = min_point;
      current_row = col_bot[j];
      k = char_ht * 0.5;
```

```
    i = j - k;
    i = (i < 0)? 0 : i;
    do{
      --j;
      if(comp->im[current_row+1][j] == 1){
        up=1;
        while(comp->im[current_row+1][j] == 1 &&
current_row+1 < ht-1)
          ++current_row;
      }
      else if(up==1 && comp->im[current_row][j] == 0 &&
            current_row < col_top[min_point] + k ){
        left_peak = 1;
        peak_pt = j+1;
      }
    }while(j > i && left_peak==0 && current_row <
col_top[min_point] + k) ;

if(left_peak==0){
      /*look for right peak*/
      right_peak=0;
      up=0;
      j = min_point;
      current_row = col_bot[j];
      k = char_ht * 0.5;
      i = j + k;
      i = (i > width-1)? width-1 : i;
      do{
        ++j;
        if(comp->im[current_row+1][j] == 1){
          up=1;
          while(current_row + 1 < ht &&
comp->im[current_row+1][j] == 1 )
            ++current_row;
        }
        else if(up==1 && comp->im[current_row][j] == 0
&&
```

```
                    current_row < col_top[min_point] + k ){
            right_peak = 1;
            peak_pt = j-1;
          }
       }while(j < i && right_peak==0 && current_row <
col_top[min_point] + k) ;
     } if( left_peak==1 || right_peak==1){

/* find the nearest vertical bars */

/* find left bar dist */
       search_dist = peak_pt - MAX_SERIF_TO_BAR_DIST *
char_ht;
       search_dist = ( search_dist < 0)? 0 : search_dist;
       j = peak_pt;
       k = 0.95 * char_ht;
       i = BAR_FACT1 * char_ht;
       half_str_count = 0;
       while( (strength[j] < k) && ( j > search_dist) &&
half_str_count == 0 ){
          --j;
          if( strength[j] > i )
             ++half_str_count;
       } if( strength[j] >= k )
          left_bar_col = j;
       else
          left_bar_col = peak_pt;

/* find right bar dist */
       search_dist = peak_pt + MAX_SERIF_TO_BAR_DIST *
char_ht;
       search_dist = ( search_dist > width-1)? width-1 :
search_dist;
```

```
      j = peak_pt;
      k = 0.95 * char_ht;
      i = BAR_FACT1 * char_ht;
      half_str_count = 0;
      while( (strength[j] < k) && ( j < search_dist ) &&
half_str_count == 0){
         ++j;
         if( strength[j] > i )
            ++half_str_count;
      } if( strength[j] >= k )
         right_bar_col = j;
      else
         right_bar_col = peak_pt;

/* check and shift split point to correct side of
serif (if necessary) */
      left_dist = peak_pt - left_bar_col;
      right_dist = right_bar_col - peak_pt;
      if( right_peak == 1){
         if( left_dist > right_dist &&
num_strokes[peak_pt] <= 2 ){
            /*serif belongs to left bar; shift cut point to
right side of serif*/
            min_point = peak_pt + 0.05 * char_ht;
         }
      }
      else{ /* i.e. left_peak == 1 */
         if( left_dist < right_dist &&
num_strokes[peak_pt] <= 2 ){
            /*serif belongs to right bar; shift cut point
to left side of serif*/
            j = peak_pt - 0.05 * char_ht;
            min_point = j;

/* to avoid cases like CB, CD, etc, move cut
```

```
                point right until single
                        stroke is encounted
                    while( num_strokes[j+1] > 1 && j < min_point )
                        ++j;
                    min_point = j;    */
                }
            }
        } else{
            /* check for cases PT & P7; serif touches P, and we
 need to shift
                cut point slightly left */
            /* search left only */
            search_len = min_point - 0.4 * char_ht;

/* don't bother if no space for a leading P */
            search_len = (search_len < 0)? min_point :
 search_len;

k = MAX_VALLEY_DES * char_ht;
            peak_pt = down = 0;
            j = min_point;
            do{
              --j;
              if( col_top[j] > col_top[j+1]){
                down = 1;
              }
              else if(down==1 && col_top[j] < col_top[j+1] ){
                peak_pt = j+1;
              }
            }while(j > search_len && peak_pt==0 && col_top[j] <
 k) ;

if(peak_pt != 0 && col_top[peak_pt] < char_ht/2 &&
                num_strokes[peak_pt]==1 && strength[peak_pt] <
 MAX_STR_TOP * char_ht)
```

```
          min_point = peak_pt;
     }

/* check to avoid tail seriff types */
     j = min_point;
     while(j < width-1 && col_bot[j] < char_ht/2)
        ++j;
     if( j == width-1)
        return(0);

/* a suitable split point has been found */
     success =
find_new_comp(comp,new_comp,min_point,cleanup);
     if(success == 1)
        return (1);
     else
        return(0);

}
   else
     return(0);

} define MAX_M_WIDTH  1.5
define D_STR        0.35  /* max strength for double
stroke split */
#define V_DROP       0.15  /* min vertical drop height
for b, k etc */ split_tb(comp,new_comp,cleanup)
int cleanup;
COMPONENT *comp, *new_comp[];
/*******************************************************
Touching at top and bottom : IM, HM, XI, IX etc
*******************************************************/
```

```
{
  int
i,j,mid,min_point,src_len,char_ht,slide_left,slide_right;
  int width,min_str,ht,r_col,l_col,k,success;

ht = comp->height;
  width = comp->width;

mid = ht/2;
  if(mid >= width-1)
    return(0);

char_ht = extreme_bot[mid] - extreme_top[mid] + 1;
  mid = char_ht/2;

/* search for min strength top & bot touch col */
  src_len = MAX_M_WIDTH * char_ht;
  src_len = ( src_len > width-1)? width-1 : src_len;
  i = 0.2 * char_ht + 0.5;
  j = i;
  min_str = D_STR * char_ht + 1;
  min_point = 0;
  while( j < src_len && j < (width-i) ){
    if(num_strokes[j]==2 && col_top[j] <= 1 &&
       col_bot[j] >= extreme_bot[mid]-1 && strength[j] <
min_str){
      min_point = j;
      min_str = strength[j];
    }
    ++j;
  } if(min_point != 0){
    /* cases like Xa, Ia, Ha etc */
    i = 0.1 * char_ht + 0.5;
    k = 0.2 * char_ht + 0.5;
    j = min_point;
```

```c
      if(col_top[j+i] >= k ){
        /* found Xa, Ia type; slide right */
        while( col_top[j+1] < k)
          ++j;
        min_point = j;

/* check for case of "L4" or perhaps Lx which
normally should have been
            seperated */
        if( col_top[j+1] >= 0.8*char_ht ){
          /* case of L.. ;  slide right */
          while( col_top[j+1] > 0.65 * char_ht)
            ++j;
          min_point = j;
        }
      }
      else{
        /* for cases like PO, OS, OT, DT, OT MI, HI, II etc
*/

/* look for nearest single stroke col on left &
right */
        src_len = j + char_ht/2;
        src_len = (src_len > width-1)? width-1 : src_len;

/* slide right until 1 stroke */
        while( num_strokes[j] != 1 && j < src_len )
          ++j;

/* continue to slide right, making sure that no
vertical drop
            is encounted; avoid cases like IX, Ik, Ib */
        k = j + 0.2 * char_ht + 0.5;
        k = (k > width-1)? width-1: k;
        while( j < k){
          /* check: case of IX, Ik */
```

```
            if( col_top[j]-col_top[j-1] >= V_DROP * char_ht +
0.5 ){
            success =
find_new_comp(comp,new_comp,min_point,cleanup);
            if(success == 1)
              return(1);
            else
              return(0);
        }
        ++j;
      }
      r_col = j-1;

l_col = min_point - 0.2 * extreme_bot[min_point] +
0.5;

l_col = (l_col < 0)? 0 : l_col;

/* determine direction to look for valley beak_pt
*/ slide_right = slide_left = 0;
      if(col_top[r_col] > 1 && col_top[l_col] > 1){
        /* slide to the side which has "more space" */
        j = min_point;
        if(j > (width-j) )
          slide_left=1;
        else
          slide_right=1;
      }
      else if( col_top[r_col] > 1 ){
        slide_right=1;
      }
      else if( col_top[l_col] > 1 ){
        slide_left=1;
      } if(slide_right==1){
        /* slide right till a valley point */
```

```
            j = r_col;
            while( (col_top[j+2] > col_top[j]   || col_top[j]
<= 1) && j < width-1)
                ++j;

/* check for XN, IN, HN etc cases */
            if( col_top[j+2] <= 0.1*char_ht+0.5 &&
col_top[j+1] >= char_ht/2 ){
                success =
find_new_comp(comp,new_comp,min_point,cleanup);
                if(success == 1)
                    return(1);
                else
                    return(0);
            }

/* min_point is biased left to avoid poor seg in
Dy, Dj */
            min_point = j-1;
        }
        else if(slide_left==1){
        /* slide left past top region until a valley
point */
            j = l_col;
            while( (col_top[j-2] > col_top[j]   || col_top[j]
<= 1) && j > 0 )
                --j;
            min_point = j;
        }
    }/* end else */
  }/* end if min_point != 0 */ i = 0.2 * char_ht + 0.5;
  if( min_point >= i && min_point <= width-i){
    success =
find_new_comp(comp,new_comp,min_point,cleanup);
    if(success == 1)
```

```
      return(1);
    else
      return(0);
  }
  else{
    return(0);
  }
} define MAX_V_BASE 0.35  /* max base width of v or w */
define SEARCH_LIM1 0.6  /* search limit for 1st left
slope */
#define SEARCH_LIM2 0.8  /* search limit for 1st right
slope */
#define SEARCH_LIM3 1.25 /* search limit for 2nd left
slope */
#define SEARCH_LIM4 1.5  /* search limit for 2nd right
slope */ split_vw(comp,new_comp,cleanup)
int cleanup;
COMPONENT *comp, *new_comp[];
/*******************************************************
Touching  : leading v or w ;    v..    w..
*******************************************************/

{
  int width,ht,char_ht,i,j,src_len,bot_line,left_col1,left_col2;
  int right_col1,right_col2,break_pt;

ht = comp->height;
  width = comp->width;

i = ht * 0.3;
  i = (i >= width)? width-1 : i;
```

```c
  while( extreme_bot[i+1] > extreme_bot[i] && i <
width-1)
     ++i;
  bot_line = extreme_bot[i] - 0.04 * (float)char_ht ;
  j = 0.1 * ht;
  j = (j >= width)? width-1 : j;
  char_ht = extreme_bot[i] - extreme_top[j];

src_len = SEARCH_LIM1 * char_ht;
  src_len = (src_len >= width)? width-1 : src_len;

/*look for first valley point */
  /* first extension below bot line */
  j=1;
  while ( col_bot[j] < bot_line && j < src_len )
     ++j;

if(j==src_len)
     return(0);

/*look for right part; rise above bot line */
  src_len = SEARCH_LIM2 * char_ht;
  src_len = (src_len >= width)? width-1 : src_len;
  left_col1 = j;
  while( col_bot[j+1] >= bot_line && j < src_len )
     ++j;

right_col1 = j;
  if(j==src_len || (j-left_col1) > MAX_V_BASE * char_ht)
     return(0);

/* a possible v or w; check furthur for slopes */
  if( col_bot[left_col1-1] < col_bot[left_col1] &&
      col_bot[right_col1+1] < col_bot[right_col1] &&
      col_bot[left_col1-2] < col_bot[left_col1-1]) {

/* a v; scroll up to break point */
```

```
      j = right_col1+1;
      while( col_bot[j+1] <= col_bot[j] && j < width-1)
        ++j;
      if( j < width - 0.15 * char_ht )
        break_pt = j;
      else
        return(0);
      /* check for possible w */
      /*look for next valley point; extension below bot
line */
      src_len = SEARCH_LIM3 * char_ht;
      src_len = (src_len >= width)? width-1 : src_len;
      while ( col_bot[j] < bot_line && j < src_len )
        ++j;

if(j < src_len){
        /*look for right part; rise above bot line */
        src_len = SEARCH_LIM4 * char_ht;
        src_len = (src_len >= width)? width-1 : src_len;
        left_col2 = j;
        while( col_bot[j+1] >= bot_line && j < src_len )
          ++j;

right_col2 = j;
        if(j==src_len || (j-left_col2) > MAX_V_BASE *
char_ht){
            /* do nothing */
        }
        else if( col_bot[left_col2-1] < col_bot[left_col2]
&&
              col_bot[right_col2+1] <
col_bot[right_col2]){
            /* a w; find new break_pt */
            j = right_col2 + 1;
            while( col_bot[j+1] <= col_bot[j] && j < width-1)
              ++j;
            break_pt = j;
```

```
      }
    }/* if j < src_len */ if( break_pt < width - 0.15 * char_ht -1 ){
      i = find_new_comp(comp,new_comp,break_pt,cleanup);
      if(i==1)
        return(1);
      else
        return(0);
    }
    else{
      return(0);
    }
  }/* possible v or w */
  else{
    return(0);
  }
} split_oo(comp,new_comp,cleanup)
int cleanup;
COMPONENT *comp, *new_comp[];
/************************************************
looks for double v points as in oo, oc, od DO, Do etc
*************************************************/
{
  int i,j,ht,width,break_pt,src_len;

ht = comp->height;
  width = comp->width;
  src_len = 1.1 * ht + 0.5;
  src_len = (src_len > width-4)? width-4 : src_len;
  j = 0.5 * ht - 1;
  break_pt = 0;
  while( break_pt == 0 && j < src_len ){
    ++j;
```

```
    /* check for top v */
    if(col_top[j-1] < col_top[j] &&
       (col_top[j+1] < col_top[j] ||
        (col_top[j+1] == col_top[j] && col_top[j+2] <
col_top[j+1])) ) {
       /*check bottom v; 3 cases */
       i = j;
       if(col_bot[i-2] > col_bot[i-1] && col_bot[i-1] >
col_bot[i] &&
          col_bot[i+2] > col_bot[i+1] &&
          (col_bot[i+1] > col_bot[i] ||
           (col_bot[i+1] == col_bot[i] && col_bot[i+3] >
col_bot[i+2])) )
          break_pt=j;

i = j+1;
       if(col_bot[i-2] > col_bot[i-1] && col_bot[i-1] >
col_bot[i] &&
          col_bot[i+2] > col_bot[i+1] &&
          (col_bot[i+1] > col_bot[i] ||
           (col_bot[i+1] == col_bot[i] && col_bot[i+3] >
col_bot[i+2])) )
          break_pt=j;

i = j-1;
       if(col_bot[i-2] > col_bot[i-1] && col_bot[i-1] >
col_bot[i] &&
          col_bot[i+2] > col_bot[i+1] &&
          (col_bot[i+1] > col_bot[i] ||
           (col_bot[i+1] == col_bot[i] && col_bot[i+3] >
col_bot[i+2])) )
          break_pt=j;

}/*endif for top v */
}/* endwhile*/ if( break_pt==0){
```

```c
      return(0);
    }
    else{
      i = find_new_comp(comp,new_comp,break_pt,cleanup);
      if( i==1)
        return(1);
      else
        return(0);
    }
} split_f(comp,new_comp,cleanup)
int cleanup;
COMPONENT *comp, *new_comp[];
/*********************************************************
Touching f : fx, fi, fr, fm  f.. etc
*********************************************************/.

{
   int i,j,j1,break_pt,f_ht;
   int width,ht;

ht = comp->height;
   width = comp->width;

i = 0.2*ht + 0.5;
   f_ht = extreme_bot[i];

/* detect left portion of f */
   if( col_top[0] < 0.2*f_ht+0.5 )
     return(0);

/* move right to 1st column */
   j=0;
   while( strength[j] < f_ht*0.6+0.5  && j < width)
     ++j;
```

```
  if(num_strokes[j] != 1 || num_strokes[j+1] != 1)
    return(0);

/* test for left curve portion of f */
  if( j > 0.2*f_ht || extreme_top[j] <= 0.1*f_ht ||
col_bot[j] < (f_ht-1))
    return(0);

/* check upper curve portion */
  i = j + 0.1 * f_ht + 0.5;
  j1 = j;
  while( j <= i &&  col_top[j] >= col_top[j+1] && j <
width-1)
    ++j;

if( j != i+1 || col_top[j1] <= col_top[j] )
    return(0);

/* look for next half height vert bar on right */
  /* advance past current bar */
  while( strength[i+1] >= f_ht/2 && i < width-1)
    ++i;

/* advance to next bar */
  while( strength[i+1] < f_ht/2 && i < width-1)
    ++i;

/* look for down slope at top of f */

/* move right to top */
  while( col_top[j+1] <= col_top[j] && j < width-1){
    /* exclude possible cases like d.. */
    if( col_top[j+1] == col_top[j] && col_top[j] > 0.1 *
f_ht + 0.5)
      return(0);
    ++j;
  }
```

```c
    if( extreme_top[j] > 1 )
        return(0);

/* look for either large vertical drop or no vertical
drop */
    while( col_top[j+1] - col_top[j] < (0.15 * f_ht +0.5)
&&
            col_top[j+1] - col_top[j] > 0  && j < width-1)
        ++j;

/* check aspect ratio */
    if( j > 0.85*f_ht + 0.5 || j < 0.25*f_ht + 0.5)
        return(0);

break_pt = (i < j)? i : j ;
    i = find_new_comp(comp,new_comp,break_pt,cleanup);
    if(i==1)
        return(1);
    else
        return(0);
} define M_DROP_HT   0.2  /* vert drop for break_pt*/
define M_RISE_HT   0.3   /* gradual vert rise for
break_pt*/
#define JUMP_HT     0.15 /* sharp vert rise i height */
#define MIN_CHAR_WID 0.5 /* min char width before vert
rise cut */
#define LEFT_DISP   0.35 /* start col for searching break
pt */ split_misc(comp,new_comp,cleanup)
int cleanup;
COMPONENT *comp, *new_comp[];
/******************************************************
Misc Touching  : po, pc.., do, dc.., se, sc, ... etc
```

**********************************************/

```
{
  int
width,ht,char_ht,ht1,break_pt,break_code,i,j,src_len;
  int steep_pt;

ht = comp->height;
  width = comp->width;

i = ht * 0.75;
  i = (i >= width)? width-1 : i;
  char_ht =  extreme_bot[i];

/*possible char ht for cases like gl, gh rt etc */
  ht1 = char_ht - extreme_top[char_ht/4];

/* set start column for sliding right */
  j = char_ht * LEFT_DISP;
  if(j >= width-1)
    return(0);

/* look for break point */
  src_len = 1.2 * ht;
  src_len = ( src_len < width-2 )? src_len : width-3;
  break_pt = 0;
  steep_pt = 0;
  while( break_pt == 0 && j < src_len) {
    ++j;

/* a valley break pt */
    if(col_top[j-1] < col_top[j] && col_top[j+1] < col_top[j] &&
       j > ht1/2 && col_top[j] > 1 && strength[j] < 0.75 * ht1){
      break_pt = j;
      break_code = 1;
```

```
        }
    /* a steep drop */
    else if (col_top[j+1]-col_top[j] > M_DROP_HT *
char_ht){
        steep_pt = j;
    }
    /* col_top rise like rt etc*/
    else if (extreme_top[j+1] < extreme_top[j] &&
            extreme_top[j+2] < extreme_top[j+1] &&
            num_strokes[j]==1 && strength[j] <=
0.2*char_ht){
        break_pt = j;
        break_code = 2;
    }
    /* col_top jump like pl, kh, gl etc */
    else if (col_top[j] - col_top[j+1] >  JUMP_HT *
char_ht){
        /* check for d */
        i = j - 0.1 * char_ht;
        i = (i < 0)?0 : i;
        if(num_strokes[j]==2 && num_strokes[i]==2 &&
            col_top[0] > char_ht/3 && col_top[0] >
col_top[1] &&
            col_bot[0] < col_bot[1]) {
            /* do not break */
        }
        else{
            break_pt = j;
            break_code = 3;
        }
    }
    /* sudden rise in col_bot */
    else if (col_bot[j]-col_bot[j+1] > M_RISE_HT *
char_ht){
        if(j > MIN_CHAR_WID * ht1 ){
            break_pt = j;
            break_code = 4;
```

```
        }
      }
    }/*endwhile*/

/* check if steep point should be used as break pt */
    if(steep_pt != 0 && steep_pt < break_pt){
      if( break_code != 1){
        /* i.e. not a valley pt */
        break_pt = steep_pt;
      }
      else{
        /* don't change; valey is preferred to steep pt */
      }
    } if(break_pt != 0 && break_pt < width - 1 - 0.15
*char_ht){
      i = find_new_comp(comp,new_comp,break_pt,cleanup);
      if( i==1)
        return(1);
      else
        return(0);
    }
    else{
      return(0);
    }
} clean_border(orig_comp,break_pt,thickness)
COMPONENT *orig_comp;
int break_pt, thickness;
{
  int i,j,k,end_col,col1,mid,start,skip;
  int ret_val;

ret_val = 0;
```

```c
/* check left component */
end_col = break_pt;
col1 = end_col - thickness;
mid = orig_comp->height/2;

/* begin from top & scan down; look for "floating" blob
*/
j = 0;

/*look for start point */
skip = 0;
while( j < mid && (orig_comp->im[j][end_col] == 0) ){
  if(orig_comp->im[j][col1] != 0){
    skip = 1;
    break;
  }
  ++j;
} if( j < mid && skip == 0){
  start = j;
  while( j < mid && orig_comp->im[j][end_col] != 0 &&
         orig_comp->im[j][col1] == 0)
    ++j;

if( orig_comp->im[j][end_col]==0 &&
orig_comp->im[j][col1]==0 ){
    /* found a blob; delete it*/
    for(i=start; i < j; ++i)
      for(k = end_col; k > col1; --k )
        orig_comp->im[i][k]=0;
    ret_val = 1;
  }
}

/* begin from bot & scan up; look for "floating" blob
*/
```

```c
    j = orig_comp->height-1;

/*look for start point */
    skip = 0;
    while( j > mid && (orig_comp->im[j][end_col] == 0) ){
      if(orig_comp->im[j][col1] != 0){
        skip = 1;
        break;
      }
      --j;
    } if( j > mid && skip == 0){
      start = j;
      while( j > mid && orig_comp->im[j][end_col] != 0 &&
             orig_comp->im[j][col1] == 0)
        --j;

if( orig_comp->im[j][end_col]==0 &&
orig_comp->im[j][col1]==0 ){
        /* found a blob; delete it*/
        for(i=start; i > j; --i)
          for(k = end_col; k > col1; --k )
            orig_comp->im[i][k]=0;
        ret_val = 1;
      }
    }

/* check right component */
    end_col = break_pt + 1 ;
    col1 = end_col + thickness;

/* begin from top & scan down; look for "floating" blob
*/
    j = 0;

/*look for start point */
```

```
    skip = 0;
    while( j < mid && (orig_comp->im[j][end_col] == 0) ){
      if(orig_comp->im[j][col1] != 0){
        skip = 1;
        break;
      }
      ++j;
    } if( j < mid && skip == 0 ){
      start = j;
      while( j < mid && orig_comp->im[j][end_col] != 0 &&
             orig_comp->im[j][col1] == 0)
        ++j;

if( orig_comp->im[j][end_col]==0 &&
orig_comp->im[j][col1]==0 ){
        /* found a blob; delete it*/
        for(i=start; i < j; ++i)
          for(k = end_col; k < col1; ++k )
            orig_comp->im[i][k]=0;
        ret_val = 1;
      }
    }

/* begin from bot & scan up; look for "floating" blob
*/
    j = orig_comp->height-1;
    /*look for start point */
    skip = 0;
    while( j > mid && (orig_comp->im[j][end_col] == 0) ){
      if(orig_comp->im[j][col1] != 0){
        skip = 1;
        break;
      }
      --j;
    }
```

```
   if( j > mid && skip == 0 ){
     start = j;
     while( j > mid && orig_comp->im[j][end_col] != 0 &&
            orig_comp->im[j][col1] == 0)
       --j;

if( orig_comp->im[j][end_col]==0 &&
orig_comp->im[j][col1]==0 ){
        /* found a blob; delete it*/
        for(i=start; i > j; --i)
          for(k = end_col; k < col1; ++k )
            orig_comp->im[i][k]=0;
        ret_val = 1;
     }
   }

/* no deletion occurred */
   return( ret_val );
} print_cut_features(comp)
COMPONENT *comp;
{
   int j,width;

printf("\ncomponent ht =    %d",comp->height);
   printf("\ncomponent width = %d",comp->width);
   width = comp->width;

printf("\n\nstrength: ");
   for(j=0; j < width; ++j)
     printf("%3d", strength[j]);

printf("\n\nnum_strokes: ");
   for(j=0; j < width; ++j)
     printf("%3d", num_strokes[j]);
```

```
    printf("\n\ncol_top: ");
    for(j=0; j < width; ++j)
      printf("%4d", col_top[j]);

printf("\ncol_bot: ");
    for(j=0; j < width; ++j)
      printf("%4d", col_bot[j]);

printf("\n\nextreme_top: ");
    for(j=0; j < width; ++j)
      printf("%4d", extreme_top[j]);
    printf("\nextreme_bot: ");
    for(j=0; j < width; ++j)
      printf("%4d", extreme_bot[j]);
} print_comp(comp)
COMPONENT *comp;
{
   int i,j,ht,width;
   unsigned char c;

ht = comp->height;
   width = comp->width;

printf("\n\ncomponent: ht= %d   width = %d",ht,width);
   for(i=0; i < ht;++i){
     printf("\n");
     for(j=0;j < width;++j){
         c = (comp->im[i][j] == 0)? '_' : '1' ;
       printf("%c",c);
     }
   }
} find_new_comp(orig_comp,new_comp,break_pt,cleanup)
```

```
   int break_pt,cleanup;
   COMPONENT *orig_comp, *new_comp[];
   {
     int i,j,k,top,bot,left_bk,right_bk;
     int thickness, erased;
     COMPONENT *create_comp();

/* Note that new comp cols are: [0,left_bk] and
   [right_bk,width-1] */
     left_bk = break_pt;
     right_bk = break_pt+1;

if(cleanup == 1){
       thickness = 0.1 * orig_comp->height;
       erased = clean_border(orig_comp, break_pt,
   thickness);

if( erased ==1 ){
         /* reset col_top, col_bot, extreme_top, extreme_bot
   arrays */
         for(j = break_pt-thickness+1; j <=
   break_pt+thickness; ++j){
           col_top[j] = 999;
           col_bot[j] = 0;
           for(i=0; i < orig_comp->height; ++i){
             if( orig_comp->im[i][j] != 0){
               col_top[j] = (col_top[j] > i)? i :
   col_top[j];
               col_bot[j] = (col_bot[j] < i)? i :
   col_bot[j];
             }
           }
           extreme_top[j]=(extreme_top[j-1]>col_top[j])?
                          col_top[j]:extreme_top[j-1];
           extreme_bot[j]=(extreme_bot[j-1]<col_bot[j])?
                          col_bot[j]:extreme_bot[j-1];
           if(col_top[j] == 999){
```

```c
        /* i.e. no pixels in this col */
        /* adjust break points; discard this col */
        left_bk = ( left_bk >= j)? j-1 : left_bk;
        right_bk = (right_bk <= j)? j+1: right_bk;
      }

}/* for j */
  }/* if erased */
 }/* if cleanup */

/* make new components; nb: space allocated for
pointers */
  new_comp[0] = create_comp(1);
  new_comp[1] = create_comp(1);

/*set parameters for 1st new component */
  new_comp[0]->x_loc = orig_comp->x_loc;
  new_comp[0]->y_loc = orig_comp->y_loc +
extreme_top[left_bk];
  new_comp[0]->height =
                 extreme_bot[left_bk] -
extreme_top[left_bk] + 1;
  new_comp[0]->width = left_bk + 1;

/*set up pointers to the rows of pixels for 1st char*/
  i = 0;
  for(j = extreme_top[left_bk]; j <=
extreme_bot[left_bk]; ++j){
     new_comp[0]->im[i] = orig_comp->im[j];
     ++i;
  }

/*set parameters for 2nd char */
  j = right_bk;

/* look for top & bot of 2nd char */
  top = col_top[j];
```

```
    bot = col_bot[j];
    for(++j ; j < orig_comp->width; ++j){
       if(top > col_top[j]) top = col_top[j];
       if(bot < col_bot[j]) bot = col_bot[j];
    } new_comp[1]->x_loc = orig_comp->x_loc + j;
    new_comp[1]->y_loc = orig_comp->y_loc + top;
    new_comp[1]->height = bot - top + 1;
    new_comp[1]->width = orig_comp->width - right_bk;

/*set up pointers to the rows of pixels for 2nd char*/
    j = right_bk;
    i = 0;
    for(k = top; k <= bot; ++k){
       new_comp[1]->im[i] = &(orig_comp->im[k][j]);
       ++i;
    }

/*check for valid size of new components */
    /* min height check */
    if( new_comp[1]->height <= (0.35 * new_comp[0]->height)
||
        new_comp[0]->height <= (0.35 *
new_comp[1]->height))
        return(0);

/* continuity check; eg : splitting an I or C*/
    if( ((float)new_comp[0]->width /
(float)new_comp[0]->height) < 0.75 ){
       i = new_comp[0]->height/2;
       j = 0;
       /*look for char pixels in mid region */
       while( j < new_comp[0]->width &&
new_comp[0]->im[i][j] == 0 )
          ++j;
       if( j == new_comp[0]->width )
```

```
        return(0);
    }
    if( ((float)new_comp[1]->width /
(float)new_comp[1]->height) < 0.75 ){
        i = new_comp[1]->height/2;
        j = 0;
        /*look for char pixels in mid region */
        while( j < new_comp[1]->width &&
new_comp[1]->im[i][j] == 0 )
            ++j;
        if( j == new_comp[1]->width )
            return(0);
    }

/* 2nd comp has narrow width */
    /* check for valid l; in case it exceeds min heightt
but does not
        ascend to top of char */
    if( (float)new_comp[1]->width /
(float)new_comp[0]->height <= 0.2 ){
        if(top > 0.15 * new_comp[0]->height)
            return(0);
    }

/* new_comps OK */
    return(1);

}
```

APPENDIX F

Copyright 1990 by Eastman Kodak Company

```
#define MIN_SPLIT_RATIO  50.0 /* at least 1 split char
must have ratio > this ;

otherwise it is an
incorrect split */
```

```
general_check(OrigCharPtr, Comp1Ptr,
Comp2Ptr,split_stage)
CHAR_STRUCT *OrigCharPtr, *Comp1Ptr, *Comp2Ptr;
int split_stage;
/**********************************************************
*
    Check for general errors in splitting.
***********************************************************
*/
{
  char orig, c1, c2;

/* check that at least 1 Char has sufficiently high
score */
  if(Comp1Ptr->ScoreRatio < MIN_SPLIT_RATIO &&
     Comp2Ptr->ScoreRatio < MIN_SPLIT_RATIO    )
    return(0);

orig = OrigCharPtr->OutputChoice.Character;
  c1 = Comp1Ptr->NN1_FirstChoice.Character;
  c2 = Comp2Ptr->NN1_FirstChoice.Character;

/* check for ? -> ll lI cases; valid only for split_bot
*/
  if( (split_stage >= 2)   &&
      ( (c1 == 'l' && c2 == 'l') ||
        (c1 == 'I' && c2 == 'l') ||
        (c1 == 'l' && c2 == 'I')     ) )
    return(0);

/* check for n -> rl; also not possible at split_top
stage */ if( (orig == 'n' || split_stage == 4) &&
      (c1 == 'r' || c1 == 'l' || c1 == 'I') && c2 == 'l'
)
      return(0);
```

```c
/* check for u -> (1,J),(L,1) cases */
if( (orig == 'u' || orig == 'U')  &&
    ( (c1 == 'L' && c2 == '1') ||
      (c1 == '1' && c2 == 'J') ||
      (c1 == 'L' && c2 == 'J') ) )
  return(0);

/* check for Y -> 1,r cases */
if( (orig == 'Y' || orig == 'y') && (c1 == '1' || c1 == ')') && c2 == 'r' )
  return(0);

/* check for R -> F,1 cases */
if( orig == 'R' && c1 == 'F' && c2 == '1' )
  return(0);

/* check for H -> p,1 cases */
if( orig == 'H' && c1 == 'p' && c2 == '1' )
  return(0);

/* check for H -> F,1  F,I  I,i  II cases; bot,top & tb
splits excluded */
if( (orig == 'H') &&
    (split_stage != 1 && split_stage != 4 &&
split_stage != 5 ) &&
    ( (c1 == 'F' && c2 == '1' ) ||
      (c1 == 'F' && c2 == 'I' ) ||
      (c1 == 'I' && c2 == 'i' ) ||
      (c1 == 'I' && c2 == 'I' )     ) )
  return(0);

/* ? -> )(    )c    );      )=         */
/*       (J   (1   )1       rL */
if( (c1 == ')' && c2 == '(' ) ||
    (c1 == 'J' && c2 == '(' ) ||
    (c1 == ')' && c2 == 'c' ) ||
    (c1 == ')' && c2 == ';' ) ||
```

```
                    (c1 == ')' && c2 == '=' ) ||
                    (c1 == 'I' && c2 == ')' ) ||
                    (c1 == 'I' && c2 == '(' ) ||
                    (c1 == '(' && c2 == ')' ) ||
                    (c1 == 'c' && c2 == ')' ) ||
                    (c1 == '(' && c2 == 'J' ) ||
                    (c1 == '(' && c2 == 'l' ) ||
                    (c1 == '(' && c2 == ';' ) ||
                    (c1 == ')' && c2 == 'l' ) ||
                    (c1 == 'r' && c2 == 'L' )         )
        return(0);

/* check for d -> (c,l) cases */
    if( orig == 'd' && c1 == 'c' && c2 == 'l' )
        return(0);

/* check for T -> (r,r) cases */
    if( orig == 'T' && c1 == 'r' && c2 == 'r' )
        return(0);

/* check for w -> (\,v) cases */
    if( (orig == 'w' || orig =='W') && (c1 == '\\') && (c2
== 'v') )
        return(0);

/* check for B -> (E,l) cases */
    if( (orig == 'B') && (c1 == 'E') && (c2 == 'l') )
        return(0);

/* check for q -> (c,l) (c,I)  cases */
    if( orig == 'q' && c1 == 'c' && (c2 == 'l' || c2 ==
'I')  )
        return(0);

/* check for J -> (%,J) cases */
if( orig == 'J' && c1 == '%' && c2 == 'J' )
    return(0);
```

```c
    /* check for v -> 1,/  l,r  &,r cases */
    if( (orig == 'v') &&
        ( (c1 == 'l' && c2 == '/') ||
          (c1 == 'l' && c2 == 'r') ||
          (c1 == '&' && c2 == 'r') ) )
      return(0);
    /* check for N -> h,l  b,J  I,%  1,% cases */
    if( (orig == 'N') &&
        ( (c1 == 'h' && c2 == 'l') ||
          (c1 == 'b' && c2 == 'J') ||
          (c1 == 'I' && c2 == '%') ||
          (c1 == 'l' && c2 == '%') ) )
      return(0);

/* check for K -> I,c  l,c  I,( cases */
    if( (orig == 'K') &&
        ( (c1 == 'I' && c2 == 'c') ||
          (c1 == 'I' && c2 == '(') ||
          (c1 == 'l' && c2 == '(') ) )
      return(0);

/* check for G -> G,;  (D cases */
    if( (orig == 'G') &&
        ( (c1 == 'G' && c2 == ';') ||
          (c1 == '(' && c2 == 'D') ) )
      return(0);

/* pass all general checks */
    return(1);

} define SPLIT_RATIO_THRES1  50 /* both split chars must
have ratios > this to be accepted */
define SPLIT_RATIO_THRES2  50
#define SPLIT_RATIO_THRES3  50
```

```
#define SPLIT_RATIO_THRES4    50
#define SPLIT_RATIO_THRES5    50
#define SPLIT_RATIO_THRES6    50
#define SPLIT_RATIO_THRES7    50
#define SPLIT_RATIO_THRES8    50
define SPLIT_RATIO_THRES9    100 check_bot(OrigCharPtr, Comp1Ptr, Comp2Ptr)
CHAR_STRUCT *OrigCharPtr, *Comp1Ptr, *Comp2Ptr;
{
  char c;

c = OrigCharPtr->OutputChoice.Character;

if( (c == 'u') || (c == 'N') ){
    if( (Comp1Ptr->ScoreRatio > SPLIT_RATIO_THRES1) &&
        (Comp2Ptr->ScoreRatio > SPLIT_RATIO_THRES1) )
      return(1);
    else
      return(0);
  }
  return(1);
} check_cogq(OrigCharPtr, Comp1Ptr, Comp2Ptr)
CHAR_STRUCT *OrigCharPtr, *Comp1Ptr, *Comp2Ptr;
{
  char c;

c = OrigCharPtr->OutputChoice.Character;
if( (c == 'q') || (c == 'Q') ){
  if( (Comp1Ptr->ScoreRatio > SPLIT_RATIO_THRES2) &&
      (Comp2Ptr->ScoreRatio > SPLIT_RATIO_THRES2) )
    return(1);
  else
    return(0);
}
```

```
    return(1);
} check_fte(OrigCharPtr, Comp1Ptr, Comp2Ptr)
CHAR_STRUCT *OrigCharPtr, *Comp1Ptr, *Comp2Ptr;
{
  char c;
  int m_stat;

m_stat = check_m(OrigCharPtr);
  if(m_stat == 1)
    return(0);

if( OrigCharPtr->OutputChoice.Character == 'R'){
    if( Comp1Ptr->ScoreRatio > SPLIT_RATIO_THRES3 &&
        Comp2Ptr->ScoreRatio > SPLIT_RATIO_THRES3 )
      return(1);
    else
      return(0);
  } return(1);
} check_top(OrigCharPtr, Comp1Ptr, Comp2Ptr)
CHAR_STRUCT *OrigCharPtr, *Comp1Ptr, *Comp2Ptr;
{
  char c;
  int m_stat;
  c = OrigCharPtr->OutputChoice.Character;
  m_stat = check_m(OrigCharPtr);
  if(m_stat == 1)
    return(0);

if( c == 'n' || c == 'R' ){
    if( Comp1Ptr->ScoreRatio > SPLIT_RATIO_THRES4 &&
        Comp2Ptr->ScoreRatio > SPLIT_RATIO_THRES4 )
      return(1);
```

```
      else
        return(0);
    }
    return(1);
  } check_tb(OrigCharPtr, Comp1Ptr, Comp2Ptr)
CHAR_STRUCT *OrigCharPtr, *Comp1Ptr, *Comp2Ptr;
{
  char c;
  int m_stat;

c = OrigCharPtr->OutputChoice.Character;
  m_stat = check_m(OrigCharPtr);
  if(m_stat == 1)
    return(0);

if(c == 'n' || c == 'o' || c == 'O' || c == '0' || c ==
'u' || c == 'U' ||
     c == 'r' || c == 'D' || c == 'G' || c == 'T' || c ==
'q' ||
     c == '6' ){
    if( Comp1Ptr->ScoreRatio > SPLIT_RATIO_THRES5 &&
        Comp2Ptr->ScoreRatio > SPLIT_RATIO_THRES5 )
      return(1);
    else
      return(0);
  }
  return(1);
} check_oo(OrigCharPtr, Comp1Ptr, Comp2Ptr)
CHAR_STRUCT *OrigCharPtr, *Comp1Ptr, *Comp2Ptr;
{
  char c;

c = OrigCharPtr->OutputChoice.Character;
```

```
      if(c == 'x' || c == 'X' || c == 'K' || c == '%' ){
        if( Comp1Ptr->ScoreRatio > SPLIT_RATIO_THRES7 &&
            Comp2Ptr->ScoreRatio > SPLIT_RATIO_THRES7 )
          return(1);
        else
          return(0);
      }
      return(1);
    } check_f(OrigCharPtr, Comp1Ptr, Comp2Ptr)
    CHAR_STRUCT *OrigCharPtr, *Comp1Ptr, *Comp2Ptr;
    {
      char c;

c = OrigCharPtr->OutputChoice.Character;

if( c == 'e' || c == 'o' || c == 'O' || c == '0' || c == '6' ||
          c == '%' || c == '#' ){
        if( Comp1Ptr->ScoreRatio > SPLIT_RATIO_THRES8 &&
            Comp2Ptr->ScoreRatio > SPLIT_RATIO_THRES8 )
          return(1);
        else
          return(0);
      }
      return(1);
    } check_misc(OrigCharPtr, Comp1Ptr, Comp2Ptr)
    CHAR_STRUCT *OrigCharPtr, *Comp1Ptr, *Comp2Ptr;
    {
      char c;
      int w_stat;

w_stat = check_w(OrigCharPtr);
      if( w_stat == 1)
```

```
    return(0);

c = OrigCharPtr->OutputChoice.Character;

if(c == 'n' || c == 'd' || c == 'r' || c == 'u' || c ==
'U' || c == 'm' ||
     c == 'X' || c == 'x' || c == 'y' || c == '7' || c ==
'F' || c == 'H' ||
     c == 'J' || c == 'K' || c == 'L' || c == 'M' || c ==
'N' || c == 'T' ||
     c == 'v' || c == 'V' || c == 'Y' || c == '#' || c ==
'&' || c == '%' ){
    if( Comp1Ptr->ScoreRatio > SPLIT_RATIO_THRES9 &&
        Comp2Ptr->ScoreRatio > SPLIT_RATIO_THRES9 )
      return(1);
    else
      return(0);
  }
  return(1);
} check_m(OrigCharPtr)
CHAR_STRUCT *OrigCharPtr;
{
  if( m_test(OrigCharPtr) == 1)
    return(1);

else
    return(0);
}.

m_test(CharPtr)
CHAR_STRUCT *CharPtr;
{
  int i,j,k,num_cols;
  byte c,past_val;
  float sp;
```

```
      sp = 0.22 * (float)CharPtr->CharHeight;
      for( k=0; k <= 2; ++k ){
        i = 0.3 * (float)CharPtr->CharHeight + (float)k * sp
  + 0.5;
        past_val = 0;
        num_cols = 0;
        for(j=1; j < CharPtr->CharWidth; ++j){
          c =  CharPtr->CharImagePtr[i][j];
          if( past_val == 0 && c != 0)
            ++num_cols;
          past_val = c;
        }
        if( num_cols != 3)
          /* cannot be m */
          return(0);
      }

/* could be an m */
      return(1);
  } define MIN_W_RATIO  4  /* min score ratio to pass a w
  test */
  check_w(OrigCharPtr)
  CHAR_STRUCT *OrigCharPtr;
  {
    if( w_test(OrigCharPtr) == 1)
      return(1);
    else
      return(0);
  } w_test(CharPtr)
  CHAR_STRUCT *CharPtr;
  {
    int i,j,k,num_cols,ht, first[4], last[4];
    byte c;
```

```
   float sp;

ht = CharPtr->CharHeight-1;
   sp = 0.4* ht;
   k = 0.1*ht;
   first[0] = 0;
   last[0] = 999;

/* at row 0.1, 0.5 and 0.9 height, check start & end
points */
   for( i = 1; i < 4; ++i){
     first[i] = 999;
     last[i] = -1;
     for(j=0; j < CharPtr->CharWidth; ++j){
       c =  CharPtr->CharImagePtr[k][j];
       first[i] = ( c != 0 && j < first[i])? j : first[i];
       last[i] = (c != 0 && j > last[i] )? j : last[i];
     }

/* comparing with the previous rows, must have
non-increasing  borders */
     if( first[i] < first[i-1] || last[i] > last[i-1] )
       return(0);

k += sp;
   }

/* make sure that width & borders has  decreased */
i = last[1] - first[1];
j = last[2] - first[2];
k = last[3] - first[3];
if( i > j && j > k && k > 0.25*ht && first[3] > first[1] && last[1] > last[3] )
  /* could be w */
  return(1);
}
else{
```

```
        /* not w */
        return(0);
    }

}
```

What is claimed is:

1. An optical character recognition system, comprising:
- a neural network trained to recognize a character image on the basis of a predetermined set of symbols, said neural network having an input and an output at which each character image transmitted to said input is given an individual score for each one of said symbols in said set;
- a pre-processor coupled to said neural network input and comprising means for designating plural contiguous "on" pixels in a document image as a separate object and segmenting said object from said document image as an individual character image;
- a post-processor coupled to said neural network output and comprising means responsive to the output of said neural network meeting at least one of a predetermined set of neural network output conditions for correcting the output of said neural network, said post processor comprising at least one of:
  - (a) means responsive upon an attempt by said neural network to rcognize said character image for modifying said character image whereby, upon receipt of the modified character image at said neural network input, said neural network performs a subsequent attempt to recognize the same character image in its modified form; and
  - (b) means responsive upon said neural network choosing one of said symbols for said character image for replacing the symbol chosen by said neural network with a different symbol.

2. The system of claim 1 wherein said pre-processor further comprises means for normalizing an original version of said character image and transmitting the normalized version of said character image to said neural network input.

3. An optical character recognition system, comprising:
- a neural network trained to recognize a character image on the basis of a predetermined set of symbols, said neural network having an input and an output at which each character image transmitted to said input is given an individual score for each one of said symbols in said set;
- a pre-processor coupled to said neural network input and comprising means for designating plural contiguous "on" pixels in a document image as a separate object and segmenting said object from said document image as an individual character image and means for normalizing an original version of said character image and transmitting the normalized version of said character image to said neural network input;
- a post-processor coupled to said neural network output and comprising means responsive to the output of said neural network meeting at least one of a predetermined set of neural network output conditions for correcting the output of said neural network, wherein said predetermined set of neural network output conditions includes a condition that the highest score at said neural network output corresponds to one of a predetermined set of symbols whose character image upon being normalized by said pre-processor is indistinguishable by said neural network from an other symbol.

4. The system of claim 3 wherein said other symbol is one of the upper and lower case version of said one symbol and wherein said means for correcting comrpises means for determining from the size of said original version of said character image which one of said upper and lower case version of said symbol is represented by said character image.

5. An optical character recognition system, comprising:
- a neural network trained to recognize a character image on the basis of a predetermined set of symbols, said neural network having an input and an output at which each character image transmitted to said input is given an individual score for each one of said symbols in said set;
- a pre-processor coupled to said neural network input and comprising means for designating plural contiguous "on" pixels in a document image as a separate object and segmenting said object from said document image as an individual character image and means for normalizing an original version of said character image and transmitting the normalized version of said character image to said neural network input;
- a post-processor coupled to said neural network output and comprising means responsive to the output of said neural network meeting at least one of a predetermined set of neural network output conditions for correcting the output of said neural network, wherein said predetermined set of neural network output conditions includes a condition that the highest score at said output is insufficiently high, wherein said means for correcting comprises:
- means for detecting whether the original version of said character image is smaller than a predetermined small size corresponding to one of of a set of special symbols not included in said predetermined symbol set whose normalized character image is indistinguishable therefrom; and
- means for determining from said character image the identity of one of said special symbols represented by said character image.

6. The optical character recognition system of claim 1 wherein said pre-processor separates the images of adjacent symbols in said document image which are kerned.

7. An optical character recognition system, comprising:

a neural network trained to recognize a character image on the basis of a predetermined set of symbols, said neural network having an input and an output at which each character image transmitted to said input is given an individual score for each one of said symbols in said set;

a pre-processor coupled to said neural network input and comprising means for designating plural contiguous "on" pixels in a document image as a separate object and segmenting said object from said document image as an individual character image;

a post-processor coupled to said neural network output and comprising means responsive to the output of said neural network meeting at least one of a predetermined set of neural network output conditions for correcting the output of said neural network, wherein said means for designating is responsive whenever two separately designated objects in an earlier-scanned portion of said document image are joined together in another later-scanned portion of said image for designating said two objects as a single larger object, and for remembering the size of each of said two objects, said means for designating further responsive whenever one of a plurality objects designated as a single larger object is of a size greater than a predetermined threshold size for separating said one object from said larger object, whereby to separate touching characters in said document image.

8. The system of claim 7 wherein said predetermined eshold size is about the average size of the symbols in a document image.

9. An optical character recognition system, comprising:

A. a neural network trained to recognize a predetermined set of symbols and having an input and an output at which each image transmitted to said input is given an individual score for each one of said symbols in said set;

B. a pre-processor connected to said neural network input and comprising segmenting means for segmenting individual character images from a document image and normalizing means for generating a normalized version of said character image from the original version of said character image;

C. a post-processor connected to said neural network output and to an input of said normalizing means and comprising means responsive whenever the highest score at said neural network output is insufficient for performing a succession of plural progressively more time-consuming attempts to deduce a symbol choice more reliable than that corresponding to said insufficient score; and D. wherein said post-processor comprises:
  (1) normalization compensation processor means for performing a first one of said attempts by identifying in said character image a symbol whose normalized character image is ambiguous with respect to that of another symbol,
  (2) dekerning processor means for performing a second one of said attempts by separating the images of two symbols which are kerned together in said character image whenever said normalization ambiguous processor fails to successfully identify said character image,
  (3) touching character processor means for performing a third one of said attempts by separating the images of two symbols which are touching one another in said character image whenever said dekerning processor means fails to successfully separate said character image; and
  E. guess process means for choosing one of several lower scoring symbols identified at the output of said neural network instead of the highest scoring symbol, depending upon one of:
    (1) which one of the lower scoring symbols has a height closest to the height of said original version of said character image;
    (2) whenever all of said several lower scoring symbols are close in height to said character image, which one of the lower scoring symbols identified at said neural network output is likeliest to be confused by said neural network with the highest scoring symbol.

10. The system of claim 9 wherein said normalization processor means comprises case correction means for identifying the case of said character image from said original character image whenver the highest scoring symbol identified at said neural network output is one whose normalized character image is the same for the upper and lower case versions of said symbol.

11. The system of claim 9 wherein:
  said segmenting means of said pre-processor separates said character image by histogramming "on" pixels in said document image and dividing said document image along rows or columns of pixels therein which are devoid of "on" pixels; and
  said dekerning processor means separates kerned symbols in said character image by performing connected component analysis on said character image.

12. The system of claim 9 wherein said touching character processor means comprises means for performing a series of character separation trial processes in a predetermined order, each of said trial processes searching for a corresponding set of possible touching symbol pairs which is assumed in the next one of said processes to be absent.

13. The system of claim 11 wherein said touching character processor means comprises means for:
  (1) attempting to separate said character image at the bottom of two adjacent symbols;
  (2) attempting to separate a symbol having a left-hand arc from an adjacent symbol;
  (3) attempting to separate a symbol having a top horizontal line from an adjacent symbol;
  (4) attempting to separate said character image at the top of two adjacent symbols;
  (5) attempting to separate said character image at both its top and its bottom;
  (6) attempting to separate a symbol comprising oppositely sloping diagonal lines form an adjacent symbol;
  (7) attempting to separate a pair of symbols having adjoining arcs;
  (8) attempting to separate a small letter f from an adjacent symbol; and
  (9) attempting to separate adjacent symbols not attempted in (1) through (8) above.

14. The system of claim 9 wherein said dekerner processor means and said touching character separation processor means each comprise means for transmitting to said normalizer processor a pair of images formed by separating said character image.

15. The system of claim 12 wherein said touching character processor further comprises:
- means for transmitting to said normalization processor a pair of images formed by separating said character image so as to obtain a second pattern at said neural network output; and
- error checking means for comparing said second pattern at said output of said neural network with a predetermined output pattern typical of the corresponding one of said series of trial processes splitting a character image of a single known symbol.

16. The system of claim 15 wherein said predetermined output pattern is one of a set of predetermined output patterns established by transmitting to said neural network input successive images of single symbols which are separated by the corresponding one of said trial processes.

17. The system of claim 15 wherein said touching character processor further comprises general checking means for comparing with a set of known general error patterns a pattern comprising (a) the highest scoring symbol identified by said neural network for said character image and (b) the symbols identified by said neural network for the pair of images formed by separating said character image.

18. The system of claim 17 wherein said set of known general error patterns correspond to the splitting of known symbols into two parts.

19. In an optical character recognition system comprising a neural network trained to recognize a character image on the basis of a predetermined set of symbols, said neural network having an input and an output at which each character image transmitted to said input is given an individual score for each one of said symbols in said set, a method for performing optical character recognition, comprising:
- a pre-processing step comprising designating plural contiguous "on" pixels in a document image as a separate object and segmenting said object from said document image as an individual character image;
- a post-processing step comprising sensing whenever the output of said neural network meets at leas one of a predetermined set of neural network output conditions and correcting the output of said neural network in response to said sensing step, said post processing step comprising at least one of:
  - (a) upon an attempt by said neural network to recognize said character image, modifying said character image whereby, upon receipt of the modified character image at said neural network input, said neural network performs a subsequent attempt to recognize the same character image in its modified form; and
  - (b) upon said neural network choosing one of said symbols for said character image, replacing the symbol chosen by said neural network with a different symbol.

20. The method of claim 29 wherein said pre-processing step further comprises normalizing an original version of said character image and transmitting the normalized version of said character image to said neural network input.

21. In an optical character recognition system comprising a neural network trained to recognize a character image on the basis of a predetermined set of symbols, said neural network having an input and an output at which each character image transmitted to said input is given an individual score for each one of said symbols in said set, a method for performing optical character recognition, comprising:
- a pre-processing step comprising designating plural contiguous "on" pixels in a document image as a separate object and segmenting said object from said document image as an individual character image and transmitting the normalized version of said character image to said neural network input;
- a post-processing step comprising sensing whenever the output of said neural network meets at leas one of a predetermined set of neural network output conditions and correcting the output of said neural network in response to said sensing step, wherein said predetermined set of neural network output conditions includes a condition that the highest score at said neural network output corresponds to one of a predetermined set of symbols whose character image upon being normalized by said pre-processor is indistinguishable by said neural network from an other symbol.

22. The method of claim 21 wherein said other symbol is one of the upper and lower case version of said one symbol and wherein said correcting step comprises determining from the size of said original version of said character image which one of said upper and lower case version of said symbol is represented by said character image.

23. In an optical character recognition system comprising a neural network trained to recognize a character image on the basis of a predetermined set of symbols, said neural network having an input and an output at which each character image transmitted to said input is given an individual score for each one of said symbols in said set, a method for performing optical character recognition, comprising:
- a pre-processing step comprising designating plural contiguous "on" pixels in a document image as a separate object and segmenting said object from said document image as an individual character image and normalizing an original version of said character image and transmitting the normalized version of said character image to said neural network input;
- a post-processing step comprising sensing whenever the output of said neural network meets at leas one of a predetermined set of neural network output conditions and correcting the output of said neural network in response to said sensing step, wherein said predetermined set of neural output conditions includes the condition that the highest score at said output is insufficiently high, wherein said correcting step comprises:
- detecting whether the original version of said character image is smaller than a predetermined small size corresponding to one of a set of special symbols not included in said predetermined symbol set whose normalized character image is indistinguishable therefrom; and
- determining from said character image the identity of one of said special symbols represented by said character image.

24. The method of claim 19 wherein said pre-processing step comprises separating the images of adjacent symbols in said document image which are kerned.

25. In an optical character recognition system comprising a neural network trained to recognize a character image on the basis of a predetermined set of symbols, said neural network having an input and an output at which each character image transmitted to said input is given an individual score for each one of said symbols in said set, a method for performing optical character recognition, comprising:

a pre-processing step comprising designating plural contiguous "on" pixels in a document image as a separate object and segmenting said object from said document image as an individual character image;

a post-processing step comprising sensing whenever the output of said neural network meets at leas one of a predetermined set of neural network output conditions and correcting the output of said neural network in response to said sensing step, wherien said designating step comprises:

first sensing whenever two separately designated objects in an earlier-scanned portion of said document image are joined together in another later-scanned portion fo said image;

designating said two objects as a single larger object in response to said first sensing step;

remembering the size of each of said two objects;

second sensing whenever one of a plurality objects designated as a single larger object is of a size greater than a predetermined threshold size; and separating said one object from said larger object in response to said second sensing step, whereby to separate touching characterter in said document image.

26. The method of claim 25 wherein said predetermined threshold size is about the average size of the symbols in said document image.

27. In an optical character recognition system comprising a neural network trained to recognize a predetermined set of symbols and having an input and an output at which each image transmitted to said input is given an individual score for each one of said symbols in said set, a method for performing optical character recognition, comprising:

A. a pre-processor step comprising segmenting individual character images form a document image and generating a normalized version of said character image from the original version of said character image and transmitting said normalized version to said input of said neural network;

B. a post-processing step comprising sensing whenever the highest score at said neural network output is insufficient; and C. performing a succession of plural progressively more time-consuming attempts to deduce a symbol choice more reliable than that corresponding to said insufficient score in response to said sensing step; and D. wherein said performing step of said post-processing step comprises:

(1) performing a first one of said attempts by identifying in said character image a symbol whose normalized character image is ambiguous with respect to that of another symbol, (2) performing a second one of said attempts by first separating the images of two symbols which are kerned together in said character image whenever said first attempt fails to successfully identify said character image, (3) performing a third one of said attempts by second separating the images of two symbols which are touching one another in said character image whenever said first separating step fails to successfully separate said character image; and E. a guess processor step, said guess processing step comprising choosing one of several lower scoring symbols identified at the output of said neural network instead of the highest scoring symbol, depending upon one of:

(1) which one of the lower scoring symbols has a height closest to the height of said original version of said character image;

(2) if all of said several lower scoring symbols are close in height to said character image, which one of the lower scoring symbols identified at said neural network output is likeliest to be confused by said neural network with the highest scoring symbol.

28. The method of claim 27 wherein the step of performing the first one of said attempts comprises identifying the case of said character image from said original character image whenever the highest scoring symbol identified at said neural network output is one whose normalized character image is the same for the upper and lower case versions of said symbol.

29. The method of claim 27 wherein:

said segmenting step comprises histogramming "on" pixels in said document image and dividing said document image along rows or columns of pixels therein which are devoid, of "on" pixels; and said first separating step comprises performing connected component analysis on said character image.

30. The method of claim 27 wherein said second separating step comprises performing a series of character separation trial processes in a predetermined order, each of said trial process comprising searching for a corresponding set of possible touching symbol pairs which is assumed in the next one of said trial processes to be absent.

31. The method of claim 29 wherein said series of trial processes comprises:

(1) attempting to separate said character image at the bottom of two adjacent symbols;

(2) attempting to separate a symbol having a left-hand arc from an adjacent symbol;

(3) attempting to separate a symbol having a top horizontal line from an adjacent symbol;

(4) attempting to separate said character image at the top of two adjacent symbols;

(5) attempting to separate said character image at both its top and its bottom;

(6) attempting to separate a symbol comprising oppositely sloping diagonal lines from an adjacent symbol;

(7) attempting to separate a pair of symbols having adjoining arcs;

(8) attempting to separate a small letter f from an adjacent symbol; and (9) attempting to separate adjacent symbols not attempted in steps (1) through (8) above.

32. The method of claim 27 wherein said first and second separating steps each further comprise normalizing and transmitting to said neural nctwork input a pair of images formed by separating said character image.

33. The method of claim 30 wherein said second separating step further comprises an error checking process comprising:

normalizing and transmitting to said neural network input a pair of images formed by separating said character image so as to obtain a second pattern at said neural network output; and comparing said second pattern at said output of said neural network with a predetermined output pattern typical of the corresponding one of said series of trial processes splitting a character image of a single known symbol.

34. The method of claim 33 wherein said predetermined output pattern is one of a set of predetermined output patterns established by transmitting to said neural network input successive images of single symbols which are separated by the corresponding one of said trial processes.

35. The method of claim 33 wherein said second separating step further comprises a general checking step comprising comparing with a set of known general error patterns a pattern comprising (a) the highest scoring symbol identified by said neural network for said character image and (b) the symbols identified by said neural network for the pair of images formed by separating said character image.

36. The method of claim 35 wherien said set of known general error patterns correspond to the splitting of known symbols into two parts.

* * * * *